United States Patent [19]

Izuka

[11] Patent Number: 5,555,228
[45] Date of Patent: Sep. 10, 1996

[54] AN OPTICAL HEAD HAVING A VERTICAL FLAT PLATE SHAPED MAGNETIC CIRCUIT CONTAINING A TRACKING COIL AND A FOCUSING COIL

[75] Inventor: Takashi Izuka, Kanagawa, Japan

[73] Assignee: Sony Corporation, Tokyo, Japan

[21] Appl. No.: 340,066

[22] Filed: Nov. 15, 1994

[30] Foreign Application Priority Data

Nov. 16, 1993 [JP] Japan .................................. 5-309849

[51] Int. Cl.$^6$ ...................................................... G11B 7/09
[52] U.S. Cl. .................... 369/44.15; 369/44.14; 359/813
[58] Field of Search ........................... 369/44.15, 44.16, 369/44.22, 44.23, 112, 44.32, 44.14; 359/813

[56] References Cited

U.S. PATENT DOCUMENTS

| | | | |
|---|---|---|---|
| 4,449,213 | 5/1984 | Noborimoto et al. | 369/44.16 |
| 4,653,856 | 3/1987 | Kamiko | 359/824 |
| 4,669,823 | 6/1987 | Iguma et al. | 369/44.15 |
| 4,702,555 | 10/1987 | Iguma et al. | 369/44.15 |
| 4,766,583 | 8/1988 | Oinoue et al. | 369/44.16 |
| 4,927,235 | 5/1990 | Narumi | 369/44.15 |
| 4,948,230 | 8/1990 | Kasahara et al. | 369/44.11 |
| 5,046,820 | 9/1991 | Saekusa et al. | 369/44.15 |
| 5,073,883 | 12/1991 | Mitsumori | 369/44.15 |
| 5,144,607 | 9/1992 | Ishida et al. | 369/44.15 |
| 5,161,067 | 11/1992 | Tomiyama et al. | 359/824 |
| 5,208,703 | 5/1993 | Ikegame et al. | 359/813 |
| 5,220,459 | 6/1993 | Ichikawa et al. | 359/811 |
| 5,313,334 | 5/1994 | Tomiyama et al. | 359/824 |
| 5,323,378 | 6/1994 | Kim et al. | 369/274 |
| 5,428,481 | 6/1995 | Ikegame et al. | 369/44.16 |
| 5,446,721 | 8/1995 | Sekimoto et al. | 369/44.15 |

FOREIGN PATENT DOCUMENTS

| | | | |
|---|---|---|---|
| 0459080A3 | 12/1991 | European Pat. Off. | G11B 7/08 |
| 0617419A1 | 9/1994 | European Pat. Off. | G11B 7/09 |
| 56056140 | 5/1981 | Japan | H02K 3/04 |
| 61023307 | 1/1986 | Japan | H01F 15/10 |
| 63219113 | 9/1988 | Japan | H01F 41/08 |
| 3022509 | 1/1991 | Japan | H01F 41/06 |
| 3020005 | 1/1991 | Japan | H01F 15/10 |
| 4078005 | 12/1992 | Japan | G11B 5/17 |

*Primary Examiner*—Georgia Y. Epps
*Assistant Examiner*—Kim-Kwok Chu
*Attorney, Agent, or Firm*—Limbach & Limbach L.L.P.

[57] ABSTRACT

An optical pickup device employing an objective lens driving device for displacing an objective lens relative to an optical disc surface in directions parallel and normal to the optical axis of the objective lens. The objective lens is mounted in a movable part consisting of a bobbin having an opening at its mid portion. A plurality of resilient supporting members movably support the movable part. A magnetic circuit unit includes a flat-plate-shaped member carrying a focusing coil and a tracking coil. The flat-plate-shaped member extends parallel to the optical axis of the objective lens. The focusing and tracking coils drive the movable part in a direction parallel to, and in the planar direction normal to, the optical axis of the objective lens. An objective lens driving device is mounted for translating movement on a base member on which are mounted a light source, a light receiving element (for receiving return light), a reflective mirror, and a beam splitter.

21 Claims, 32 Drawing Sheets

AN OPTICAL HEAD HAVING A VERTICAL FLAT PLATE SHAPED MAGNETIC CIRCUIT CONTAINING A TRACKING COIL AND A FOCUSING COIL

BACKGROUND OF THE INVENTION

1. Field of the Invention

This invention relates to an objective lens driving device employed in an optical disc recording/reproducing apparatus, such as an optical disc player, and an optical pickup device employing the objective lens driving device.

2. Description of related Art

In an optical disc recording/reproducing apparatus, such as an optical disc player, employing an optical disc as a recording medium, an objective lens driving device is employed for displacing an objective lens in a direction parallel to its optical axis and within a plane at right angles to the optical axis. The objective lens is adapted for collecting a light beam radiated from a light source, such as a semiconductor laser, and for radiating the collected light beam to the optical disc.

In the optical disc driving device, the objective lens is displaced, responsive to the focusing error signals and the tracking error signals, in a direction parallel to the optical disc of the objective lens and in a plane normal to the optical axis, whereby a light beam radiated by the objective lens on a signal recording surface of the optical disc rotated by the disc rotating driving device is focused on the signal recording surface of the optical disc, and the light beam is caused to follow the recording track formed on the optical disc.

FIGS. 1 and 2 show a typical conventional objective lens driving device.

The objective lens driving device includes a bobbin 2 having an objective lens 1 mounted at its one end. The bobbin 2 is supported in a cantilevered fashion on a stationary support member 8, mounted on a yoke 5 constituting a magnetic circuit unit 4, with the aid of four resilient supporting members 3, such as wires.

The bobbin 2, carrying the objective lens, has a center aperture 7 extending along the optical axis of the objective lens 1. Within the aperture 7 is disposed a focusing coil 8 in the form of a square tube. On an outer lateral side of the focusing coil 8 is bonded a tracking coil 9 made up of planar rectangular coils 9a, 9b.

On each lateral side of the bobbin 2 is mounted a relaying printed circuit board 10 to which are electrically connected coil terminals 8a, 9a lead out respectively from the focusing coil 8 and the tracking coil 9. On the printed circuit board 10 is formed a connecting pattern 10a to which an end 3a of the resilient supporting member 3, formed of an electrically conductive material for functioning as a power feed line, is electrically and mechanically connected using an electrically conductive adhesive, such as solder.

A pair of such resilient supporting members 3, each supporting the bobbin 2 at its one end 3a, are arranged on each lateral surface of the bobbin 2 in parallel with each other. The resilient supporting members 3 are fixedly supported by a stationary supporting member 8 mounted on the yoke 5 by having the other ends passed through throughholes 11 bored at respective corners of the stationary supporting member 8. The other ends 3b of the resilient supporting members 3, protruded via the through-holes 11 of the resilient supporting members 3, are electrically connected to a driving control circuit, not shown, designed for displacing the objective lens 1.

The objective lens 1, mounted on the bobbin 2, supported in a cantilevered fashion by the stationary supporting member 6 by each two resilient supporting members 3 on both lateral sides of the bobbin 2, may be moved in a direction parallel to the optical axis within a plane normal to the optical axis of the objective lens 1, with the resilient supporting members 3 as the deflecting members, as indicated by arrows F and T in FIG. 1, respectively.

The yoke 5, on which the stationary supporting member 6 is mounted, is formed with a pair of upstanding pieces 12, 13 facing each other. On the surface of the piece 12 facing the opposite side piece 13 is affixed a magnet 14 constituting a magnetic circuit unit 4.

The stationary supporting member 8 supporting the bobbin 2 via the plural resilient supporting members 3 is mounted on the upper surface on the opposite end of the yoke 5 for making up the objective lens driving unit. At this time, the upstanding pieces 12, 13 are intruded into the aperture 7 of the bobbin 2, with the focusing coil 8 and the tracking coil 9 in-between, as shown in FIG. 1. The focusing coil 8 and the tracking coil 9 are arranged at the position of being interlinked with the magnetic flux emanating from the magnet 14 towards the opposite side upstanding piece 13.

With the above-described objective lens driving device, when the control current corresponding to the focusing error signal is supplied from the driving control circuit via the resilient electrically conductive supporting members 3 to the focusing coil 8, there is generated a driving force of displacing the bobbin 2 in a direction parallel to the optical axis of the objective lens 1 by the interaction of the control current with the magnetic flux of the magnetic circuit 4. The bobbin 2 is displaced in the focusing direction, that is the direction parallel to the optical axis of the objective lens 1, as indicated by arrow F in FIG. 48, while elastically displacing the resilient supporting members 3. By such displacement of the bobbin 2, the objective lens 1 mounted on the bobbin 2 is also displaced in the same direction for performing focusing control.

When the control current corresponding to the tracking error signal is supplied from the driving control circuit via the resilient electrically conductive supporting members 3 to the tracking coil 9, there is generated a driving force of displacing the bobbin 2 in a direction normal to the optical axis of the objective lens 1 by the interaction of the control current with the magnetic flux of the magnetic circuit 4. The bobbin 2 is displaced in the tracking direction, that is the direction normal to the optical axis of the objective lens 1, as indicated by arrow T in FIG. 1, while elastically displacing the resilient supporting members 3. By such displacement of the bobbin 2, the objective lens i mounted on the bobbin 2 is also displaced in the same direction for performing tracking control.

With the above-described objective lens driving device, the relaying printed circuit board 10 is arranged on each side of the bobbin 2 and coil ends 8a, 9a of the focusing coil 8 and the tracking coil 9 are connected to the printed circuit board 10. The resilient supporting members 3, each having its one end to the printed circuit board 10, are provided for supplying the control current to the focusing coil 8 or to the tracking coil 9. There is also known an arrangement in which the control current is fed via a flexible printed circuit board 16 to the focusing coil 8 or to the tracking coil 9.

With such objective lens driving device, shown in FIG. 3, the flexible printed circuit board 18, connected to a control circuit, has its one end connected to the upper end face of the bobbin 2, and coil ends 8a, 9a of the focusing coil 8 and the tracking coil 9 are connected to a connection pattern 16a formed at one end of the flexible printed circuit board 16. By employing the flexible printed circuit board 16, the resilient supporting member 3 need not be formed of an electrically conductive material, but may be formed of a material exhibiting desired properties, such as desired degree of resiliency.

On the other hand, if the flexible printed circuit board 16 is employed, there is no necessity of providing the relaying printed circuit board 10 on the bobbin 2, so that the resilient supporting member 3 has its one end 3a directly mounted on the bobbin 2 via engaging supports 17 formed on either sides of the bobbin 2.

The focusing coil 8 and the tracking coil 9, employed in the above-described objective lens driving device, are formed by winding a wire. The focusing coil 8 is wound in a square tube from a single wire and the connecting coil end 8a is led from each of upper and lower ends thereof, as shown in FIG. 2. The tracking coil 9 is formed by winding a single wire for providing two rectangular coils 9b, 9c side-by-side and the connecting coil terminal 9a is led from a side of each of the coils 9b, 9c, as shown in FIG. 2. The tracking coil 9 is affixed and unified to a lateral side of the tubular focusing coil 8 as shown in FIG. 2. The focusing coil 8, thus carrying the tracking coil 9, is directly affixed to the bobbin 2 by having its side opposite to the side carrying the tracking coil bonded to the inner wall of the aperture 7, as shown in FIG. 1.

The coil ends 8a, 9a, led from the focusing coil 8 and the tracking coil 9, are electrically connected to the relaying printed circuit board 10 or to the flexible printed circuit board 16 using an electrically conductive adhesive, such as solder. Thus the operation of connecting the coil ends 8a, 9a is necessary to perform during the assembly operation of the objective lens driving device, thus lowering the assembling efficiency.

Besides, it is necessary to prevent the coil ends 8a, 9a from becoming loosened on the bobbin 2 when connecting the coil ends. If the coil end 8a, 9a are loosened, there is the risk that the objective lens i cannot be driven accurately responsive to the control current due to inadvertent movement of the coil ends 8a, 9a during displacement of the objective lens 1. If, with the objective lens driving device, the objective lens i is to be moved along the optical axis and in a direction normal thereto in stability and with high response to the driving current supplied to the focusing coil 8 and the tracking coil 9, the center of gravity P of the bobbin 2 mounting the objective lens 1 as a movable part needs to be correctly coincident with the center of generation of the driving force of driving and displacing the bobbin 2.

With the above-described objective lens driving device, the driving force of displacing the objective lens 1 in a direction parallel to the optical axis of the objective lens 1 is produced by the interaction of the control current flowing through a coil portion 8b extending in a direction normal to the optical axis of the objective lens 1, that is in a direction defined by the lateral surface section of the focusing coil 8 disposed between the upstanding pieces 12, 13, and the magnetic flux radiated by the magnet 14 and directed from the piece 12 towards the piece 13 for being interlinked with the coil portion 8b, as shown in FIGS. 1 and 5. The driving force of displacing the objective lens 1 in the tracking direction, that is in a planar direction normal to the optical axis of the objective lens 1, is produced by the interaction of the control current flowing through linear sections 19a, 19b of the rectangular coils 9a, 9b of the tracking coil 9 extending parallel to the optical axis of the objective lens 1 and the magnetic flux radiated from the magnet 14 and directed from the upstanding piece 12 towards the opposite upstanding piece 13 for being interlinked with the linear sections 19a, 19b. The coil portions 9a, 9b are disposed on the side of the focusing coil lying between the upstanding pieces 12 and 13, as shown in FIGS.1 and 4.

The coil portions 9a, 9b of the tracking coil 9 are connected so that the current will flow in the same direction of linear portions 19a, 19b lying between the upstanding portions 19a, 19b.

For accurately generating the driving force for the objective lens 1 in a direction parallel to the optical axis, the coil portion 8b of the focusing coil lying between the upstanding pieces 12, 13 needs to be coincident with a line Y—Y', shown in FIG. 4, which represents the center of the magnetic gap defined between the upstanding pieces 12, 13, in order for the control current flowing through the coil 8b to be accurately perpendicular to the interlinking magnetic flux radiated between the upstanding pieces 12, 13. For accurately generating the driving force for the objective lens 1 in the planar direction perpendicular to the optical axis, the center between the linear portion 19a, 19b of the rectangular coil portions 9b, 9c of the tracking coil 9 needs to be coincident with a line X—X' in FIG. 4 which is the center along the width of the upstanding pieces 12, 13, in order for the control current flowing through the linear portion 19a, 19b to be accurately perpendicular to the interlinking magnetic flux radiated between the upstanding pieces 12, 13. On the other hand, for generating the uniform driving force in a direction parallel to the optical axis and in a planar direction normal to the optical axis, the center of a line Z—Z' in FIG. 5 extending in a direction along the height of the coil portion 8b of the focusing coil 8 and the linear portions 19a, 19b of the tracking coil 19, needs to be coincident with the center along the height of the magnet 14.

By arranging the focusing coil 8 and the tracking coil 9 relative to the magnetic circuit 4 as described above, the center of generation of the diving force generated by the interaction of the control current supplied to the focusing coil 8 and the tracking coil 9 and the magnetic flux radiated from the magnet 14 for displacing the object lens 1 in the directions parallel and orthogonal to its optical axis is disposed at a point of intersection of the lines Y—Y' and X—X' in FIG. 4 and the line Z—Z' in FIG. 5.

By coinciding the center of gravity P of the bobbin 2 as a movable part carrying the objective lens 1 with the point of intersection of the lines Y—Y' and X—X' in FIG. 4 and the line Z—Z' in FIG. 5, the bobbin 2 is displaced in the directions parallel to and at right angles to the optical axis of the objective lens 1 with high response characteristics without producing distortion relative to the driving force parallel to or normal to the optical axis of the objective lens 1. Since the bobbin 2 is displaced with high response characteristics without producing distortion etc., the objective lens 1 mounted on the bobbin 2 is displaced correctly in the direction parallel and normal to the optical axis of the objective lens 1 responsive to the control current supplied to the focusing coil 8 and the tracking coil 9, respectively.

The objective lens 1 is mounted so that its optical axis is disposed on the line X—X in FIG. 4 and parallel to the line Z—Z' in FIG. 5.

Meanwhile, the focusing coil 8 and the tracking coil 9, employed for the conventional objective lens driving device, are of a three-dimensional structure comprising a sole wire wound in a tube or rectangle. This renders it extremely difficult to form the focusing coil 8 and the tracking coil 9 employed in the objective lens driving device so as to be of a unified constant size. If the focusing coil 8 and the tracing coil 9, having size variation, are mounted on the bobbin 2, it becomes impossible to render the center of gravity P of the bobbin 2 inclusive of the objective lens 1 constant. Above all, if there is any variation in shape or size of the focusing coil 8 or the tracking coil 9 in portions thereof spaced apart from the center of gravity P of the bobbin 2, inclusive of the objective lens 1, when the focusing coil 8 or the tracking coil 9 is mounted in position, such variation affects the position of the center of gravity P of the bobbin 2 inclusive of the objective lens 1 seriously.

In addition, since the focusing coil 8 carrying the tracking coil 9 is mounted within the aperture 7 of the bobbin 2 using an adhesive, it is difficult to mount the focusing coil on the bobbin 2, while it is extremely difficult to mount it with high mounting accuracy relative to the bobbin 2. Thus the position of the center of gravity P of the bobbin 2 inclusive of the objective lens 1 becomes different from one object lens driving device to another, while it becomes difficult to set the position of the center of gravity P accurately.

The bobbin 2 is formed as a molded article of a synthetic material, while the focusing coil 8a and the tracking coil 9 are formed by copper wires. The specific gravity of the synthetic material constituting the bobbin 2 is on the order of 1.5, while that of the copper wire of the focusing coil 8 or the tracking coil 9 is 8.9. Consequently, should there be any variation in the shape or size of the focusing coil 8 or the tracking coil 9 or in the mounting position thereof relative to the bobbin 2, it becomes impossible to set the position of the center of gravity P of the bobbin 2 as the movable part, inclusive of the objective lens 1, without size or shape variance from one object lens driving device to another.

If the position of the center of gravity P of the movable part is not constant from one object lens driving device to another, as described above, the center of generation of the driving force generated by the interaction between the focusing coil 8 or the tracking coil 9 and the magnetic circuit 9 is not coincident with the center of gravity P of the movable part with the result that the objective lens 1 cannot be displaced in the directions normal and parallel to its optical axis with high response to the control current without producing the force of deviation such as distortion. The optical beam radiated via the objective lens 1 on the signal recording surface of the optical disc cannot be focusing and tracking controlled with high accuracy so that information signals cannot be recorded or reproduced with high recording and/or reproducing characteristics.

The above-described object lens driving device is so designed that the coil portion 8b on one lateral side of the rectangular tubular wound focusing coil 8 is inserted into a space between the upstanding pieces 12 and 13 of the yoke 5, as shown in FIGS. 1 and 6. Consequently, a coil portion 8c of the focusing coil 8 opposite to the coil portion 8b inserted between the upstanding pieces 12, 13 faces the upstanding piece 12 fitted with the magnet 14. When the focusing coil 8 is fed with the control current, there is produced, in addition to the driving force $f_1$ generated by the interaction between the control current and one half side of the coil portion 8b interlinked with the effective magnetic flux Bg radiated from the magnet 14 into a space between the upstanding pieces 12 and 13, a driving force $f_2$ generated by the interaction between the control current and the other half side of the coil portion 8b interlinked with the effective magnetic flux Bg' radiated from the magnet 14 towards the back surface of the upstanding piece 12, as shown in FIG. 8.

This driving force $f_2$, generated by the interaction between the control current and the opposite one-half side of the coil portion 8b interlinked with the stray magnetic flux Bg', acts in the opposite direction to the driving force $f_1$ generated by the interaction between the control current and the one-half side of the coil portion 8b interlinked with the effective magnetic flux Bg, and acts for canceling the driving force driving the objective lens 1 along the optical axis, such that the driving force driving the objective lens 1 along the optical axis cannot be exploited effectively.

Thus, with the conventional objective lens driving device, shielding means, such as a shield plate, is provided for shielding the stray magnetic flux, or the focusing coil 8 is increased in size, in order to eliminate the effect of the stray flux. However, provision of the shielding means or the use of the large-sized focusing coil 8 leads to an increased size of the objective lens driving device itself.

The portion of the focusing coil 8 of the conventional objective lens driving device which is effective to generate the driving force driving the objective lens 1 along the optical axis in cooperation with the magnetic flux radiated from the magnet 14 is solely the above-mentioned one-half side of the coil portion 8b of the focusing coil 8 inserted between the upstanding pieces 12, 13, shown shaded in FIG. 6. On the other hand, the portion of the focusing coil 8 of the conventional objective lens driving device which is effective to generate the driving force driving the objective lens 1 in the planar direction normal to the optical axis in cooperation with the magnetic flux radiated from the magnet 14 is solely the linear portions 19a, 19b of the coil portions 9b, 9c of the tracking coil 19 facing the magnet 14, shown shaded in FIG. 7. That is, the portions of the focusing coil 8 and the tracking coil 9 effective to produce the driving force driving the objective lens 1 account for about one-fourth of the entire coils, thus the exploiting efficiency being extremely low. Due to the low exploitation efficiency of the focusing coil 8 and the tracking coil 9, more current is needed for displacing the objective lens 1, resulting in increased heat emission from the objective lens driving device. Such heat emission affects the operation of the semiconductor laser as the light source of the optical pickup device, resulting in obstruction to stable light beam oscillation.

In addition, the focusing coil 8 employed in the conventional objective lens driving device is a tubular wound coil and hence tends to be increased in self-inductance. Besides, the upstanding portion 12 of the yoke 12 of the magnetic circuit 4 is inserted into the tubular focusing coil 8, the upstanding piece 12 acts as an iron core for further increasing the self-inductance of the focusing coil 8. Should the self-inductance of the focusing coil 8 be increased in this manner, the phase rotation is increased acutely beyond 180° in the high frequency range of the focusing error signal when the driving current corresponding to the focusing error signal is fed to the focusing coil 8 via the driving control circuit for displacing the objective lens 1, with the consequence that focusing control corresponding to the focusing error signal becomes infeasible. For avoiding such focusing control infeasibility, electrical phase correction is carried out on the side of the control circuit detecting the focusing error signal for supplying the control circuit to the focusing coil 8. Should the phase correction value be increased, high harmonic components of the driving current supplied to the focusing coil 8 are increased in proportion to the correction value, thereby increasing the power consumption. Should the power consumption be increased, the operation of the semiconductor laser constituting the optical pickup device tends to be unstable.

OBJECTS AND SUMMARY OF THE INVENTION.

It is therefore an object of the present invention to provide an objective lens driving device wherein the focusing coil or the tracking coil can be mounted and assembled easily and accurately on a bobbin for enabling stable driving and displacement of the objective lens.

It is another object of the present invention to provide an objective lens driving device whereby the objective lens may be displaced to follow up accurately with the focusing or tracking error signals.

It is a further object of the present invention to provide an objective lens driving device wherein the consumption of the power necessary for displacing the objective lens and heat evolution during driving of the objective lens may be suppressed in order to assure stable operation of the semiconductor laser as the light source radiating a light beam on the optical disc via the objective lens and in order to enable the recording and/or reproduction of information signals with excellent characteristics.

It is a further object of the present invention to provide an optical pickup device which can be assembled easily by employing an objective lens driving device which can be assembled easily and which enables stable displacement of the objective lens.

It is yet another object of the present invention to provide an optical pickup device which is small-sized and light-weight and which can be reduced in thickness.

In one aspect, the present invention provides an objective lens driving device comprising a movable part consisting of a bobbin holding an objective lens at one end thereof and having an opening at a mid portion thereof, a plurality of resilient supporting members movably supporting the movable part in a direction parallel to the optical axis of the objective lens and in a planar direction normal to the optical axis, and a magnetic circuit unit having a flat-plate-shaped member carrying a flat-plate-shaped focusing coil and a flat-plate-shaped tracking coil and having its surface extending parallel to the optical axis of the objective lens and at least one magnet mounted facing the focusing coil and the tracking coil mounted on the flat-plate-shaped member and adapted for driving the movable part in the direction parallel to the optical axis of the objective lens and in the planar direction normal to the optical axis in cooperation with the focusing and tracking coils.

The objective lens driving device may be of a movable coil type device in which the flat-plate-shaped member of the magnetic circuit unit carrying the focusing coil and the tracking coil is mounted on the movable side.

The objective lens driving device may also be of a movable magnet type device in which the magnet of the magnetic circuit unit is mounted on the movable side.

In another aspect, the present invention provides an objective lens driving device in which the focusing coil is constituted by at least one rectangular coil having its long side extending parallel to the longitudinal direction of the flat-plate-shaped member, the tracking coil is constituted by at least two rectangular coils each having its long side extending normal to the longitudinal direction of the flat-plate-shaped member, the focusing coil and the tracking coil are arranged on the surface of the flat-plate-shaped member in a stacked manner, and in which at least one of sides of the focusing coil extending parallel to the longitudinal direction of the flat-plate-shaped member and mutually adjacent sides of at least two rectangular coils making up the tracking coil are placed within a common magnetic flux.

In yet another aspect, the present invention provides an objective lens driving device in which the focusing coil is constituted by at least two rectangular coils each having its long side extending parallel to the longitudinal direction of the flat-plate-shaped member, and in which mutually adjacent long sides of at least two rectangular coils making up the focusing coil are placed within the common magnetic flux along with mutually adjacent long sides of at least two rectangular coils making up the tracking coil.

With the objective lens driving device according to the present invention, the resilient supporting members for movably supporting the movable part is formed of an electrically conductive material and the current is fed to the focusing coil and the tracking coil mounted on the flat-plate-shaped member mounted on the movable part.

In yet another aspect, the present invention provides an optical pickup device in which the objective lens driving device is mounted on a base member having guide supports on its lateral sides for engaging with a pair of parallel guide sections. On this base member are mounted a light emitting/light receiving composite device and a reflective mirror. The light emitting/light receiving composite device includes a light source, a light-receiving element for receiving the return light of a light beam radiated from the light source and a beam splitter for separating the light beam radiated from the light-receiving element and the return light from each other, and is mounted at a position rotated by approximately 45° about the optical axis of the objective lens mounted in the objective lens driving device. The reflective mirror is mounted directly below the objective lens and is mounted at a 45° inclined position about the optical axis of the objective lens and has its reflective surface inclined by 45° with respect to the optical axis of the objective lens.

If, with the objective lens driving device according to the present invention, the focusing coil is fed with the driving current corresponding to the focusing error signal, a driving force is produced, under the interaction between the focusing coil and the magnet of the magnetic circuit unit, for displacing the movable part in a direction parallel to the optical axis of the objective lens, for displacing the objective lens in such direction.

On the other hand, if the tracking coil is fed with the driving current corresponding to the tracking error signal, a driving force is produced, under the interaction between the tracking coil and the magnet of the magnetic circuit section, for displacing the movable part in a planar direction normal to the optical axis of the objective lens, for displacing the objective lens in such direction.

By mounting the flat-plate-shaped member on the movable part, the focusing coil and the tracking coil mounted on the flat-plate-shaped member are displaced in the directions parallel and normal to the optical axis of the objective lens in unison with the movable part.

By mounting the flat-plate-shaped member carrying the focusing coil and the tracking coil on the movable part and forming the resilient supporting members supporting the movable part of an electrically conductive material, the driving current supplied to the focusing coil and the tracking coil is fed via the resilient supporting members.

In addition, with the optical pickup device according to the present invention, the light beam radiated from the lens light source falls on the objective lens after its optical axis is bent 90° by the reflective mirror.

Furthermore, with the optical pickup device of the present invention, the light emitting/light receiving composite device, made up of the laser light source and the light-receiving element receiving the return light of the light beam outgoing from the laser light source, is mounted on the base member so that the optical axis of the light beam radiated from the laser light source makes an angle of approximately 45° about the optical axis of the objective lens of the objective lens driving device mounted on the base member so that the optical pickup device in its entirety is reduced in width in an amount corresponding to the inclination of the light emitting/light receiving composite device.

Other objects and advantages of the present invention will become more apparent from the following description of the preferred embodiments an the claims.

BRIEF DESCRIPTION OF THE DRAWINGS

FIG. 8 is a front view showing the facing state of the focusing coil and the magnet in the conventional objective lens driving device shown in FIG. 5.

DETAILED DESCRIPTION OF PREFERRED EMBODIMENTS

Figure 1:
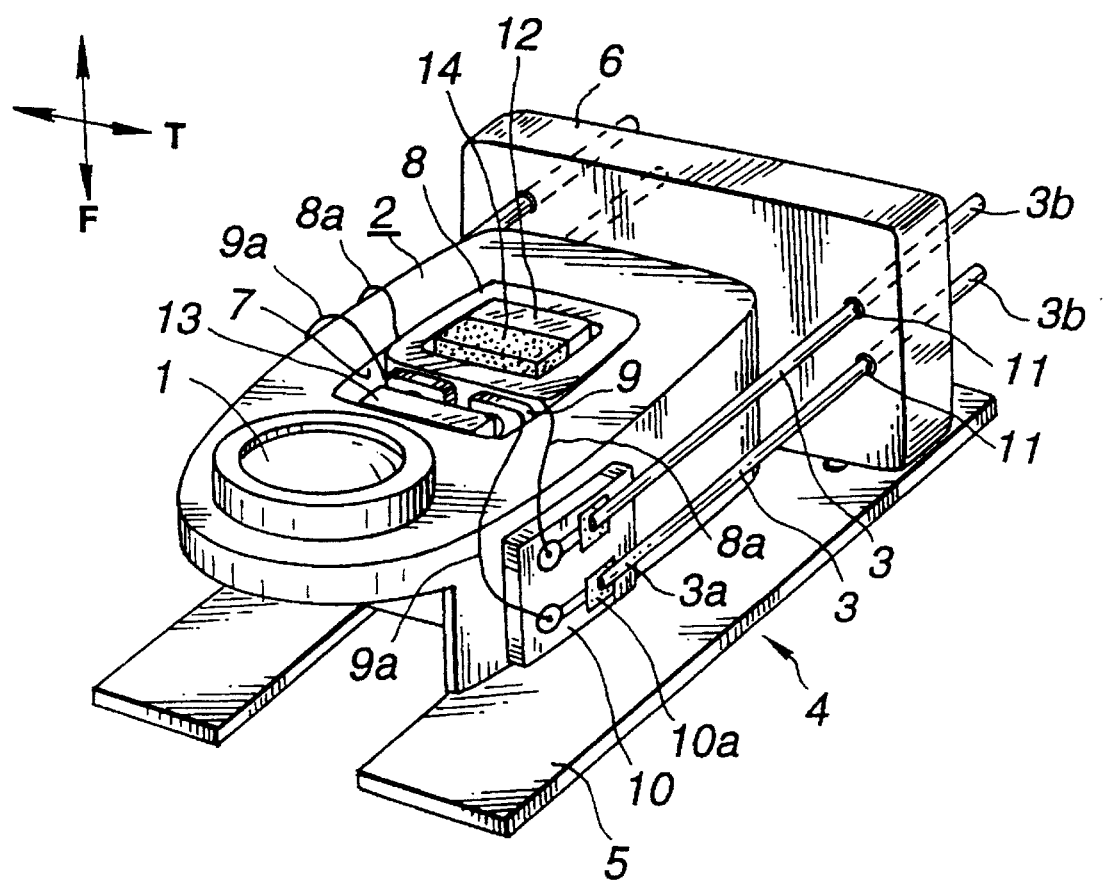
FIG. 1 is a perspective view showing a conventional objective lens driving device.
Figure 2:
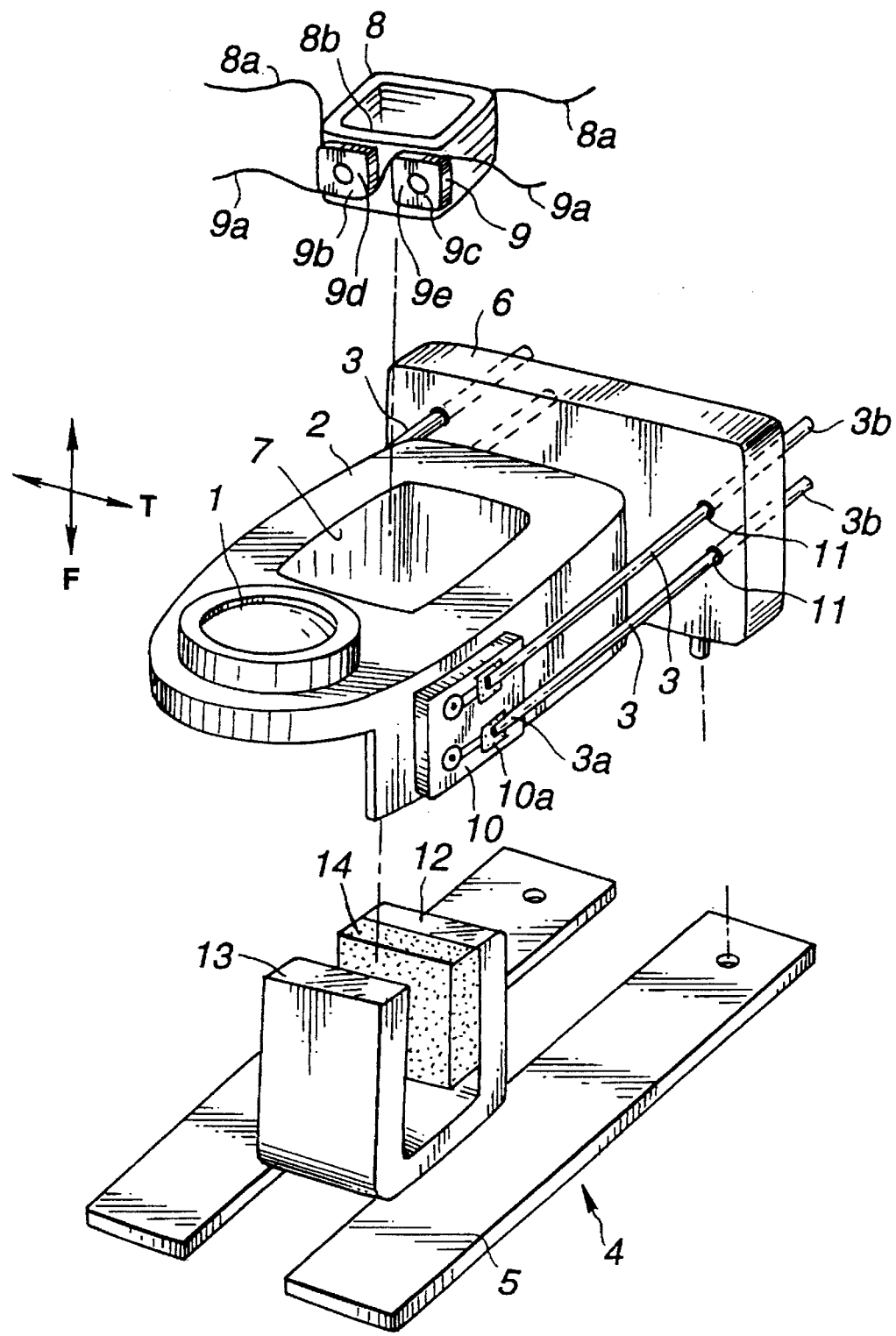
FIG. 2 is an exploded perspective view of the conventional objective lens driving device shown in FIG. 1.
Figure 3:
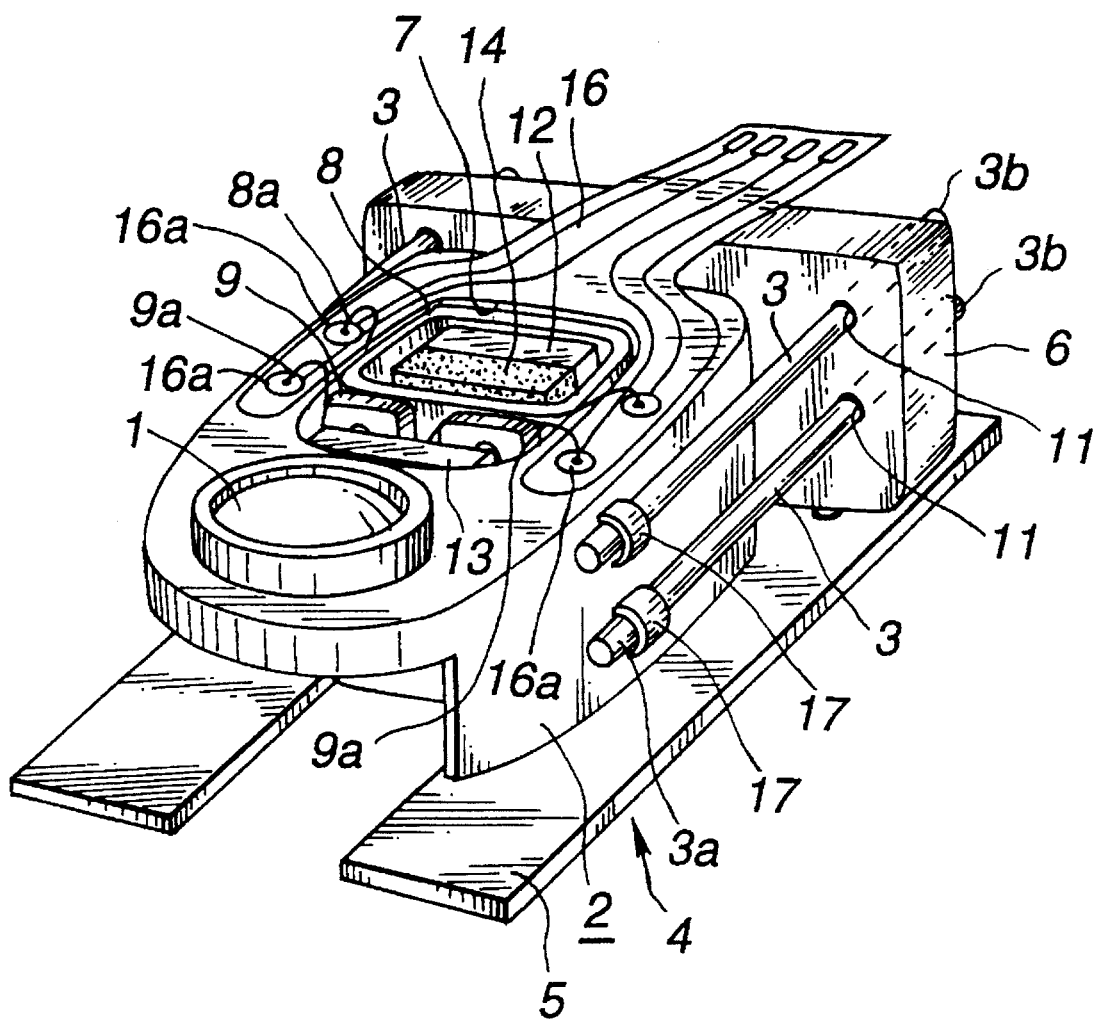
FIG. 3 is a perspective view showing another conventional objective lens driving device.
Figure 4:
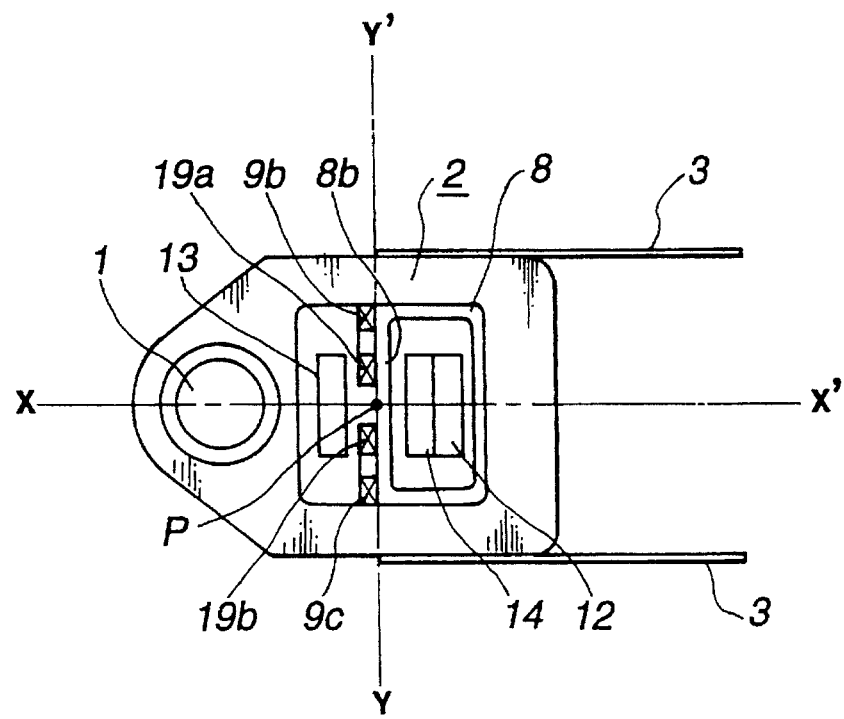
FIG. 4 is a plan view showing the disposition of a focusing coil, a tracking coil and a magnetic circuit in still another conventional objective lens driving device.
Figure 5:
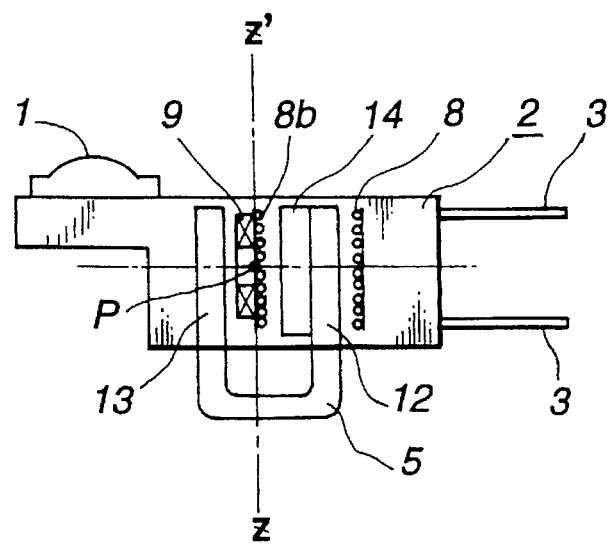
FIG. 5 is a cross-sectional view showing the disposition of a focusing coil, a tracking coil and a magnetic circuit in still another conventional objective lens driving device.
Figure 6:
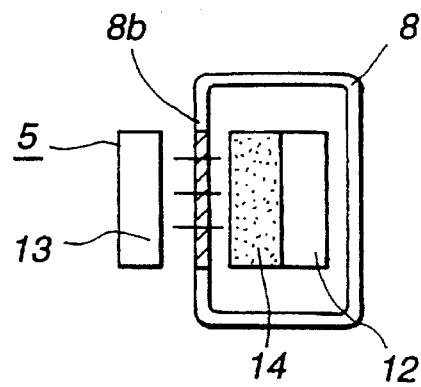
Figure 7:
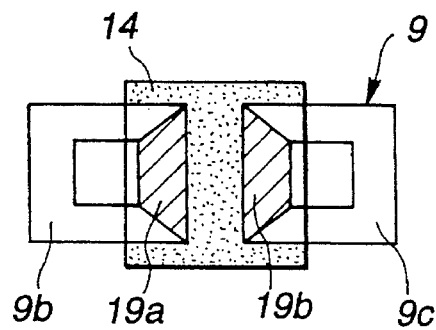
FIG. 7 is a front view showing the facing state of the tracking coil and the magnet in the conventional objective lens driving device shown in FIG. 5.
Figure 8:
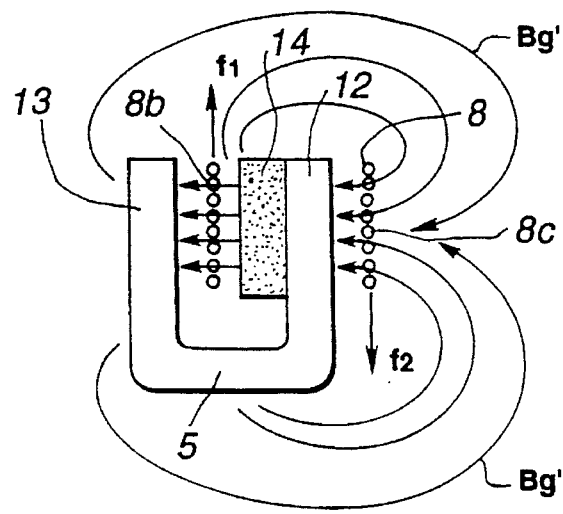
FIG. 8 is a plan view showing the state of the magnetic flux of the magnetic circuit and the focusing coil in the conventional objective lens driving device shown in FIG. 5.

Referring to the drawings, preferred embodiments of the present invention will be explained in detail.

Figure 9:
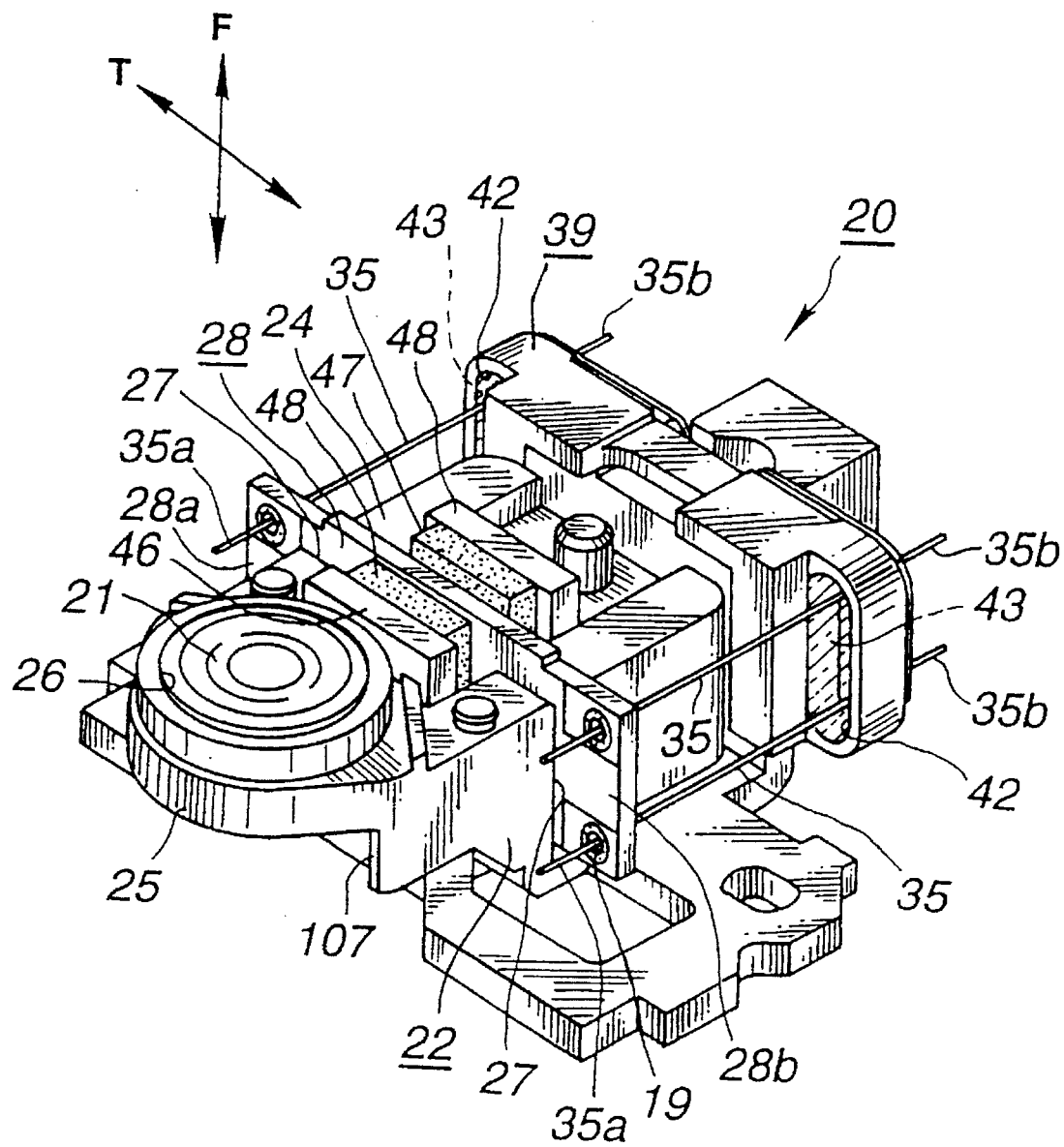
FIG. 9 is a perspective view showing a movable coil type objective lens driving device according to the present invention.

An objective lens driving device 20 according to the present invention is first explained. Referring to FIG. 9, the objective lens driving device 20 includes a bobbin 22 holding an objective lens 21 at one end and constituting a movable unit along with the objective lens 21. The light beam radiated from a semiconductor laser as a light source is collected and radiated on the signal recording surface of the optical disc via the objective lens 21. Also the light reflected back from the optical disc is incident on the objective lens 21.

Figure 10:
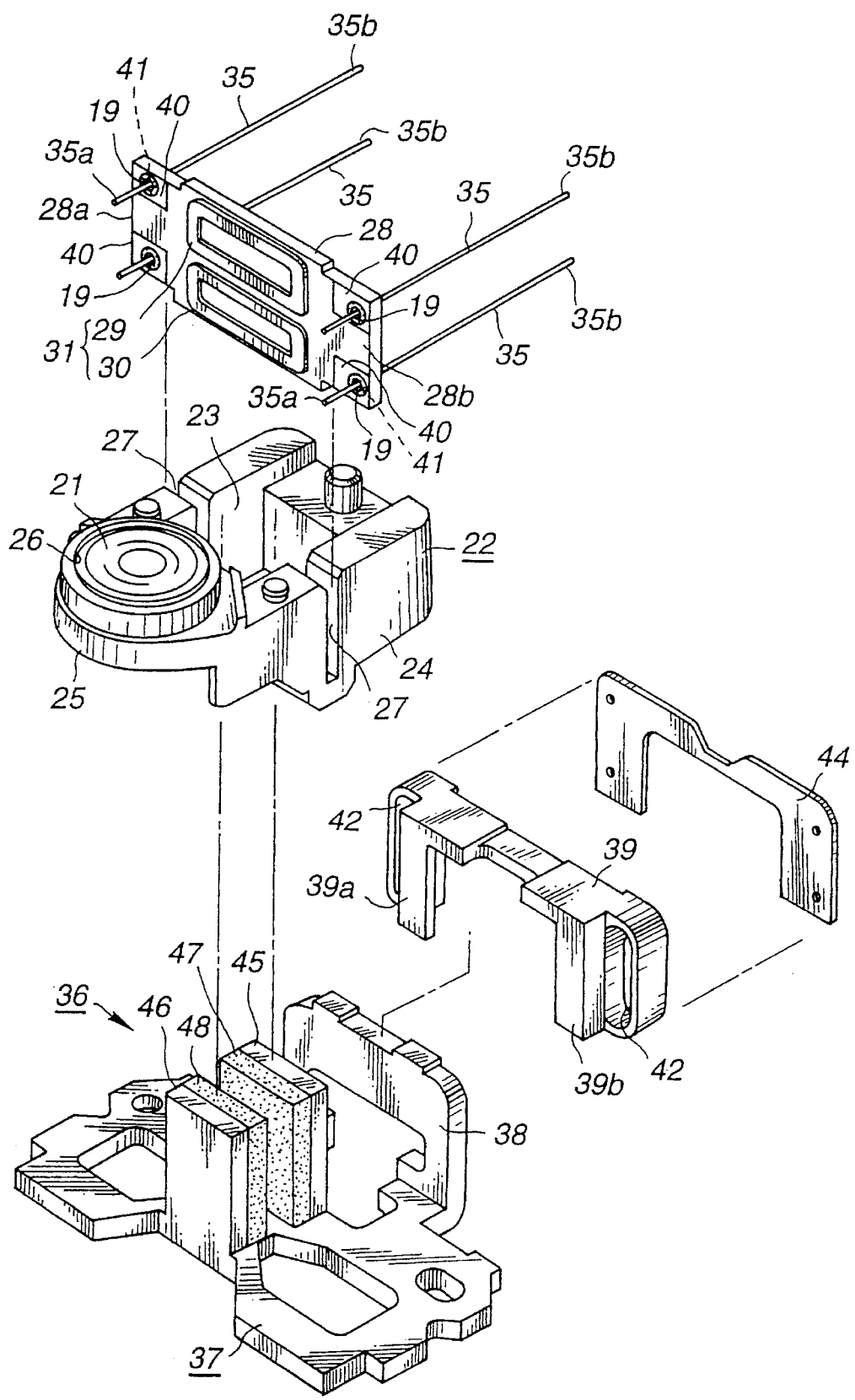
FIG. 10 is an exploded perspective view showing the objective lens driving device shown in FIG. 9.

The bobbin 22 constituting the movable part is formed by molding the synthetic resin, such as polystyrene, and is made up of a main bobbin member 24 having a rectangular central aperture 23 and an objective lens mounting portion 25 provided for being protruded laterally from an end of the main bobbin member 24, as shown in FIGS. 9 and 10. The objective lens 21 is mounted within a mounting recess 28 formed at a mid part of the objective lens mounting portion 25. The bottom surface of the mounting recess 28 is formed with a light transmitting opening for transmitting the light beam outgoing from the semiconductor laser and transmitted via the objective lens 21 and the return light reflected back from the objective lens 21 and transmitted through the objective lens 21.

The bobbin main member 24 has lateral sides having coil mounting plate inserting grooves 27, 27 traversing the opening 23. These grooves 27, 27 are formed for extending parallel to the optical axis of the objective lens 21 mounted on the objective lens mounting portion 25 for extending from the upper surface towards the lower surface of the main bobbin member 24, as shown in FIG. 10.

A coil mounting plate 28, formed as a flat rectangular plate member, is mounted via these inserting grooves 27, 27 in the bobbin 22. The coil mounting plate 28 is formed of a material, such as glass epoxy resin or synthetic resin, and is of an transversely elongated rectangular shape, such that, when the coil mounting plate is mounted by being introduced into the inserting grooves 27, 27, both end part 28a, 28b are protruded outward from both sides of the main bobbin member 24, as shown in FIG. 9.

Figure 11:
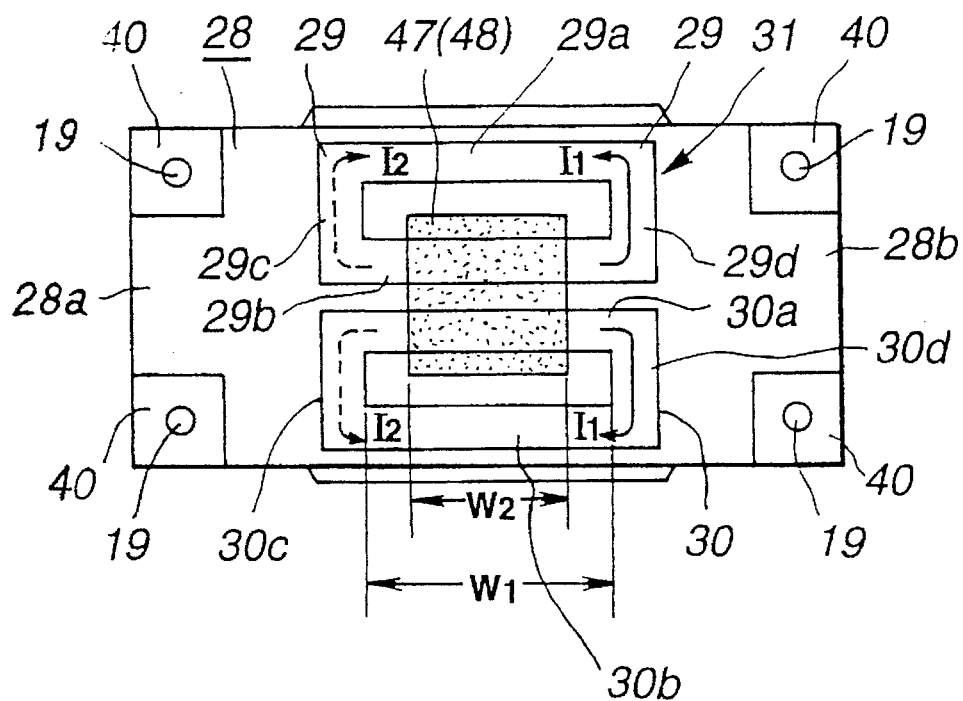
FIG. 11 is a front view showing the disposition of a focusing coil and a magnet making up the objective lens driving device shown in FIG. 9.
Figure 12:
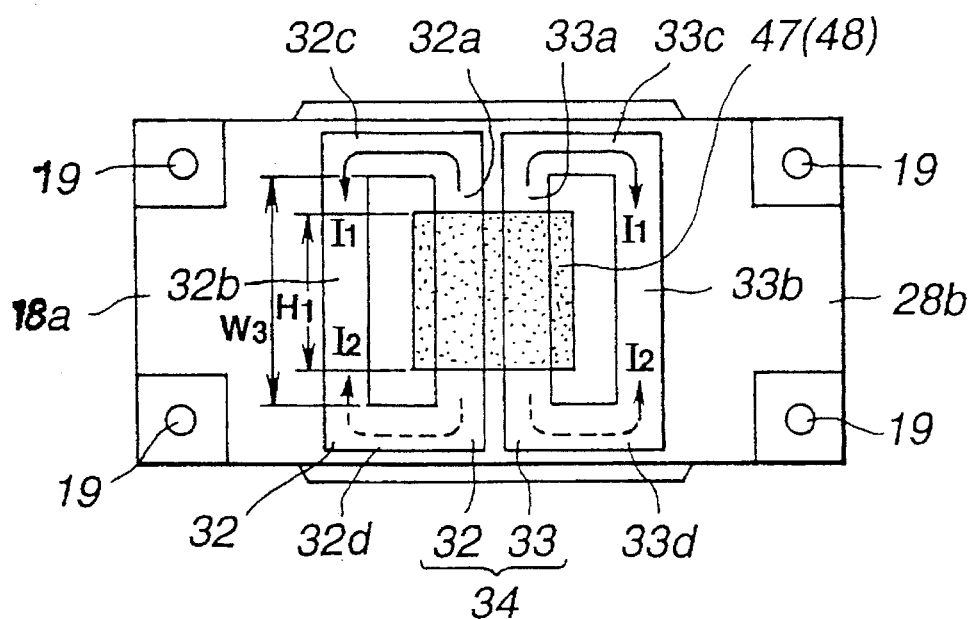
FIG. 12 is a front view showing the disposition of a tracking coil and a magnet making up the objective lens driving device shown in FIG. 9.

A focusing coil 31, made up of a pair of coil portions 29, 30 in the form of flat rectangular plate members, is mounted on a lateral side of the coil mounting plate 28, as shown in FIGS. 10 and 11. A tracking coil 34, made up of a pair of coil portions 32, 33 in the form of flat rectangular plate members, is mounted on the opposite lateral side of the coil mounting plate 28, as shown in FIG. 12. The coil portions 29, 30 and 32, 33, making up the focusing coil 31 and the tracking coil 34, are formed by etching a copper foil affixed to the coil mounting plate 28 of glass epoxy resin for generating rectangular coil patterns.

Since it suffices if the focusing coil 31 and the tracking coil 34, respectively made up of the coil portions 29, 30 and 32, 33, are in the form of flat rectangular plate members, the coils 31, 34 may be formed by winding a coil wire into a flat rectangular profile. The coil portions 29, 30 and 32, 33, formed by winding the coil wire, are affixed to both lateral sides of the coil mounting plate 28 using an adhesive.

The coil mounting plate 28, thus fitted with the focusing coil 31 and the tracking coil 34, is inserted across the inserting grooves 27, 27 of the coil mounting plate 2 so as to be fixedly mounted in position on the bobbin 2 so that the plane including the focusing coil 31 and the tracking coil 34 is parallel to the optical axis of the objective lens 21 mounted on the bobbin 22. The coil mounting plate 28 is mounted in position on the bobbin 22 by the adhesive previously applied in the inserting grooves 27, 27.

The coil mounting plate 28 may also be fixedly mounted on the bobbin 22 by insertion molding, that is by placing the coil mounting plate 28 within a metal mold for molding the bobbin 22 for simultaneously mounting the plate 28 with the molding of the bobbin 22.

The objective lens 21 is mounted on the objective lens mounting portion 25 after mounting the coil mounting portion 28 on the bobbin 22 for preventing the objective lens 21 from being injured during attachment of the coil mounting plate 28 to the bobbin 22.

The bobbin 22, having the coil mounting plate 28 and the objective lens 21 mounted thereon as described above, is supported in a cantilevered fashion by a supporting holder 39 formed on a yoke 37 constituting a magnetic circuit unit 36 by means of plural wire-shaped resilient supporting members 35. The bobbin 22 is supported on opposite lateral sides thereof by the supporting holder 39 in a cantilevered fashion by each one pair of the resilient supporting members 35 whereby the bobbin 22 can be moved in the directions parallel and normal to the optical axis of he objective lens 21, with the resilient supporting members 35 as resiliently flexed portions. The resilient supporting members 35 are formed of an electrically conductive material, such as an elongated metal wire or an elongated metal plate spring.

For supporting the bobbin 22 by the four resilient supporting members 35, four through-holes 19 are bored in the end parts 28a, 28b on both lateral sides of the coil mounting plate 28 extended from both lateral sides of the bobbin main member 24. In these through-holes 19 are inserted the end portions of the four resilient supporting members 35. That is, the through-holes 19 for the resilient supporting members are formed in pairs near the corners of the end parts 28a, 28b of the coil mounting plate 28. Around the through-holes 19 are formed connection terminals 40 extended from coil ends of the focusing coil 31 and the tracking coil 34.

Each resilient supporting member 35 has its one end 35a introduced into the through-hole 19 and is secured to the coil mounting substrate 28 by a solder 41 applied on the connection terminal 40 from inside the through-hole 19. The solder 41 functions as an electrically connection portion between the connection terminal 40 and the resilient supporting member 35 formed of an electrically conductive material.

Since it suffices if each resilient supporting member 35 is secured to the coil mounting substrate 28 with electrical connection to the connecting terminal 40, the solder 41 may be replaced by an electrically conductive adhesive.

Figure 14:
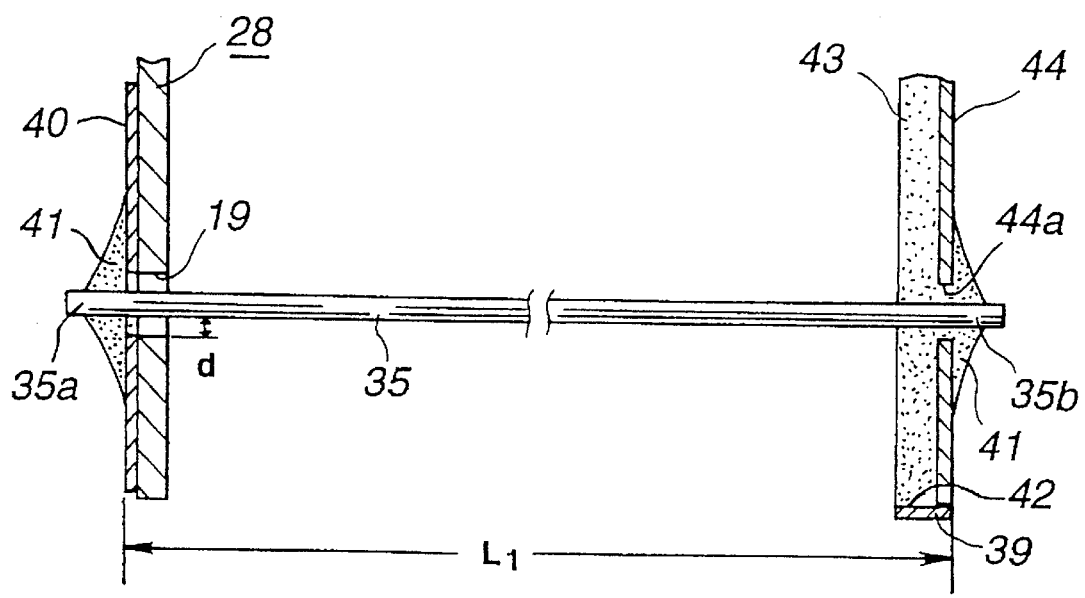
FIG. 14 is a cross-sectional side view showing the mounting state of a resilient supporting member supporting the bobbin.
Figure 15:
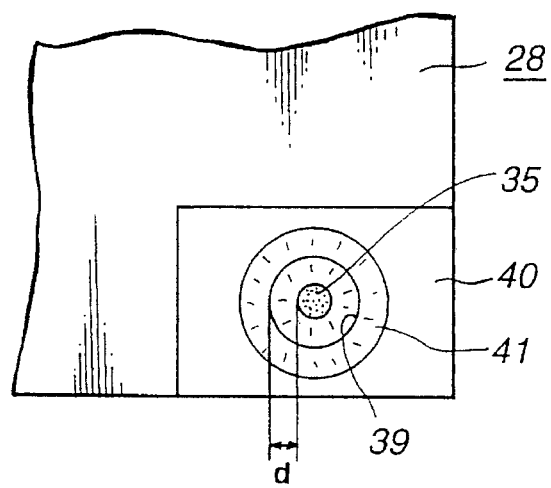
FIG. 15 is a partial front view showing the mounting state of the resilient supporting member on the coil mounting substrate.

Each of the four resilient supporting members 35, supporting the bobbin 22 on its one end via the coil mounting substrate 28 as described above, has its opposite end 35b fixedly supported by the supporting holder 39, in both lateral end parts of which are formed openings 42, 42. In these openings are charged dampers 43 formed of visco-elastic materials and capable of attenuating or absorbing the vibrations, as shown in FIGS. 9 and 14. Each of the resilient supporting members 35 has its opposite end 35b inserted through the damper 43 and thereby fixedly secured in the supporting holder 39. By fixedly supporting the ends 35b of the resilient supporting members 33 by the supporting holder 39 by means of the dampers 43, it becomes possible to prevent deleterious vibrations of the resilient supporting members 35 during displacement of the objective lens 21 and the resulting resonance so that the objective lens 21 can be displaced with high response to the focusing and tracking errors.

In addition, each resilient supporting member 35, secured to the supporting member 39 via the damper 43, is electrically connected to a flexible printed circuit board 44 connected in turn to an objective lens driving controlling circuit, not shown, mounted on the back side of the supporting holder 39 opposite to the bobbin mounting side. Each resilient supporting member 35 is connected to the flexible printed circuit board 44 by introducing the end of each resilient supporting member 35 through a through-hole 44a bored in the flexible printed circuit board 44 and applying the solder or the like electrically conductive adhesive on the connection pattern from around the opposite end of each resilient supporting member 35.

Since the ends 35a and the opposite ends 35b of the resilient supporting members 35 are passed through the through-holes 19 bored in the coil mounting substrate 28 and the through-holes 44a bored in the flexible printed circuit board 44, so that the resilient supporting members are supported around their entire periphery by the solder 41 or the electrically conductive adhesive, the electrical and mechanical connection of the resilient supporting members 35 to the coil mounting substrate 28 or the flexible printed circuit board 42 may be improved in reliability.

The through-hole 19 in the coil mounting substrate 28 and the through-hole 44a in the flexible printed circuit board 44, respectively passed through by the ends 35a and the opposite ends 35b of the resilient supporting member 35, are each of a circular shape dimensioned for defining a gap d just large enough to prevent the solder 41 or the electrically conductive adhesive from intruding into a space between the through-holes 19, 44a and the resilient supporting members 35, as shown in FIG. 14.

With the ends 35a and 35b of the resilient supporting members 35 introduced into the through-holes 19 formed in the coil mounting substrate 28 and into the through-hole 44a formed in the flexible printed circuit board 44, the solder 41 or the electrically conductive adhesive is coated around the ends 35a or 35b of the supporting members 35 protruded from the surfaces of the substrate 28 or the printed circuit board 44. By fixedly supporting the ends 35a, 35b of the resilient supporting members 35 to the coil supporting substrate 28 and the flexible printed circuit board 44, as supporting members, by the solder 41 or the electrically conductive adhesive, it becomes possible to accurately define the length $L_1$ of each resilient supporting member 35, as shown in FIG. 14. That is, the length $L_1$ of the resiliently deflectable resilient supporting member 35 can be accurately defined with respective outer surfaces of the coil mounting substrate 28 and the flexible printed circuit board 44.

The yoke 37 constituting the magnetic circuit unit 38 has a pair of upstanding pieces 45, 48 at a mid portion, and a holder mounting portion 38 carrying the supporting holder 39 supporting the bobbin 22 by means of the resilient supporting members 35, as shown in FIG. 10. The opposing surfaces of the upstanding pieces 45, 48 are respectively fitted with magnets 47, 48 designed to produce a driving force of displacing the objective lens 21 in the directions parallel and normal to the optical axis of the objective lens 21 in cooperation with the focusing coil 31 and the tracking coil 34 provided on the coil mounting substrate 28.

The holder mounting portion 38 is formed upright on the back surface of the yoke 37 parallel to the upstanding pieces 45, 48 respectively carrying the magnets 47, 48. The supporting holder 39 is mounted on the yoke 37 by having engaging supports 39a, 39b engaged on both lateral sides of the holder mounting portion 38. When the supporting holder 39 is mounted in this manner on the yoke 35, the upstanding pieces 45, 48 carrying the magnets 47, 48 are inserted in the aperture 23 bored in the bobbin 22. The coil mounting plate 28 is located between the upstanding pieces 45, 46, while the focusing coil 31 and the tracking coil 34 are positioned in a magnetic gap $G_1$ defined between the magnetic 47, 48, as shown in FIG. 13B, for completing the object lens driving device as shown in FIG. 9.

The constitution of the focusing coil 31 and the tracking coil 34 provided on the coil mounting substrate 28 and that of the yoke 37 having the magnets 47, 48 facing these coils 31, 34 and the upstanding pieces 45, 46 carrying the magnets 47, 48, are hereinafter explained.

The coil portions 29, 30 of the focusing coil 31 are formed as flat rectangular sections having horizontal portions 29a, 29b and 30a, 30b, extending in a direction parallel to the longitudinal direction of the coil mounting substrate 28, which is a direction orthogonal to the optical axis of the objective lens mounted on the bobbin 22, as the long sides, and having vertical portions 29c, 29d and 30c, 30d, extending in a direction parallel to the short sides of the coil mounting substrate 28, which is a direction parallel to the optical axis of the objective lens 21, as the short sides, as shown in FIG. 11. These coil portions 29, 30 are formed in mutually opposite winding directions and are mounted side-by-side on a lateral side of the coil mounting substrate 28 with a small gap between the respective adjoining horizontal portions 29a, 30a. The coil portions 29 and 30 are formed as rectangular sections of such lengths that, when the objective lens 21 is displaced in the tracking direction, which is a planar direction normal to its optical axis, the vertical portions 29c, 29d, 30c, 30d thereof are not disposed within the magnetic gap $G_1$ defined between the magnets 47, 48. That is, the coil portions 29, 30 of the focusing coil 31 are of such length that the inner distance $W_1$ between the vertical portions 29c, 29d or between 30c, 30d is equal at least to the width $W_2$ of each of the magnets 47, 48 added to the displacement of the objective lens 1 in the tracking direction, in order to prevent wasteful driving force other than that required for driving the objective lens 21 in a direction parallel to its optical axis from being generated by the driving current supplied to the focusing coils 29, 30 by the vertical portions 29c, 29d, 30c, 30d being positioned within the magnetic gap $G_1$ defined between the magnets 47, 48.

The coil portions 32, 33 of the tracking coil 34 are formed as flat rectangular sections having vertical portions 32a, 32b and 33a, 33b, extending in a direction parallel to the short sides normal to the longitudinal direction of the coil mounting substrate 28, which is a direction parallel to the optical axis of the objective lens mounted on the bobbin 22, as the long sides, and having horizontal portions 32c, 32d and 33c, 33d, extending in a direction parallel to the long sides of the coil mounting substrate 28, which is a direction orthogonal to the optical axis of the objective lens 21, as the short sides, as shown in FIG. 12. These coil portions 29, 30 are formed in mutually opposite winding directions and are mounted on the opposite lateral side of the coil mounting substrate 28 side-by-side with a small gap between the respective adjoining vertical portions 32a, 33a, as shown in FIG. 12. The coil portions 32 and 33 are formed as rectangular sections of such lengths that, when the objective lens 21 is displaced in the focusing direction, which is a direction parallel to its optical axis, the horizonal portions 32c, 32d, 33c, 33d thereof are not disposed within the magnetic gap $G_1$ defined between the magnets 47, 48. That is, the coil portions 32, 33 of the tracking coil 34 are of such length that the inner distance $W_3$ between the horizontal portions 32c, 32d or between 33c, 33d is equal at least to the height $H_1$ of each of the magnets 47, 48 added to the displacement of the objective lens 1 in the focusing direction. The coil portions 32, 33 are mounted on the coil mounting substrate 28 so that the vertical portions 32a, 33a of the coil portions 32, 33 adjacent to each other are disposed at a mid portion of the horizontal portions 29a, 30a of the coil portions 29, 30 of the focusing coil 31.

In the above embodiment, the focusing coil 31 and the tracking coil 34 are provided on opposite lateral sides of the coil mounting substrate 28. However, the coils 31, 34 may also be mounted in superposition on one or the opposite lateral surface of the coil mounting substrate.

With the above disposition of the focusing coil 31 and the tracking coil 34, when the bobbin 22 carrying the coil mounting substrate 28 carrying these coils 31, 34 is mounted on the magnetic circuit 38 by means of the supporting holder 39, the mutually adjacent horizontal sections 29a, 30a of the coil portions 29, 30 making up the focusing coil 31 and the mutually adjacent vertical sections 32a, 33a of the coil portions 32, 33 making up the tracking coil 34 are located within a common magnetic flux Bg within the magnetic gap $G_1$ defined between the magnets 47, 48, as shown in FIGS. 11 and 12.

The magnets 47, 48 are each magnetized along the thickness thereof to the same sole polarity, that is, the magnets 47, 48 are magnetized so that the opposite surfaces thereof are oppositely poled.

If the control current corresponding to the focusing error signal is fed from the objective lens driving controlling circuit to the coil portions 29, 30 making up the focusing coil 31 via the resilient supporting member 33, a driving force is generated under the interaction between the current $I_1$ or $I_2$ flowing through the mutually adjacent horizontal sections 29a, 30a and the magnetic flux Bg emanated from the magnets 47, 48 into the magnetic gap $G_1$ in a direction of displacing the bobbin 22 in a direction parallel to the optical axis of the objective lens 21. By this driving force, the bobbin 22 is resiliently displaced in a direction parallel to the optical axis of the objective lens 21. As a result, the objective lens 21 mounted on the bobbin 22 is displaced in a direction parallel to its optical axis, as indicated by arrow F in FIG. 9, for focusing controlling the light beam radiated by this objective lens 21.

Since the coil portions 29, 30 making up the focusing coil 31 are wound in mutually opposite winding directions, if the driving current $I_1$ or $I_2$ of the same direction is fed to these coils 29, 30, the current will flow in the same direction through the mutually adjacent horizontal portions 29a, 30a.

If the control current corresponding to the tracking error signal is fed from the objective lens driving controlling circuit to the coil portions 32, 33 making up the tracking coil 34 via the resilient supporting member 35, a driving force is generated under the interaction between the current $I_1$ or $I_2$ flowing through the mutually adjacent vertical sections 32a, 33a and the magnetic flux Bg emanated from the magnets 47, 48 into the magnetic gap $G_1$ in a direction of displacing the bobbin 22 in the direction orthogonal to the optical axis of the objective lens 21. By this driving force, the bobbin 22 is resiliently displaced in the planar direction orthogonal to the optical axis of the objective lens 21. As a result, the objective lens 21 mounted on the bobbin 22 is displaced in the planar direction normal to its optical axis, as indicated by arrow T in FIG. 1, for tracking controlling the light beam radiated by this objective lens 21.

Since the coil portions 32, 33 making up the tracking coil 34 are wound in mutually opposite winding directions, if the driving current $I_1$ or $I_2$ of the same direction is fed to these coils 32, 33, the current will flow in the same direction through the mutually adjacent horizontal portions 29a, 30a.

Figure 13:
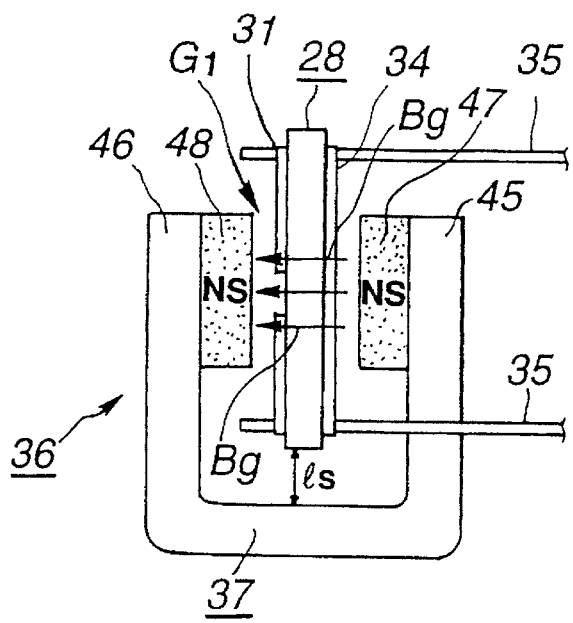
FIG. 13 is a side view showing the disposition of a magnetic circuit and a coil mounting substrate carrying the focusing coil and the tracking coil.

Between the lower edge of the coil mounting plate 28 and the upper surface of the yoke 37, there is provided a gap corresponding to the maximum stroke ls by which the focusing coil 31 is displaced in a direction indicated by arrow f in FIG. 1, as shown in FIG. 13, in order to prevent possible obstruction of displacement of the objective lens 21 in the direction indicated by arrow F in FIG. 9.

Since the planar coil mounting substrate 28 fitted with the focusing coil 31 and the tracking coil 34, made up of the planar coil portions 29, 30, 32, 33 is mounted on the bobbin 22, the focusing coil 31 and the tracking coil 34 in their entirety may be disposed facing the magnets 47, 48 of the magnetic circuit 36, so that no wasteful driving force is produced by the stray magnetic flux of the magnetic circuit 36.

On the other hand, since the planar coil mounting substrate 28 fitted with the focusing coil 31 and the tracking coil 34, made up of the planar coil portions 29, 30, 32, 33 is mounted on the bobbin 22, the focusing coil 31 and the tracking coil 34 can be mounted with high mounting accuracy relative to the bobbin 22, so that the movable center of gravity of the bobbin 22 may be accurately set to assure stable driving displacement of the objective lens 21.

With the above-described magnetic circuit 36, the upstanding pieces 45, 46 are provided on the mutually parallel upstanding pieces 45, 46 of the yoke 37, and the magnets 47, 48 each magnetized to the same polarity are mounted on the upper mutually opposite surfaces of the upstanding pieces 45, 46. Consequently, the effective magnetic flux Bg generating the driving force in cooperation with the focusing coil 31 and the tracking coil 34 is solely the magnetic flux radiated into the magnetic gap $G_1$ defined between the magnets 47, 48, while the portions of the focusing coil 1 and the tracking coil 34 generating the driving force in cooperation with the effective magnetic flux Bg are solely the horizontal sections 29a, 30a and the vertical sections 32a, 33a of the mutually adjacent coil portions 32, 33 positioned within the magnetic gap $G_1$.

Figure 16:
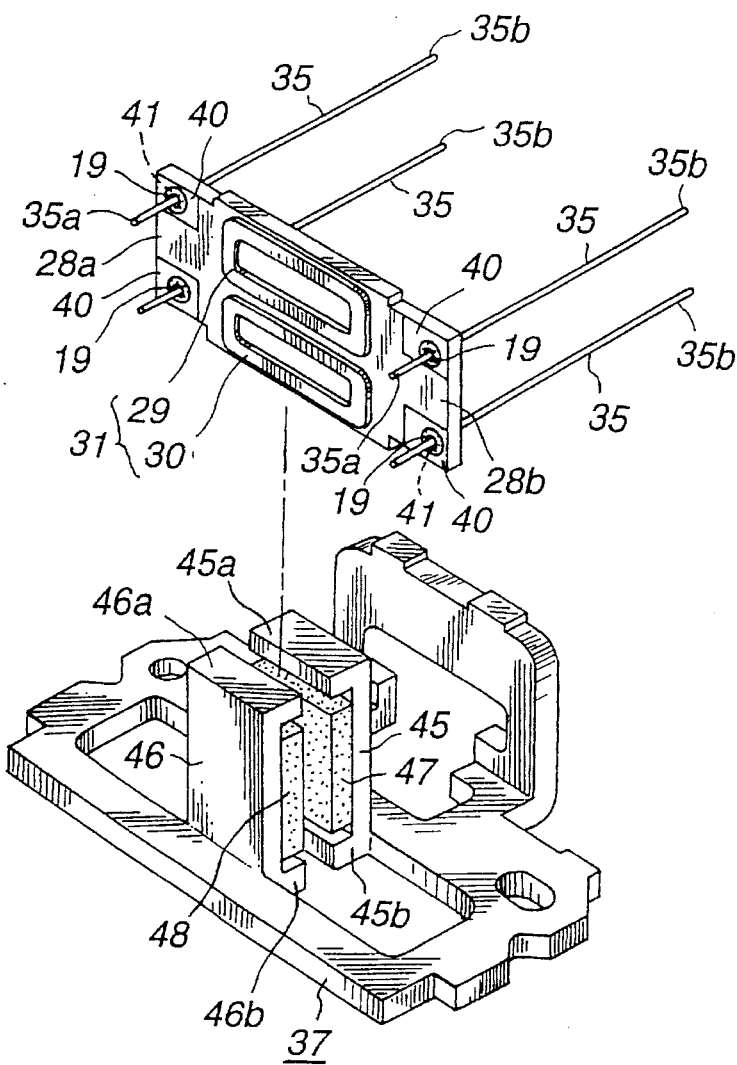
FIG. 16 is a perspective view showing another example of a magnetic circuit of the objective lens driving device shown in FIG. 9.
Figure 17:
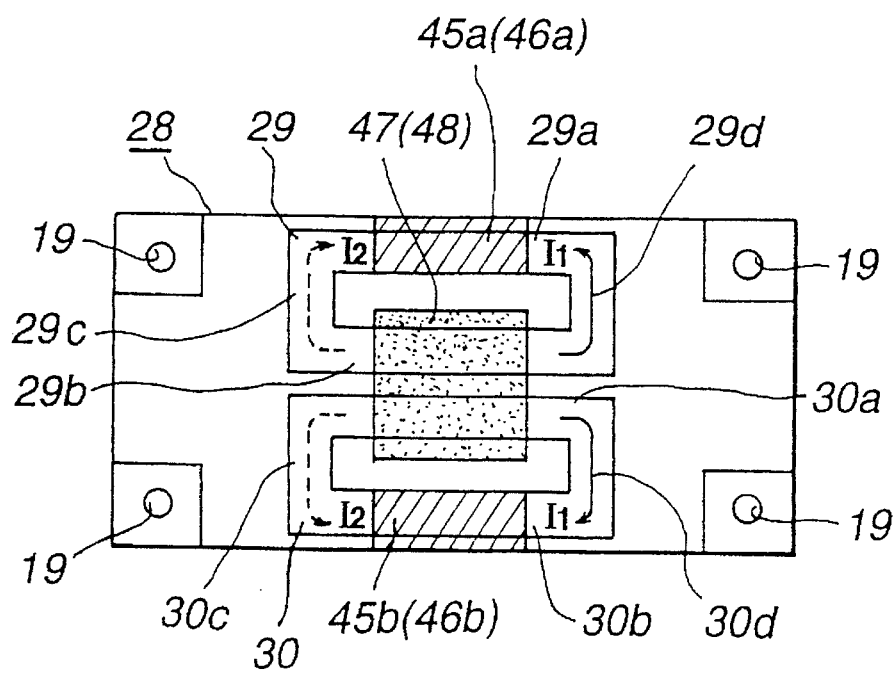
FIG. 17 is a front view showing the relative disposition between the focusing coil and the magnetic circuit shown in FIG. 18.
Figure 19:
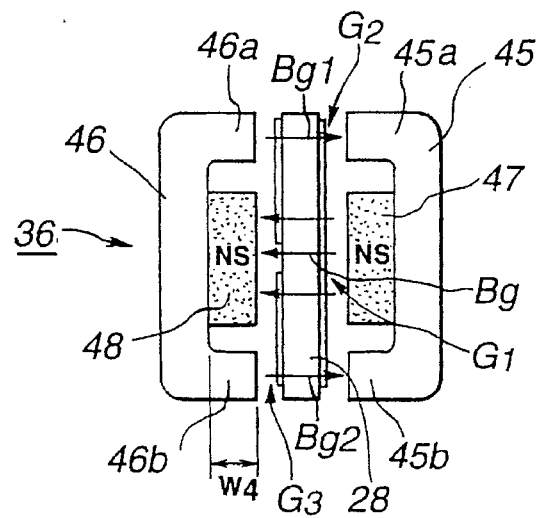
FIG. 19 is a side view showing the relative disposition between the coil mounting substrate and the magnetic circuit shown in FIG. 18.

For increasing the exploitation efficiency of the focusing coil 31, employed for generating the driving force, lugs 45a, 45b and 46a, 46b, are formed at the upper and lower ends of the surfaces of the upstanding pieces 45, 46 of the yoke 37 mounting the magnets 47, 48, so that these lugs approach and face the horizontal sections 29b, 30b of the coil portions 29, 30 constituting he focusing coil 31, as shown in FIGS. 16 and 19. These lugs 45a, 45b, 46a, 46b are bent with a width substantially equal to the thickness $W_4$ of the magnets 47, 48 and constitute magnetic gaps $G_2$, $G_3$, substantially equal to the magnetic gap $G_1$ defined between the magnetic 47, 48, at the horizontal sections 29a, 30a of the coil portions 29, 30. The magnetic flux emanated from the magnets 47, 48 is concentrated between these magnetic gaps $G_2$, $G_3$, so that effective magnetic fluxes $Bg_1$, $Bg_2$ acting on the opposite horizontal sections 29b, 30b of the coil portions 29, 30 are produced. The driving force of displacing the bobbin 22 in the direction parallel to the optical axis of the objective lens 21 is generated by the interaction between the magnetic fluxes $Bg_1$, $Bg_2$ between the magnetic gaps $G_2$, $G_3$ defined by the lugs 45a, 45b, 48a, 48b and the current flowing through the horizontal sections 29b, 30b of the coils 29, 30 disposed within the magnetic gaps $G_2$, $G_3$, thus improving the exploitation efficiency of the focusing coil 31 utilized for generating the driving force.

The magnetic fluxes $Bg_1$, $Bg_2$ radiated into the magnetic gaps $G_2$, $G_3$ defined by the lugs 45a, 45b, 48a, 48b and the magnetic flux Bg radiated into the space between the magnets 47 and 48 are reversed in their directions from one another, as shown in FIG. 19. However, when the driving current flowing in one direction is supplied to the coil portions 20, 30 of the focusing coil 31, the current flowing through the horizontal sections 29b, 30b of the rectangular coils 29, 30 and the current flowing through the horizontal sections 29a, 30a are reversed in direction from each other. Thus the driving force by the interaction between the magnetic fluxes $Bg_1$, $Bg_2$ of the magnetic gaps $G_2$, $G_3$ and the current flowing through the horizontal sections 29b, 30b disposed within the magnetic gaps $G_2$, $G_3$ and the driving force generated by the interaction between the current flowing through the horizontal sections 29a, 30a and the magnetic flux Bg radiated into the space between the magnets 47, 48 is identified in direction with each other. The result is the increased ratio of the generated driving force to the driving current supplied to the focusing coil 31, thereby achieving power saving of the objective lens driving device.

Figure 18:
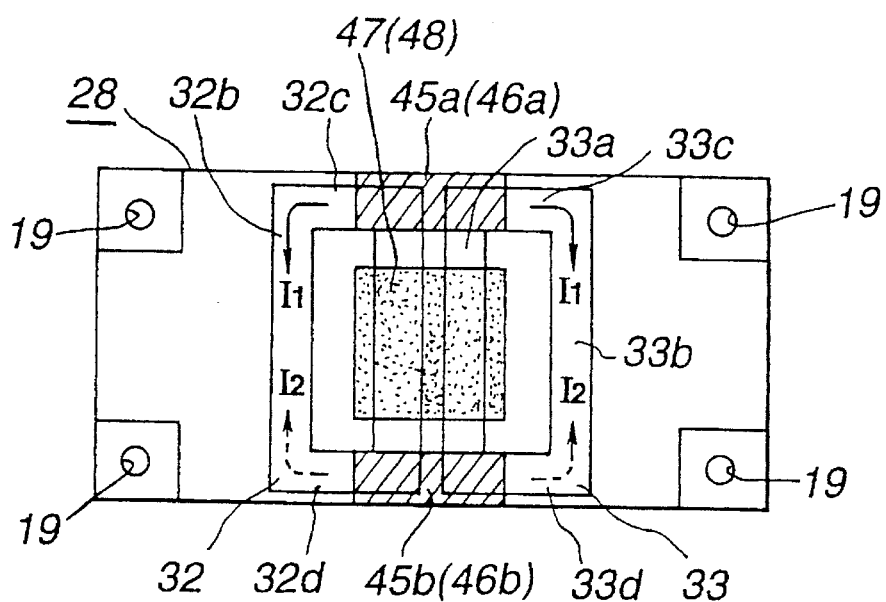
FIG. 18 is a front view showing the relative disposition between the tracking coil and the magnetic circuit shown in FIG. 18.

If the lugs 45a, 45b, 48a, 48b are provided on the upstanding pieces 45, 45 proximate to and facing the horizontal sections 29b, 30b of the coil portions 29, 30 of the focusing coil 31 for defining the magnetic gaps $G_2$, $G_3$ for generating the magnetic fluxes $Bg_1$, $Bg_2$ acting on the opposite side horizontal sections 29b, 30b, part of the horizontal sections 32c, 32d, 33c, 33d of the coil portions 32, 33 of the tracking coil 34, provided on the coil mounting substrate 28 in registration with the coil portions 29, 30 of the focusing coil 31, is positioned within the magnetic gaps $G_2$, $G_3$. There is generated a driving force of displacing the bobbin 22 in a direction parallel to the optical axis of the objective lens 21 by the interaction between the driving current flowing through the horizontal sections 32c, 32d, 33c, 33d of the coil portions 32, 33 and the magnetic fluxes $Bg_1$, $Bg_2$ within the magnetic gaps $G_2$, $G_3$. However, since the coil portions 32, 33 of the tracking coil 34 are wound in opposite winding directions, if the driving current flowing in one direction is supplied to the coil portions 32, 33, the current flows through the horizontal sections 32c, 32d and the horizontal sections 33c, 33d in opposite directions, as shown in FIG. 18. Thus the driving force generated by the interaction between the driving current flowing through the horizontal sections 32c, 32d of the coil portion 32 and that generated by the interaction between the driving current flowing through the horizontal sections 33c, 33d of the coil portion 33 are identified in direction and hence cancel each other without significantly affecting the driving force generated by the interaction between the driving current flowing through the coil portions 29, 30 making up the focusing coil 31 and the magnetic fluxes Bg, $Bg_1$, $Bg_2$ in the magnetic circuit 36.

Although two magnets 47, 48 are employed in the above-described magnetic circuit 36, only the magnet 47 suffices, in which case lugs 45a, 45b, 46a, 46b are formed on the upstanding pieces 45, 46 in proximity to and for facing the horizontal sections 29b, 30b of the coil portions 29, 30 of the focusing coil 31 and a raised area 48c is formed at a mid portion of the upstanding piece 48, not carrying the magnet 47, in proximity and facing the magnet 47. With the above-described magnetic circuit 36, magnetic gaps $G_1$, $G_2$, $G_3$ are defined between the lugs 45a, 45b provided on the upstanding piece 45 and the lugs 46a, 46b formed on the upstanding piece 46. The magnetic flux from the magnet 47 is concentrated in these magnetic gaps $G_1$, $G_2$, $G_3$ for producing the effective magnetic fluxes Bg, $Bg_1$, $Bg_2$ acting on the horizontal sections 29a, 29b and 30a, 30b of the coil sections 29, 30 of the focusing coil 31 disposed within these magnetic gaps $G_1$, $G_2$, $G_3$.

Figure 20:
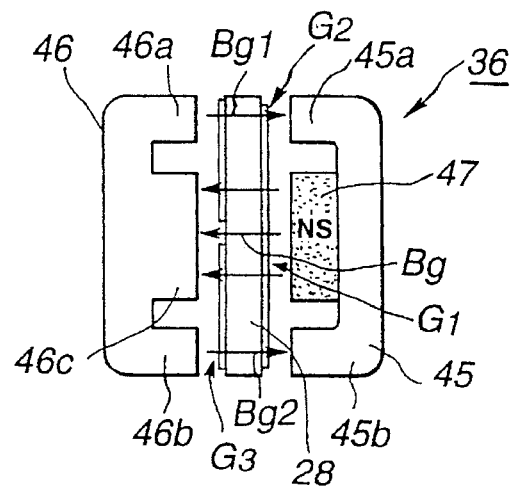
FIG. 20 is a side view showing still another example of a magnetic circuit of the objective lens driving device according to the present invention.
Figure 21:
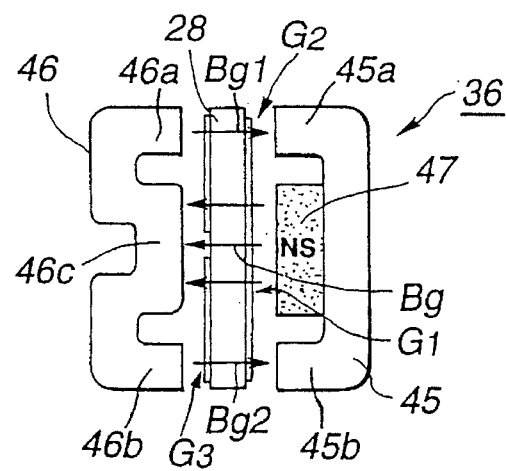
FIG. 21 is a side view showing a further example of a magnetic circuit of the objective lens driving device according to the present invention.

The lug 46 provided with the raised area 46c shown in FIG. 20 is formed by swaging a sole metal plate. However, the raised area 46c may also be formed facing the magnet 47 by bending a sole thin metal plate, as shown in FIG. 21.

The above-described constitution of the focusing coil 31 and the tracking coil 34 is specifically designed for improving the exploitation efficiency of the focusing coils 31, 40. However, for further improving the exploitation efficiency of the tracking coil 34 and the driving efficiency of the driving current supplied to the focusing coil 31 and the tracking coil 34, the disposition of the focusing coil 31 and the tracking coil 34 and the magnetic circuit unit 36 may also be set as shown in FIGS. 22 and 23.

Figure 22:
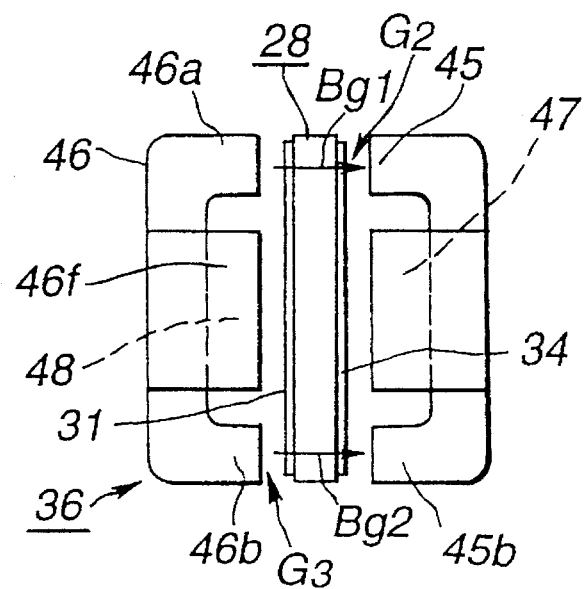
FIG. 22 is a side view showing the relative disposition between the coil mounting substrate and the magnetic circuit shown in FIG. 21.
Figure 23:
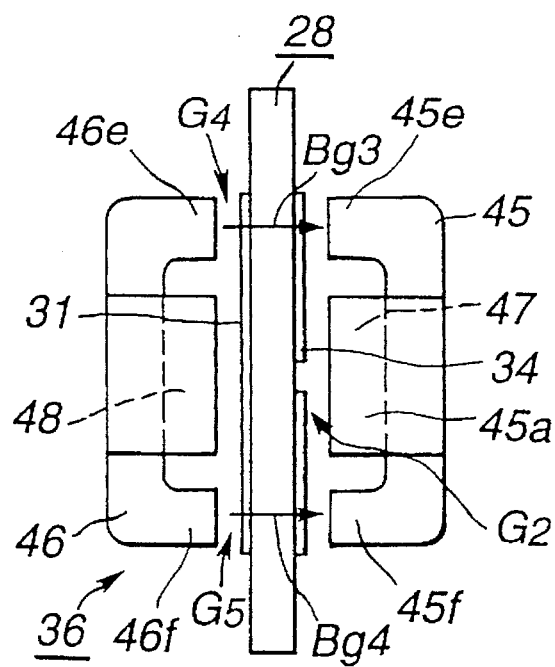
FIG. 23 is a side view showing the relative disposition between the coil mounting substrate and the magnetic circuit shown in FIG. 21.

Turning first to the constitution of the magnetic circuit unit 36, the magnetic circuit 36 has horizontally extending lugs 45a, 45b and 46a, 46b, proximate and opposite to each other, on the upper and lower ends of surfaces of the upstanding pieces 45, 46 of the yoke 37 carrying the magnets 47, 48, for defining magnetic gaps $G_2$, $G_3$, as shown in FIG. 22. In addition, the magnetic circuit 38 has vertically extending lugs 45e, 45f and 46e, 46f, proximate and opposite to each other, on both lateral sides of the surfaces of the upstanding pieces 45, 48 carrying the magnets 47, 48, for defining magnetic gaps $G_4$, $G_5$, as shown in FIG. 23.

Figure 24:
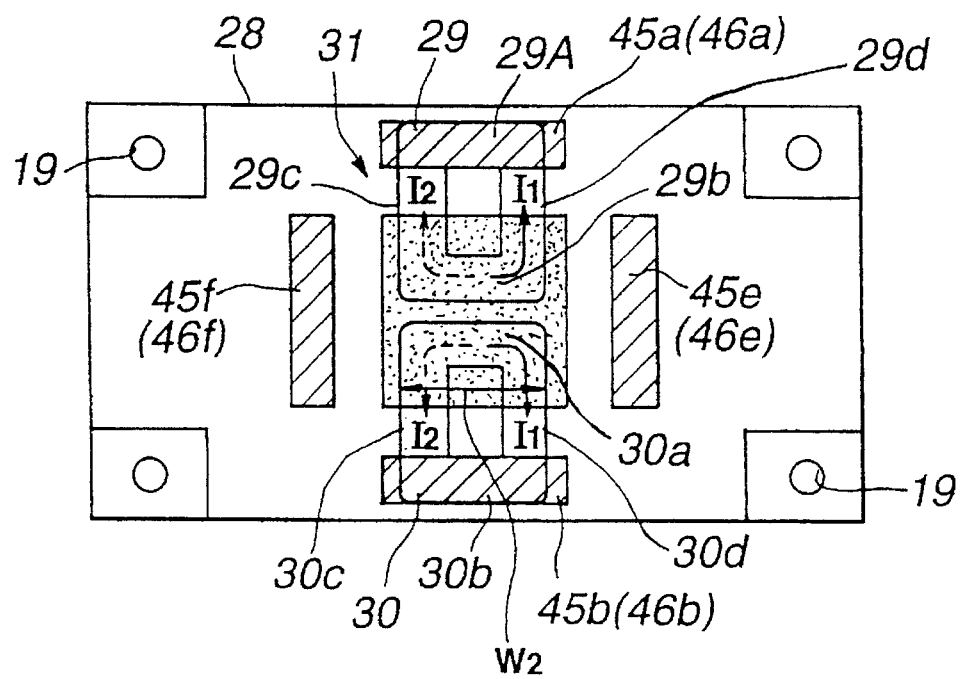
FIG. 24 is a front view showing the relative disposition between the coil mounting substrate and the magnetic circuit shown in FIG. 21.

On the one and opposite lateral surfaces of the coil mounting substrate 28 are mounted a pair of coil portions 29, 30 making up the focusing coil 31 and a pair of coil portions 32, 33 making up the tracking coil 34. The coil portions 29, 30 making up the focusing coil 31 are wound in a flat rectangular section having horizontal sections 29a, 29b, 30a, 30b parallel to the longitudinal direction of the coil mounting substrate 28 and vertical sections 29c, 29d, 30c, 30d parallel to the short side of the coil mounting substrate 28, and are mounted on a lateral surface of the coil mounting substrate 28 with the horizontal sections 29a, 30a lying adjacent to each other, as shown in FIG. 24. These coil portions 29, 30 are dimensioned so that the mutually adjacent horizontal sections 29a, 30a are located substantially at the center of the magnetic gap $G_1$ defined by the magnets 47, 48, the horizontal section 29b of the coil portion 29 is located in the magnetic gap $G_2$ defined by the vertically extending lugs 45a, 46a and the horizontal section 30b of the coil portion 30 is located in the magnetic gap $G_3$ defined by the horizontally extending lugs 45b, 46b.

The coil portions 29, 30 are each of a width $W_4$ such that, when the objective lens 21 is displaced in the tracking direction which is the planar direction normal to its optical axis, the vertical sections 29c, 29d, 30c, 30d are not faced by the magnetic gaps $G_4$, $G_5$ defined by the vertical lugs 45e, 45f, 46e, 46f.

Figure 25:
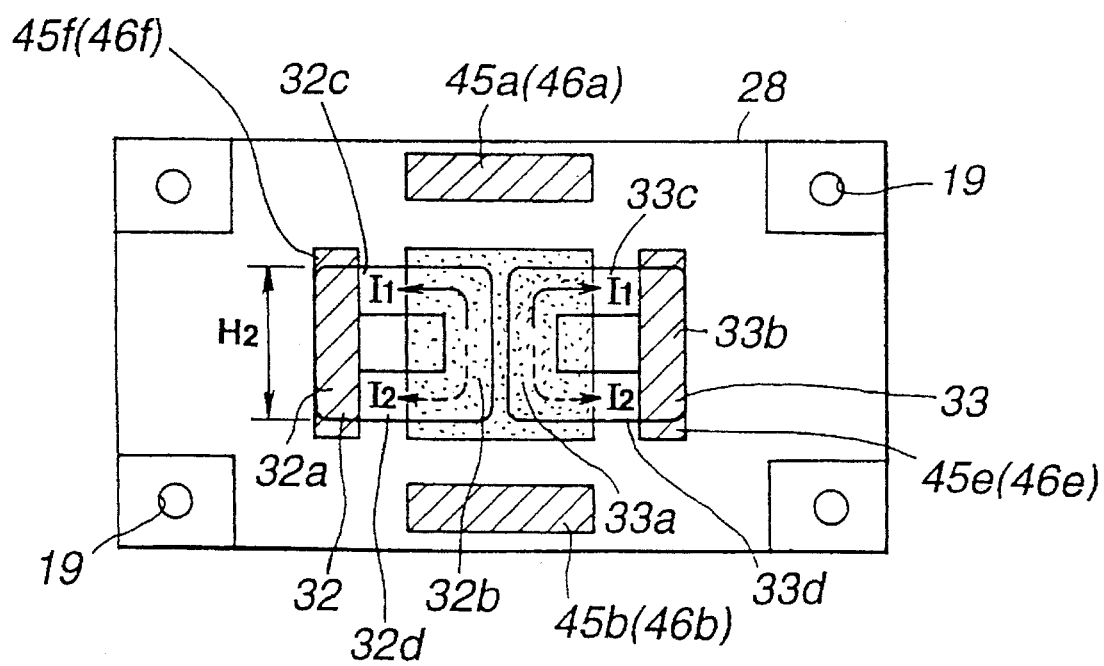
FIG. 25 is a front view showing the relative disposition between the tracking coil mounted on the coil mounting substrate and the magnetic circuit shown in FIGS. 22 and 23.

On one lateral surface of the coil mounting substrate 28, there are mounted a pair of coil portions 32, 33 making up the tracking coil 34, which are wound in the form of flat rectangular sections having pairs of vertical sections 32a, 32b, 33a, 33b parallel to the short sides orthogonal to the longitudinal direction of the coil mounting substrate 28 and pairs of horizontal sections 32c, 32d, 33c, 33d parallel to the longitudinal direction of the coil mounting substrate 28, and which are mounted on the coil mounting substrate with the vertical sections 32a, 33a lying adjacent to each other, as shown in FIG. 25. The coil pair 32, 33, making up the tracking coil 34, are dimensioned so that the mutually adjacent vertical sections 32a, 33a are located at a mid part of the magnetic gap $G_1$ defined by the magnets 47, 48, the vertical section 32b of the coil portion 32 is located within the magnetic gap $G_4$ defined by the vertical lugs 45e, 46e and the vertical section 33b of the coil portion 33 is located within the magnetic gap $G_5$ defined by the vertical lugs 45f, 46f. The coil portion 32, 33, making up the tracking coil 34, is of a height $H_2$ such that, when the objective lens 21 is displaced in the focusing direction parallel to its optical axis, the horizontal sections 32c, 32d, 33c, 33d are not faced by the magnetic gaps $G_2$, $G_3$.

By constituting the focusing coil 31 and the tracking coil 34 and the magnetic circuit 38 as described above, the horizontal sections 29a, 29b, 30a, 30b of the coil portions 29, 30 making up the focusing coil 31 are located within the magnetic gaps $G_1$, $G_2$, $G_3$ to which the magnetic fluxes Bg, $Bg_1$, $Bg_2$ are concentrated. On the other hand, the vertical sections 32a, 32b, 33a, 33b of the coil sections 32, 33 making up the tracking coil 34 are located within the magnetic gaps $G_1$, $G_4$, $G_5$.

Thus the exploitation efficiency of the coil portions 29, 30 and the coil portions 32, 33, respectively making up the focusing coil 31 and the tracking coil 34, employed for generating the driving force in cooperation with the magnetic flux from the magnetic circuit 38, is improved for improving the driving force by the driving current supplied to the focusing coil 31 and the tracking coil 34.

The magnetic circuit 38 employs the magnets 47, 48 each of which is magnetized to a sole polarity on its surface. The exploitation efficiency of at least the coil portions making up the focusing coil 31 may be improved by employing magnets 47, 48 each of which is magnetized to two polarities.

Figure 26:
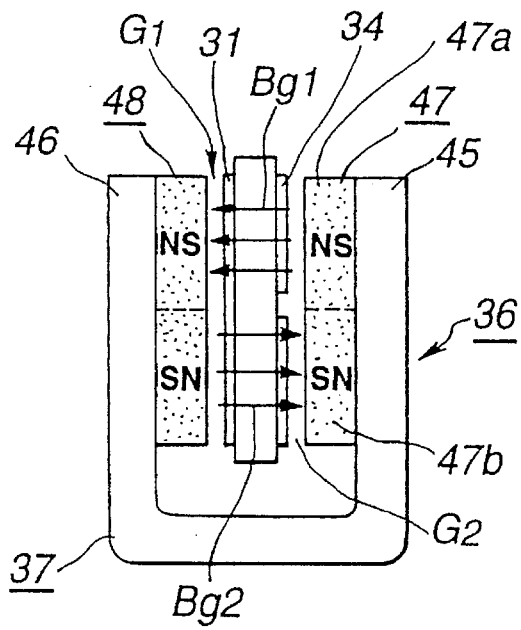
FIG. 26 is a side view showing the relative disposition between the coil mounting substrate and the magnetic circuit employing a two-pole magnet.
Figure 27:
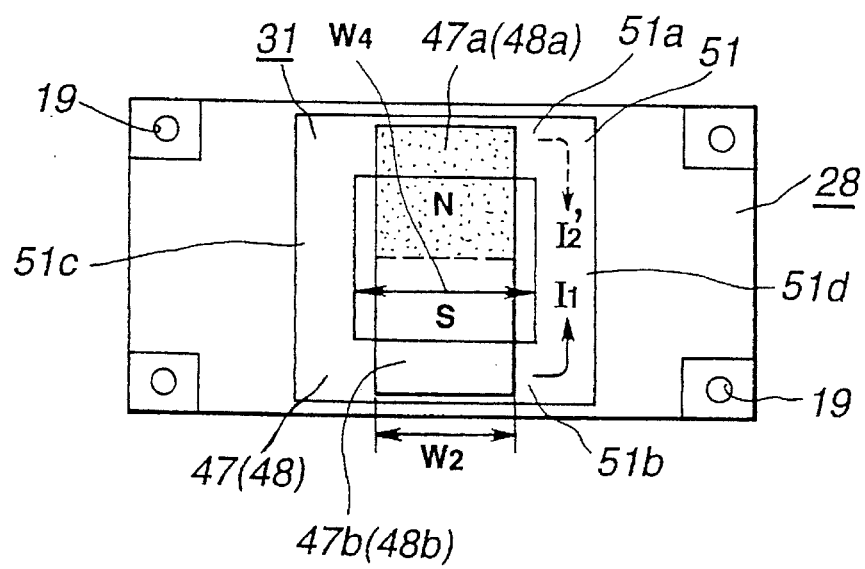
FIG. 27 is a plan view showing the relative disposition between the focusing coil and the magnetic circuit employing a two-pole magnet.

An embodiment in which the magnetic circuit 36 is constituted by employing the magnets 47, 48, each of which is magnetized to two polarities, is hereinafter explained. The magnets 47, 48 are polarized to two opposite polarities along the height parallel to the optical axis of the objective lens 21. These magnets 47, 48 have first magnetized portions 47a, 48a and second magnetized portions 47b, 48b, each being oppositely poled along the thickness thereof, as shown in FIG. 26. These first magnetized portions 47a, 48a and second magnetized portions 47b, 48b are placed side-by-side along the height as shown in FIG. 27. These magnets 47, 48 are mounted on the opposing inner lateral sides of the opposing upstanding pieces 45, 46 making up the yoke 37, with the first magnetized portions 47a, 48a defining the first magnetic gap $G_1$ and the second magnetized portions 47b, 48b defining the second magnetic gap $G_2$. Since the first magnetized portions 47a, 48a and the second magnetized portions 47b, 48b are oppositely poled, the magnetic fluxes $Bg_1$, $Bg_2$ opposite in direction are radiated into the magnetic gaps $G_1$, $G_2$.

The focusing coil 31 employed for the magnetic circuit 36 is constituted by a coil portion 51 in the form of a flat rectangular section. That is, the coil portion 51 constituting the focusing coil 31 is provided on a lateral surface of the coil mounting substrate 28 as a flat rectangular winding having a pair of horizontal sections 51a, 51b running parallel to the longitudinal direction of the coil mounting substrate 28 and a pair of vertical sections 51c, 51d running parallel to the short sides of the coil mounting substrate 28. The coil portion 51 is dimensioned so that its horizontal section 51a is positioned within the first gap $G_1$ defined by the first magnetized portions 47a, 48a and its horizontal section 51b is positioned within the second gap $G_2$ defined by the second magnetized portions 47b, 48b.

The coil portion 51 is of a width such that, when the objective lens 21 is displaced in the tracking direction which is the planar direction orthogonal its optical axis, the vertical sections 51c, 51d are not positioned within the first and second magnetic gaps $G_1$, $G_2$. Specifically, the width $W_5$ between the vertical sections 51c, 51d is set so as to be equal to the width $W_2$ of the magnet 47 or 48 added to the displacement of the objective lens 21 in the tracking direction.

If the driving currents $I_1$, $T_2$ flowing in one direction is fed to the coil portion 51 constituting the focusing coil 31, the currents flowing in the horizontal sections 51a, 51b are reversed in direction. However, since the first and second magnetized portions 47a, 48a, 47b, 48b are oppositely poled along the thickness, the magnetic fluxes $Bg_1$, $Bg_2$ in the first and second magnetic gaps $G_1$, $G_2$ are also reversed. Consequently, by supplying the driving current to the coil portion 51, the driving force can be obtained in the focusing direction, which is the direction parallel to the optical axis of the objective lens 21, by simultaneously employing the horizontal sections 51a, 51b of the coil portion 51.

Figure 28:
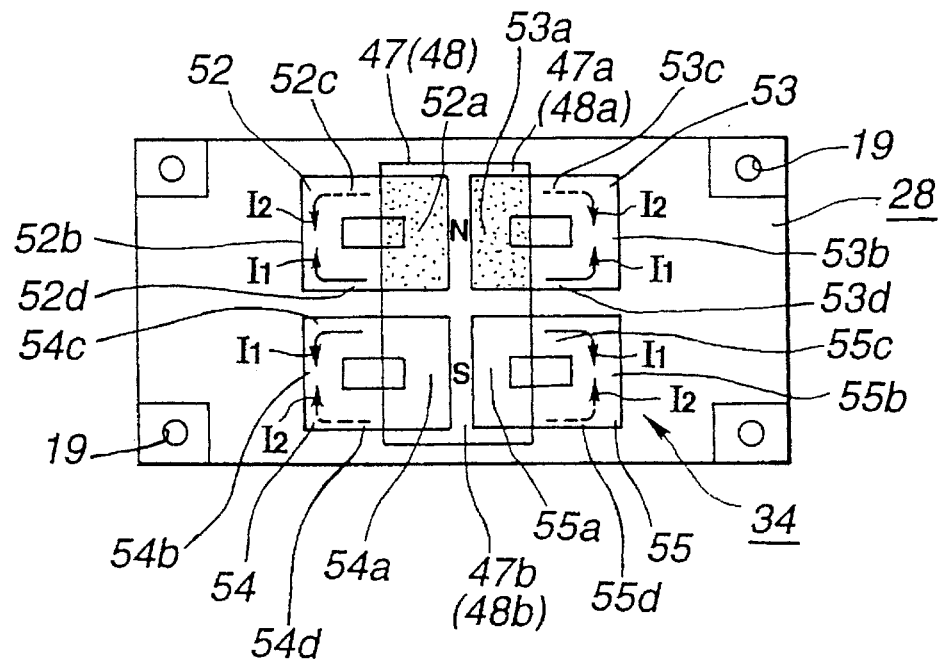
FIG. 28 is a plan view showing the relative disposition between the tracking coil and the magnetic circuit employing a two-pole magnet.

The tracking coil 34 is made up of a pair of coil portions 52, 53 positioned facing the first magnetized portions 47a, 48a and another pair of coil portions 54, 55 positioned facing the second magnetized portions 47b, 48b of the magnets 47, 48, as shown in FIG. 28. Each of the coil portions 52, 53, 54, 55 is formed as a flat rectangular winding section having pairs of vertical sections 52a, 52b, 53a, 53b, 54a, 54b, 55a, 55b, extending parallel to the short sides normal to the longitudinal direction of the coil mounting substrate 28, and pairs of horizontal sections 52c, 52d, 53c, 53d, 54c, 54d, 55c, 55d, extending parallel to the longitudinal direction of the coil mounting substrate 28, as shown in FIG. 28. The coil portions 52, 53 mounted facing the first magnetized portions 47a, 48a and the coil portions 54, 55 mounted facing the second magnetized portions 47b, 48b are mounted on the opposite lateral side of the coil mounting substrate 28 so that the vertical sections 52a, 53a and 54a, 55a lie adjacent to each other. The coil portions 52, 53 and 54, 55 making up the tracking coil 34 are dimensioned so that the mutually adjacent first vertical sections 52, 53 and 54, 55 are located within the first and second magnetic gaps $G_1$, $G_2$ defined by the first and second magnetized portions 47a, 48a and 47b, 48b and the vertical sections 52b, 53b and 54b, 55b are located outside the first and second magnetic gaps $G_1$, $G_2$.

Figure 29:
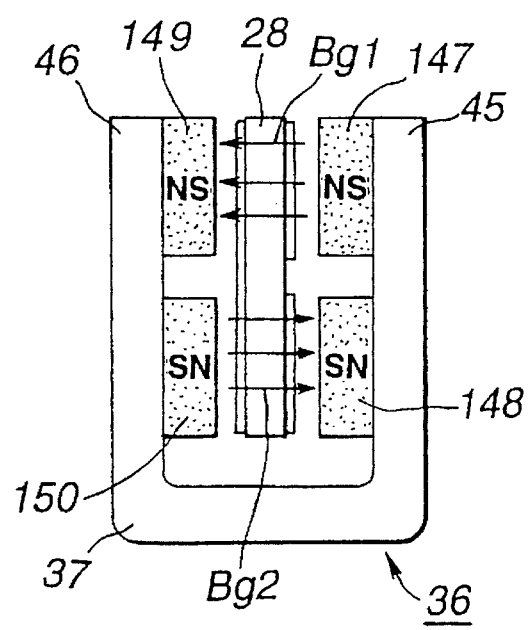
FIG. 29 is a side view showing the relative disposition between the coil mounting substrate and a magnetic circuit employing plural one-pole magnets.
Figure 30:
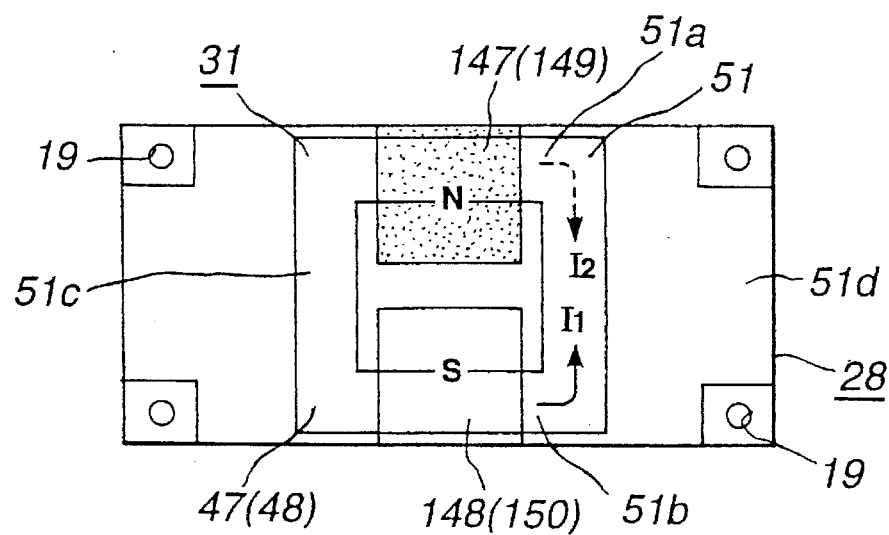
FIG. 30 is a front view showing the relative disposition between the focusing coil and a magnetic circuit employing plural one-pole magnets.
Figure 31:
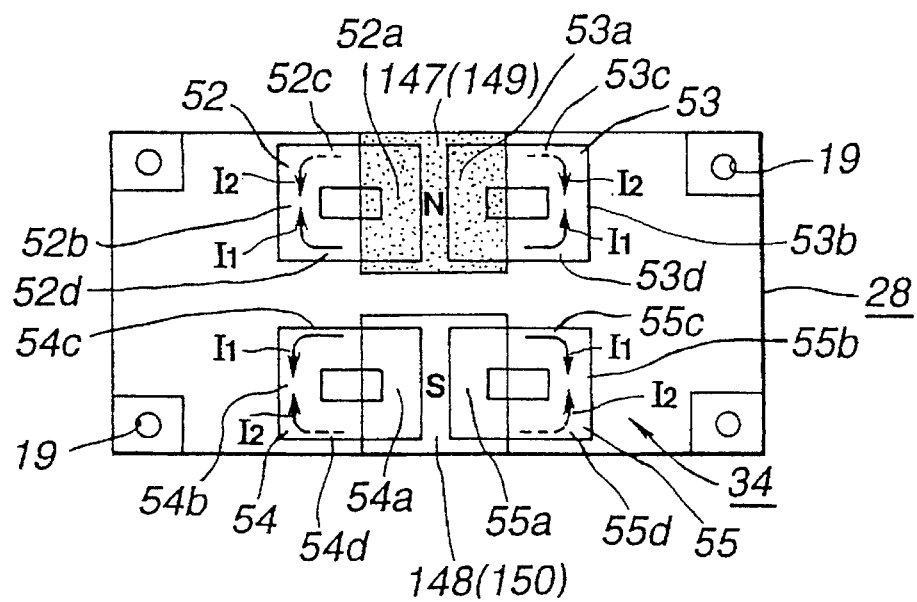
FIG. 31 is a front view showing the relative disposition between the tracking coil and a magnetic circuit employing plural one-pole magnets.

In the above-described embodiment, the magnets 47, 48 have two poles of opposite polarities. Alternatively, single-pole magnets 147,158 and 149,150 may also be provided in association with the first magnetized portions 47a, 48a and the second magnetized portions 47b, 48b, as shown in FIGS. 29 to 31. The magnets 147, 148 and 149, 150, respectively mounted on the upstanding pieces 45 and 48 making up the yoke 37, are oppositely poled, as shown in FIG. 29.

Figure 32:
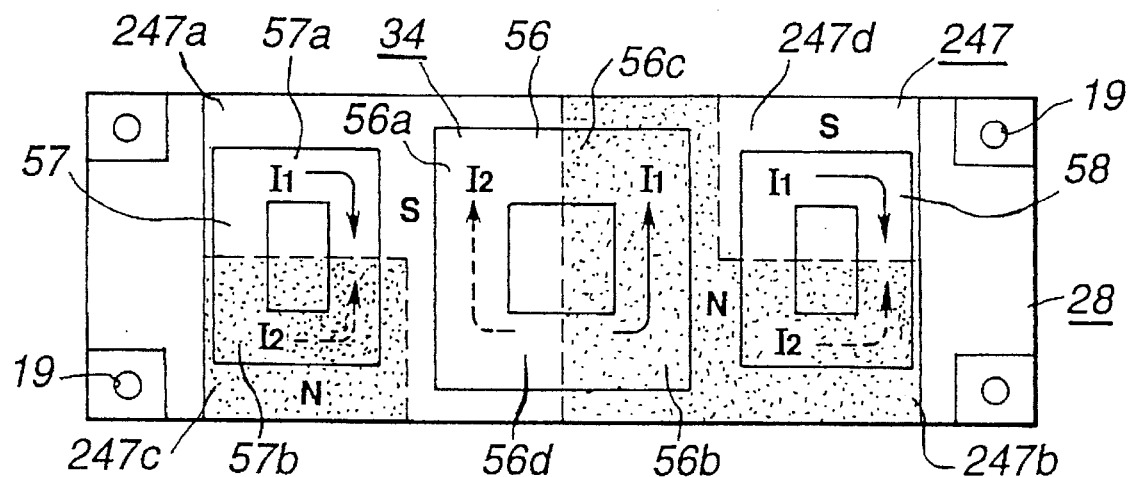
FIG. 32 is a plan view showing the relative disposition between the tracking coil and the tracking coil on one hand and the magnetic circuit employing a multi-pole magnet.
Figure 33:
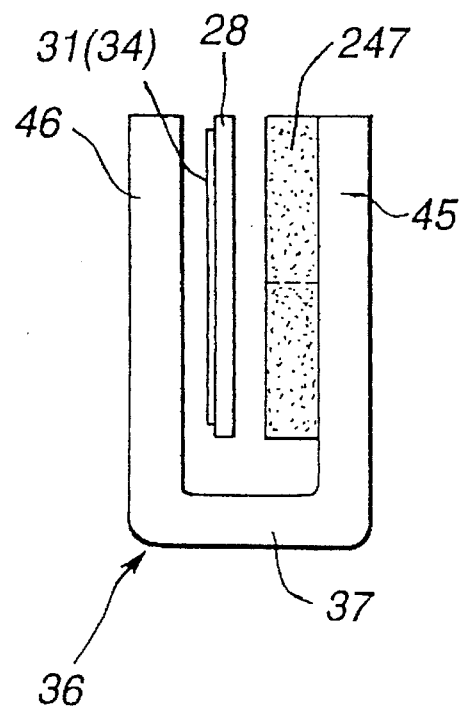
FIG. 33 is a side view showing the relative disposition between a coil tracking substrate and the magnetic circuit employing a multi-pole magnet.

For improving the exploitation efficiency of the coil portions of the focusing coil 31 and the tracking coil 34 mounted on the coil mounting substrate 28, the constitution of the focusing coil 31 and the tracking coil 34 and the magnetic circuit 38 may be configured as shown in FIGS. 32 and 33.

On a lateral surface of the coil mounting substrate 28, coil portions 57, 58 making up the focusing coil 31 are arrayed on either sides of a coil portion 58 of the tracking coil 34, as shown in FIG. 32. The coil portion 58 of the tracking coil 34 is formed by winding in a flat rectangular section comprising a pair of vertical sections 58a, 58b extending parallel to the short sides normal to the longitudinal direction of the coil mounting substrate 28 and a pair of horizontal sections 58c, 58d extending parallel to the longitudinal direction of the coil mounting substrate 28, as shown in FIG. 32. The coil portions 57, 58 making up the focusing coil 31 is formed by winding in flat rectangular sections comprising pairs of horizontal sections 57a, 57b and 58a, 58b extending parallel to the longitudinal direction of the coil mounting substrate 28 and pairs of vertical sections 57c, 57d and 58c, 58d extending parallel to the short sides of the coil mounting substrate 28, as shown in FIG. 32.

A magnet 247 of the magnetic circuit unit 36 is mounted on an inner lateral surface of one of the upstanding pieces 45, 46 making up the yoke 37. The magnet 247, magnetized to plural poles, is dimensioned for facing the focusing coil 31 and the tracking coil 34 mounted on the coil mounting substrate 34. The magnet 247 has a first L-shaped magnetized portion 247a extending from the vertical section 56a of the coil portion 56 of the tracking coil 34 to the horizontal section 57a of the coil portion 57 of the focusing coil 31, as shown in FIG. 32. The magnet 247 also has a second inverted L-shaped magnetized portion 247b extending from the vertical section 56b of the coil portion 56 of the tracking coil 34 to the horizontal section 58b of the coil portion 58 of the focusing coil 31, as shown in FIG. 32. A third magnetized portion 247c is provided in an area facing the horizontal section 57b of the coil portion 57 of the focusing coil 31. A fourth magnetized portion 247d is provided in an area facing the horizontal section 58a of the coil portion 58 of the focusing coil 31. The first to fourth magnetized portions 247a to 247d are magnetized along the thickness of the magnet 247. The magnetized portions neighboring to each other are differently poled, as shown in FIG. 32.

By the above-described constitution of the tracking coil 34, focusing coil 31 and the magnetic circuit unit 36, the vertical sections 56a, 56b of the coil portion 58 of the tracking coil 34 generating the driving force in the planar direction normal to the optical axis of the objective lens 21 are faced by the first magnetized portion 247a and the second magnetized portion 247b of the magnet 247. On the other hand, the horizontal sections 57a, 57b and 58a, 58b of the coil portions 57, 58 making up the focusing coil 31 generating the driving force in the direction parallel to the optical axis of the objective lens 21 are faced by the first to fourth magnetized portions 247a to 247d of the magnet 247. This leads to an improved exploitation efficiency of the coil portions making up the focusing coil 31 and the tracking coil 34.

With the above-described constitution of the tracking coil 34, focusing coil 31 and the magnetic circuit 38, if the control current $I_1$, $I_2$ is supplied to the coil portion 58 of the tracking coil 34, the current flows through the vertical sections 56a, 56b of the coil portion 58 in opposite directions. However, since the first and second magnetized portions 247a, 247b facing these vertical portions 58a, 58b are oppositely poled, the driving force in the planar direction normal to the optical axis of the objective lens 21 is generated in the same direction by the interaction between the vertical sections 56a, 56b and the first and second magnetized portions 247a, 247b.

On the other hand, if the control current $I_1$, $I_2$ is supplied to the coil portions 57, 58 making up the focusing coil 31, the current flows through the horizontal sections 57a, 57b and 58a, 58b of the coil portions 57, 58 in opposite directions. However, since the first to fourth magnetized portions 247a to 247d facing these horizontal portions 57a, 57b and 58a, 58b are poled differently between the mutually adjacent magnetized portions 247a, 247c and 247b, 247d, the driving force in the direction parallel to the optical axis of the objective lens 21 is generated in the same direction by the interaction between the horizontal sections 57a, 57b and 58a, 58b and the first to fourth magnetized portions 247a to 247d.

In the embodiment sown in FIGS. 32 and 33, the coil portions 57, 58 making up the focusing coil 31 are arranged side-by-side on either sides of the coil portion 58 of the tracking coil 34. Alternatively, coil portions 80, 81 making up the tracking coil 34 are arranged on either sides of the coil portion 59 of the focusing coil 34 as shown in FIG. 34.

Figure 34:
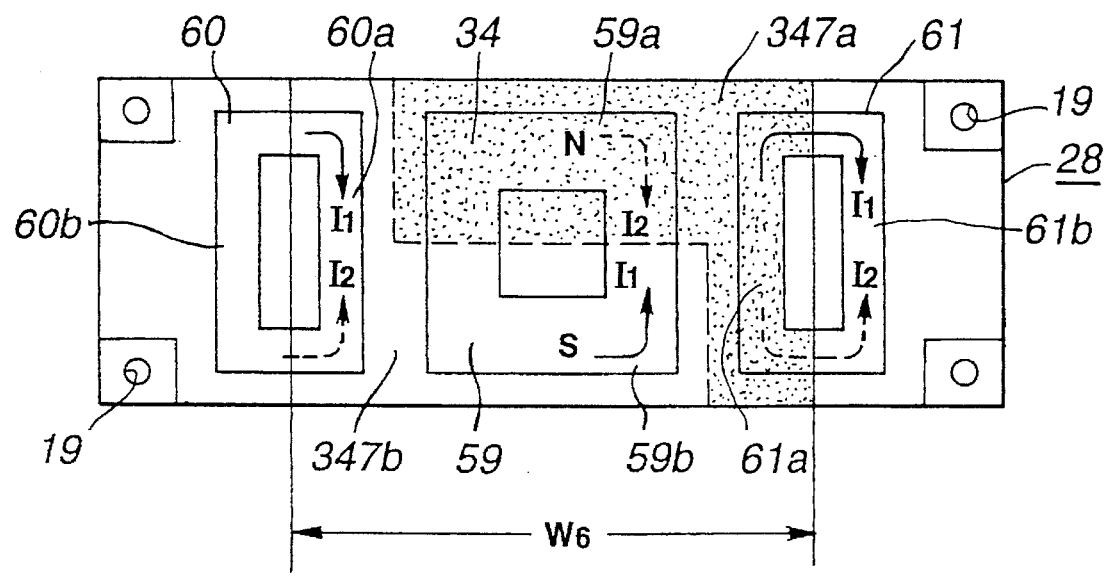
FIG. 34 is a front view showing the relative disposition between a focusing coil and a tracking coil on one hand and another example of the magnetic circuit employing a multi-pole magnet.

The coil portion 59 of the focusing coil 31 is formed by a planar rectangular wound section comprising a pair of horizontal sections 59a, 59b, extending parallel to the longitudinal direction of the coil mounting substrate 28, and vertical sections 59c, 59d parallel to the short sides of the coil mounting substrate 28, as shown in FIG. 34. On the other hand, the coil portions 60, 61 of the tracking coil 34 are formed by a planar rectangular wound section comprising a pair of vertical sections 60a, 60b and 81a, 81b extending parallel to the longitudinal direction of the coil mounting substrate 28, and vertical sections 80c, 80d and 81c, 81d parallel to the short sides of the coil mounting substrate 28, as shown in FIG. 34.

Figure 35:
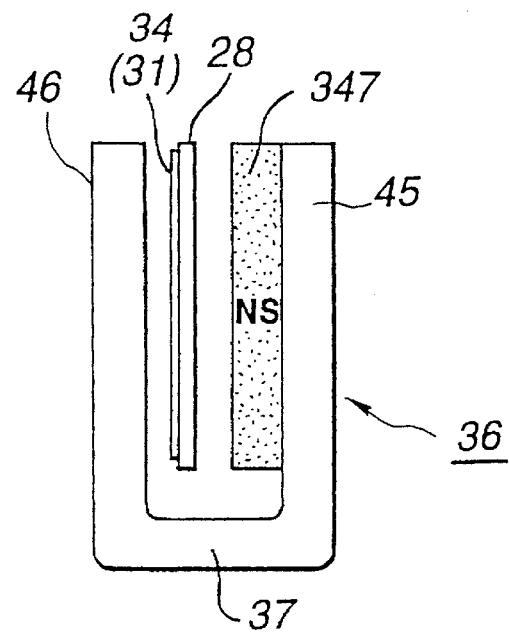
FIG. 35 is a side view showing the relative disposition between a coil tracking substrate and another example of the magnetic circuit employing a multi-pole magnet.

A magnet 347 of the magnetic circuit 38, magnetized to two poles, is mounted on an inner lateral surface of one of the upstanding pieces 45, 48 making up the yoke 37, as shown in FIG. 35. The magnet 347 has a first L-shaped magnetized portion 347a extending from the horizontal section 59a of the coil portion 59 of the focusing coil 31 to the vertical section 61a of the opposite side coil portion 80 of the tracking coil 34, as shown in FIG. 34. The magnet 347 also has a second inverted L-shaped magnetized portion 347b extending from the vertical section 59b of the coil portion 59 of the focusing coil 31 to the vertical section 61a of the coil portion 60 of the tracking coil 34, as shown in FIG. 34. These first and second magnetized portions 347a, 347b are magnetized along the thickness of the magnet 347 and are oppositely poled, as shown in FIG. 34.

By arranging the focusing-coil 31 and the tracking coil 34 as shown in FIG. 34 and by magnetizing the magnet 347 as described above, the magnet 347 may be of a width $W_6$ extending across the vertical sections 60a and 61a of the coil portions 60 and 61 making up the tracking coil 34, so that size reduction may be achieved as compared to the embodiment shown in FIGS. 32 and 33. In addition, by effectively utilizing the short sides of the coil mounting substrate 28, sufficient exploitation efficiency of the coil portions 60, 61 of the tracking coil 34 utilized for generating the driving force may be achieved.

The resilient supporting member 35, supporting the bobbin 22 carrying the objective lens 21, constituting the above-mentioned objective lens driving device, movably supports the bobbin 22 by having its one end 35a securely supported by the coil mounting substrate 28 using an electrically conductive adhesive, such as the solder 41. The end 35a of the resilient supporting member 35 is inserted into an inserting opening 19 bored within the area of the connecting terminal 40 at each corner of the coil supporting substrate 28 mounted on the bobbin 28.

By supporting the resilient supporting member 35 by inserting its end 35a in the inserting opening 19 bored in the coil mounting substrate 28, the solder 41 or the like adhesive can be coated on the entire outer periphery of the resilient supporting member 35 for establishing positive electrical connection between the resilient supporting member 35 and the connecting terminal 40 for assuring sufficient mounting strength with respect to the coil mounting substrate 28.

Since the end 35a of the resilient supporting member 35 has to be inserted into the through-hole 19, there is a fear that difficulties are met in mounting the resilient supporting member 35 on the coil mounting substrate.

Figure 36:
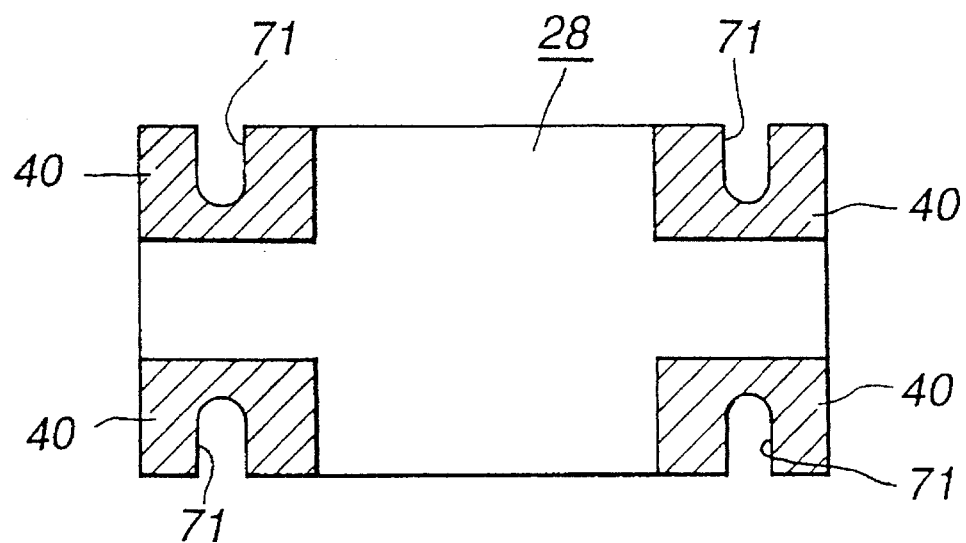
FIG. 36 is a front view showing another example of a coil mounting substrate of the object lens driving device according to the present invention.

The resilient supporting member 35 may also be mounted on the coil mounting substrate 28 by engaging the end 35a engaged in an engagement recess 71 formed in the longitudinal side of the coil mounting substrate 40 within the connection terminal 40 in place of the through-hole 19, as shown in FIG. 36. By forming the engagement recess 71 in the coil mounting substrate 28, the resilient supporting member 35 may be fitted in the engagement recess 71 by simply placing it lengthwise along the sides of the coil mounting substrate 28, thereby facilitating the mounting of the resilient supporting member 35 on the coil mounting substrate 28.

The resilient supporting member 35 is securely supported in the floating state in the engagement recess 71 with electrical connection to the coil mounting substrate 28 by the solder 41 or the like electrically conductive adhesive deposited on the connection terminal 40.

Figure 37:
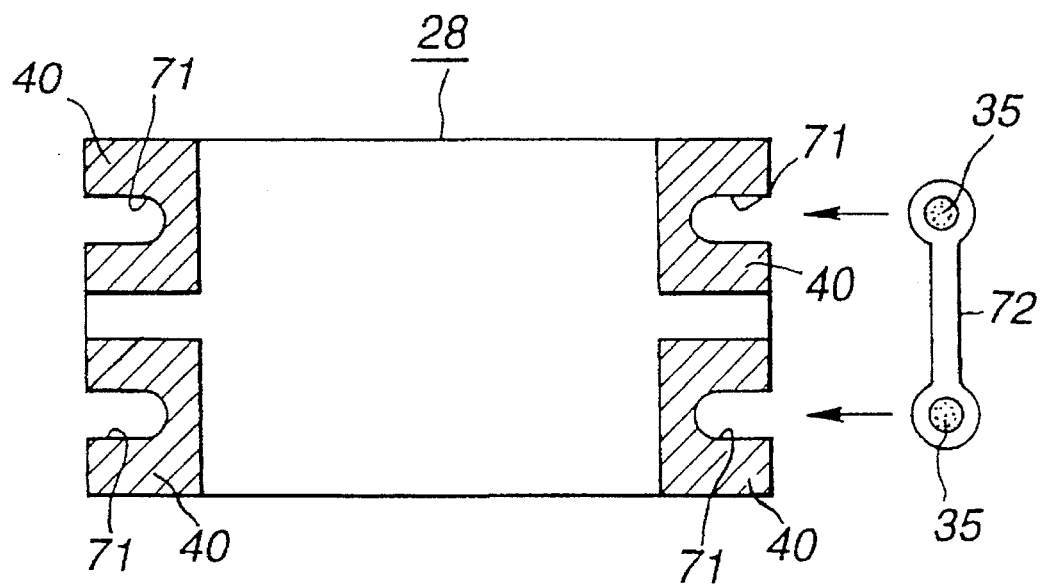
FIG. 37 is a front view showing a further example of the coil mounting substrate of the objective lens driving device according to the present invention and a resilient supporting member employed in the coil mounting substrate.
Figure 38:
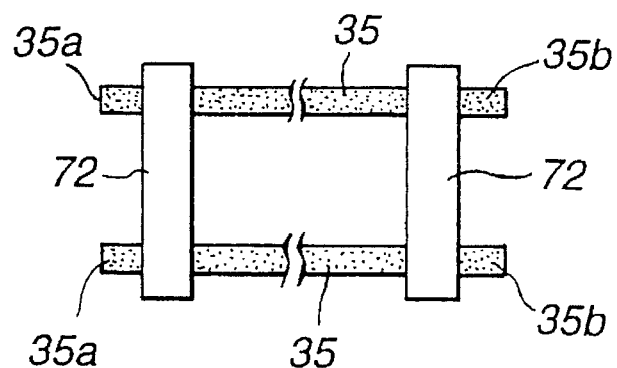
FIG. 38 is a side view showing a resilient supporting member employed in the coil mounting substrate shown in FIG. 37.

The engaging recess 71 may also be formed in the short side orthogonal to the longitudinal side of the coil mounting substrate 28, as shown in FIG. 37. By forming plural such engagement recesses 71, the resilient supporting members 35 may be mounted on both sides of the coil mounting substrate 28 by interconnecting mid portions between the ends 35a and 35b of the connecting members 35 by couplers 72 as shown in FIG. 38. By connecting the mid portions of the resilient supporting members 35 by the couplers 72, the resilient sporting members can be mounted on the coil mounting substrate 28 while being maintained in parallelism relative to each other. The couplers 72 are formed of an insulating material, such as synthetic resin, for maintaining the insulation between the electrically conductive resilient supporting members 35, 35.

With the above-described embodiments, since the resilient supporting members 35 are secured by the electrically conductive material, such as the solder 41, deposited on the connection terminal 40, lying on the coil mounting plane of the coil mounting substrate 28, any variation in the plate thickness of the coil mounting substrate 28 fitted with the focusing coil 31 and the tracking coil 34 frequently affects the state of equilibrium of the center of gravity of the bobbin 22 supported by the resilient supporting member 35.

Figure 39:
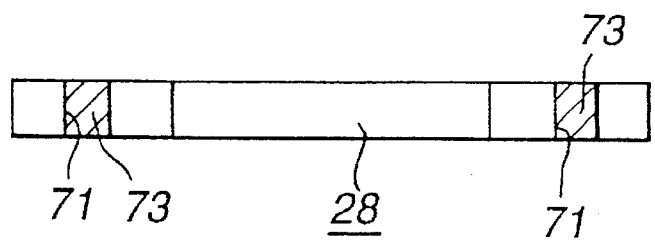
FIG. 39 is a plan view showing a fitting recess in which is fitted the resilient support member mounted on the coil mounting substrate shown in FIG. 36.
Figure 40:
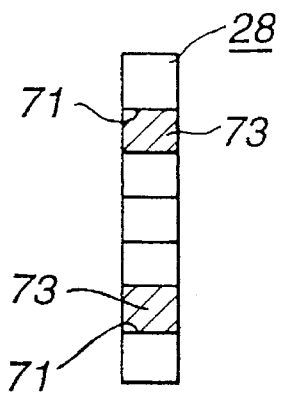
FIG. 40 is a side view showing a fitting recess in which is fitted the resilient support member mounted on the coil mounting substrate shown in FIG. 37.
Figure 41:
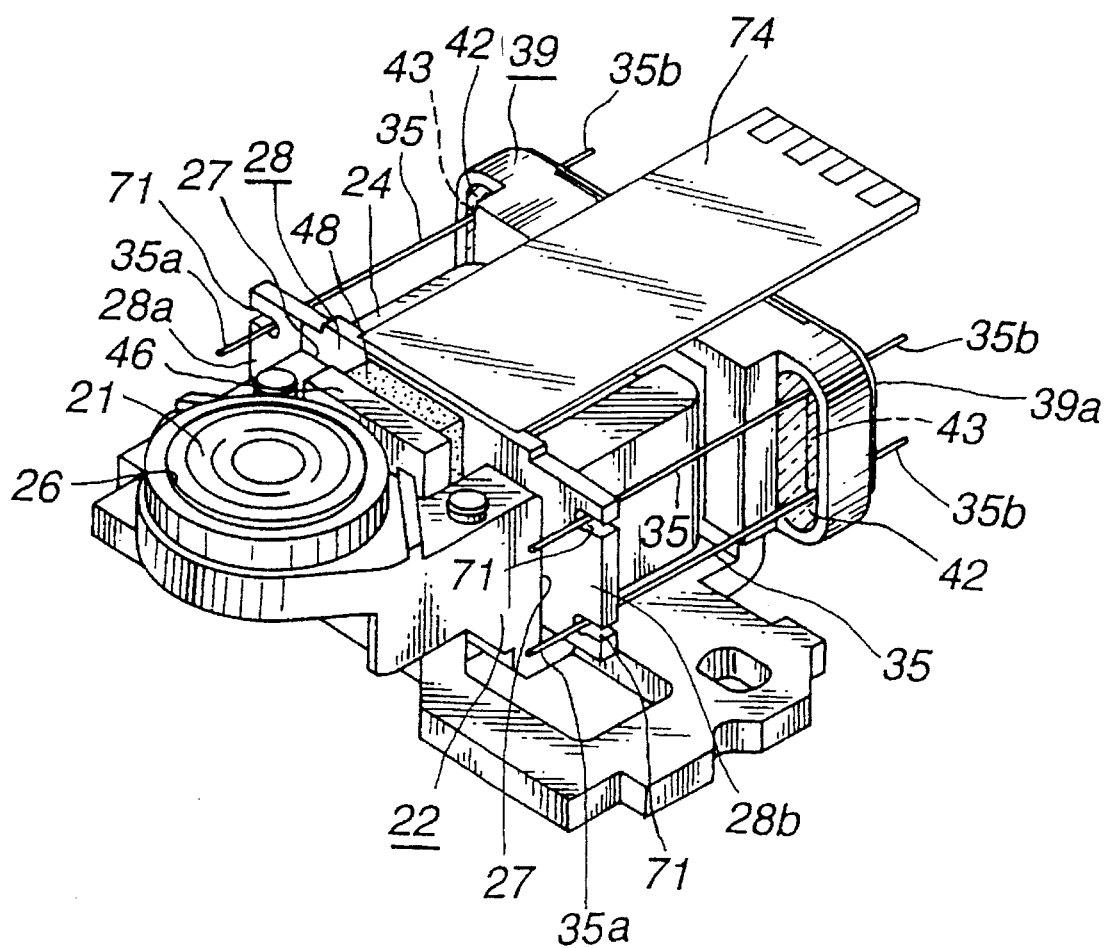
FIG. 41 is a perspective view showing an objective lens driving device employing a flexible printed circuit board for current conduction through the focusing coil and the tracking coil.

Thus a connection terminal 73 is formed on the inner surface of the engagement recess 71, and an electrically conductive material, such as the solder 41, is deposited in the engagement recess 71 for establishing electrical and mechanical connection between the resilient supporting members 35 and the connection terminals 40, as shown in FIGS. 39 and 40. By securing the resilient supporting members 35 within the plate thickness of the coil mounting substrate 28, it becomes possible to support the bobbin 22 without being significantly affected by plate thickness variations in the coil mounting substrate 28.

With the above-described embodiments, the resilient supporting members 35 supporting the bobbin 22 is formed of an electrically conductive material, and the focusing coil 31 and the tracking coil 34 are fed with current via a flexible printed circuit board 74 connected as a feeder line to the coil mounting substrate 74. In such case, the resilient supporting member 35 need not be formed of an electrically conductive material. Thus the resilient supporting member 35 may be formed of a material exhibiting suitable resiliency for movably supporting the movable part inclusive of the bobbin 22. For example, the resilient supporting member 35 may be formed by a spring metal plate not excellent in electrical properties or formed of an insulator, such as synthetic resin or rubber.

The coil mounting substrate 28 employed herein is formed with engagement recesses 71 in the short sides thereof, as shown in FIG. 37, for facilitating the mounting of the resilient supporting member 35 to the coil mounting substrate 28 from which is extended a flexible printed circuit board 74 employed for supplying current to the focusing coil 31 and the tracking coil 34.

If the flexible printed circuit board 74 is employed for supplying the current to the focusing coil 31 and the tracking coil 34, it becomes unnecessary to provide the coil mounting substrate 28 with the connection terminal 40 for establishing electrical connection with the electrically conductive resilient supporting member 35. Also it becomes unnecessary to provide the support holder 39 with the flexible printed circuit board 44 for connecting the end 35b of the resilient supporting member 35 to the external driving control circuit. In this case, the end 35b of the resilient supporting member 35 is fixedly supported directly or via a fastener plate 39a mounted on the support holder 39.

With the above-described objective lens driving device 20, both sides of the bobbin 22 are formed with recessed grooves to form inserting grooves 27, 27 for the coil mounting substrate. Consequently, when mounting the coil mounting substrate 28 on the bobbin 22, the coil mounting substrate 28 needs to be positioned in the longitudinal direction of the bobbin 22 using a support fixture and subsequently to apply an adhesive for securing the substrate 28 to the bobbin 22. That is, for establishing the facing position of the focusing coil 31 and the tracking coil 34 provided on the coil mounting substrate 28 to the magnets 47, 48 of the magnetic circuit 38, the coil mounting substrate 28 needs to be brought into registration in the longitudinal direction with respect to the bobbin 22.

Figure 42:
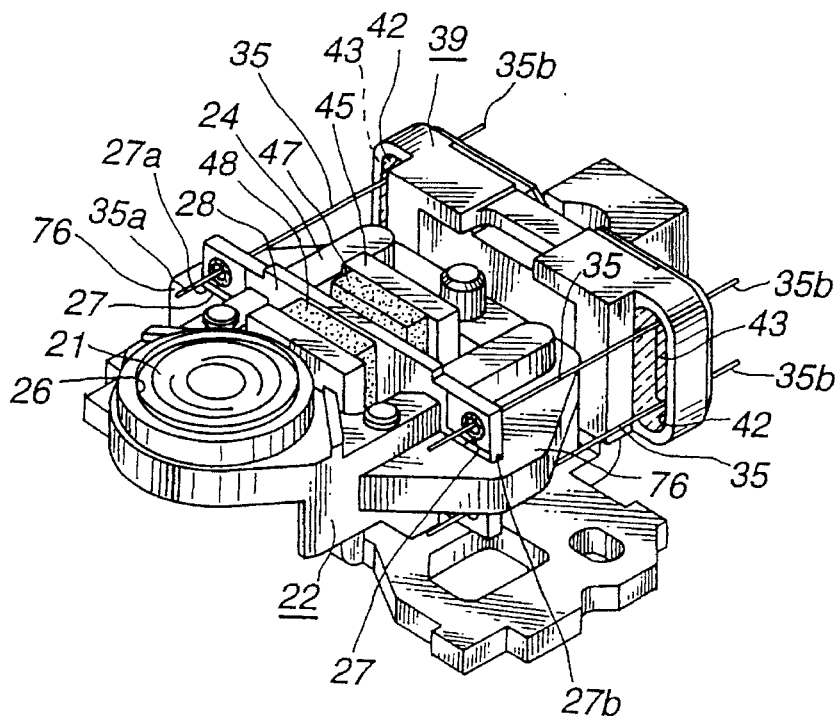
FIG. 42 is a perspective view showing another example of a bobbin of an objective lens driving device according to the present invention.
Figure 43:
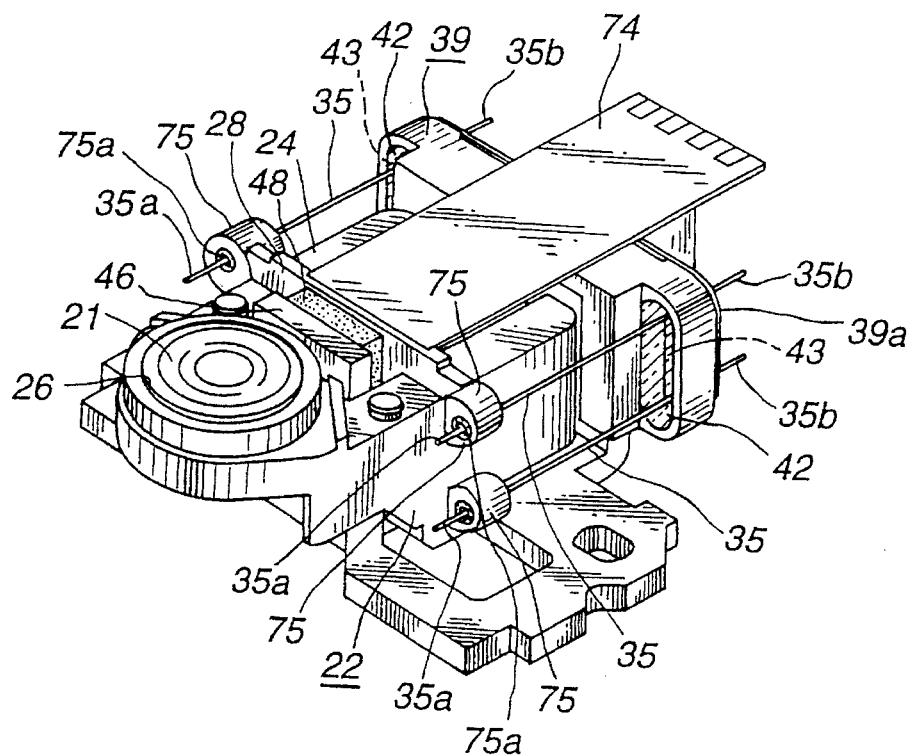
FIG. 43 is a perspective view showing an objective lens driving device wherein the bobbin is directly supported by a resilient supporting member.

To this end, flanges 78, 78 are provided for being protruded laterally from both sides of the bobbin 22, and the inserting grooves 27, 27 are formed as far as the mid portions of these flanges 76, 76 for closing side ends 27a, 27b, as shown in FIG. 42. Since these side ends 72a, 72b act as longitudinal position controllers for the bobbin 22 and the coil mounting substrate 28, the coil mounting substrate 28 can be mounted in position on the bobbin 28 without employing support fixtures.

If the current is supplied to the focusing coil 31 and the tracking coil 34 using the flexible printed circuit board 74, it becomes unnecessary to supply current to the focusing coil 31 and the tracking coil 34 mounted on the coil mounting substrate 28 via the resilient supporting member 35. Consequently, the end 35a of the resilient supporting member 35, having its other end 35b supported by the support holder 39, may be directly supported by the bobbin 22.

In this case, both lateral sides of the bobbin 22 formed of, for example, synthetic resin, are formed integrally with mounting bosses 75 for the resilient supporting members 35 and the ends 35a of the resilient supporting members 35 are passed through through-holes 75a bored in the mounting bosses 75.

The above-described objective lens driving device 20 is designed as a movable coil type in which the coil mounting substrate 28, carrying the focusing coil 31 and the tracking coil 34, is mounted on the bobbin 22 and supported by plural resilient supporting members 35. The objective lens driving device may also be designed as a movable magnet type in which the yoke 37 carrying the magnets 47, 48 is mounted in the bobbin 22 and the coil mounting substrate 28 is arranged on a supporting substrate 78 constituting a stationary unit.

Figure 44:
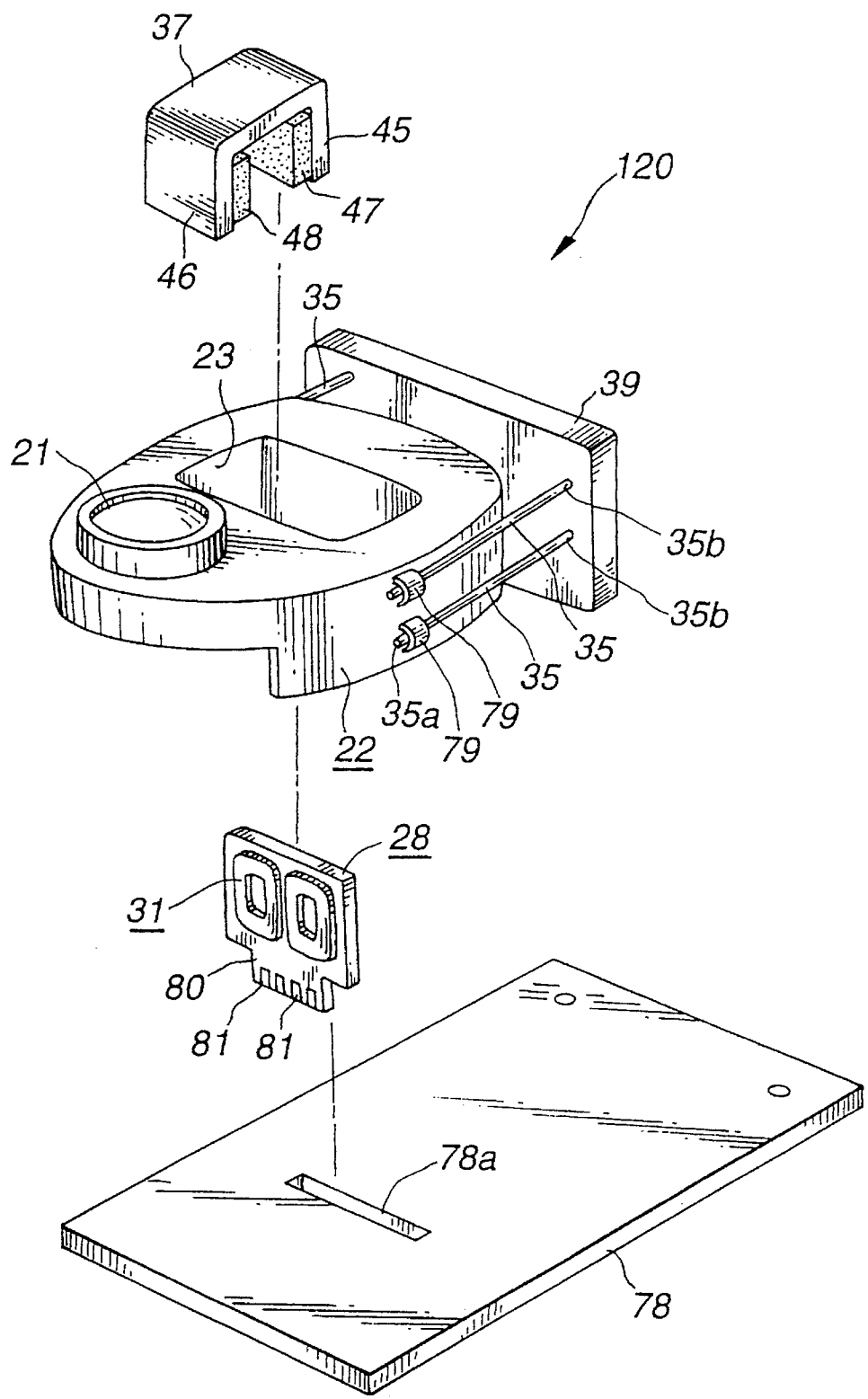
FIG. 44 is a perspective view showing the assembling state of a movable magnet type object lens driving device.
Figure 45:
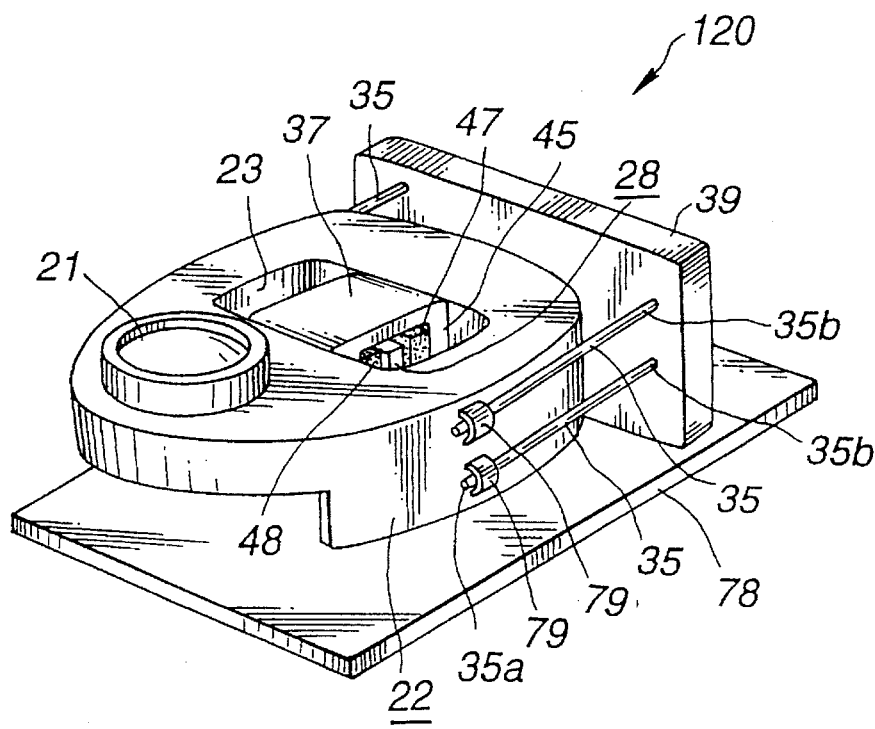
FIG. 45 is a perspective view showing the movable magnet type object lens driving device shown in FIG. 44.

Referring to FIGS. 44 and 45, there is shown such movable magnet type objective lens driving device 120 in which a yoke 37 carrying magnets 47, 48 is engaged in an opening 23 bored in a main bobbin member 24 of the bobbin 22. The yoke 37 is U-shaped and has mutually facing upstanding pieces 45, 46, the opposite surfaces of which are fitted with magnets 47, 48. The yoke 37 is fitted into the opening 23 of the main bobbin member 23 with its opened end directed towards the lower side of the bobbin. By fitting the yoke 37 in this manner within the opening 23, the magnets 47, 48, mounted on the mutually facing inner sides of the upstanding pieces 45, 46, are arranged in the bobbin 22 with the mutually facing inner sides disposed within the opening 23.

Meanwhile, only the magnet 47 may be provided on the yoke 37. If the magnets 47, 48 are employed, these magnets may be directly mounted facing each other within the opening 23 of the bobbin 23 without employing the yoke 37. By employing the magnets 47, 48, it becomes possible to concentrate the magnetic flux between these magnets.

The bobbin 22, carrying the magnets 47, 48 via the yoke 35, has its opposite sides supported by each one pair of wire-like resilient supporting members 35 supported by the supporting holder 39 mounted on the support substrate 78, as in the above-described movable coil type objective lens driving device 20, as shown in FIGS. 44 and 45. Each of the resilient supporting members 35, movably supporting the bobbin 22, has its one end 35a supported by a support boss 79 protruded on a lateral side of the bobbin 22 and has its opposite side 35b supported by the support holder 39, for supporting the bobbin 22 carrying the objective lens 21 for movement in directions parallel and normal to the optical axis of the objective lens 21.

With the movable magnet type objective lens driving device 120, the resilient supporting members 35 need not be formed of the electrically conductive material, since the feeder is not provided in the movable part inclusive of the bobbin 22.

The coil mounting substrate 28 is movably mounted on the supporting substrate 78 carrying the bobbin 22 by means of the resilient supporting member 35, with the plane carrying the focusing coil 31 and the tracking coil 34 running parallel to the optical axis of the objective lens 21 held by the bobbin 22. The coil mounting substrate 28, mounted on the supporting substrate 78, is positioned between a pair of upstanding pieces 45, 46, making up the yoke 37 mounted on the bobbin 22, for positioning the focusing coil 31 and the tracking coil 34 opposite the magnets 47, 48.

Figure 46:
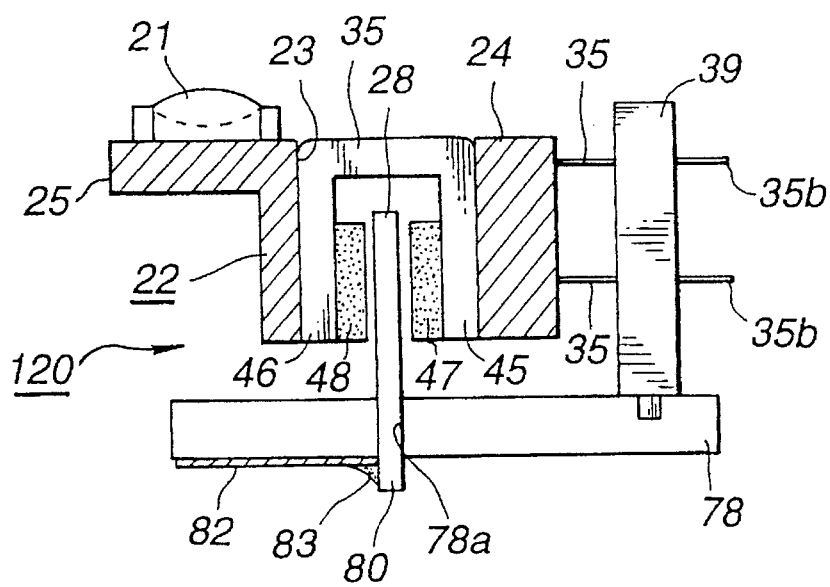
FIG. 46 is a cross-sectional side view showing the movable magnet type object lens driving device shown in FIG. 44.

The coil mounting substrate 28 has an engagement portion 80 on its bottom side for being engaged in an engagement groove 78a formed in the supporting substrate 78, as shown in FIG. 44. On the surface of the engagement portion 80 are formed connection terminals 81 extended from coil portions 29, 30 making up the focusing coil 31 and coil portions 31, 32 making up the tracking coil 34. The coil mounting substrate 28 is mounted upright on the supporting substrate 28 by engaging the engagement portion 80 in the engagement groove 79. The connection terminals 81 provided on the engagement portion 80 protruded on the lower surface of the supporting substrate 78 via the engagement groove 78a are electrically connected to an interconnection pattern 82 formed on the lower surface of the supporting substrate 78 by an electrically conductive adhesive, such as a solder 83, the coil portions 29, 30 making up the focusing coil 31 and coil portions 31, 32 making up the tracking coil 34 are connected to a driving control circuit, not shown, via the interconnection pattern 82, as shown in FIG. 46.

Figure 47:
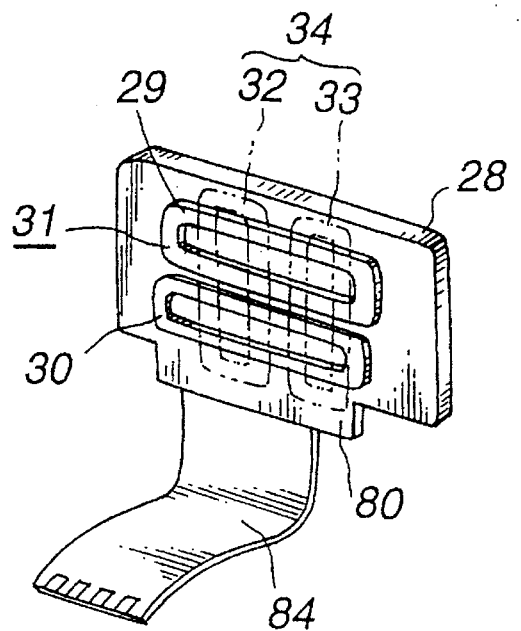
FIG. 47 is a perspective view of a coil mounting substrate in which current supply to the focusing coil and the tracking coil is performed using a flexible printed circuit board.
Figure 48:
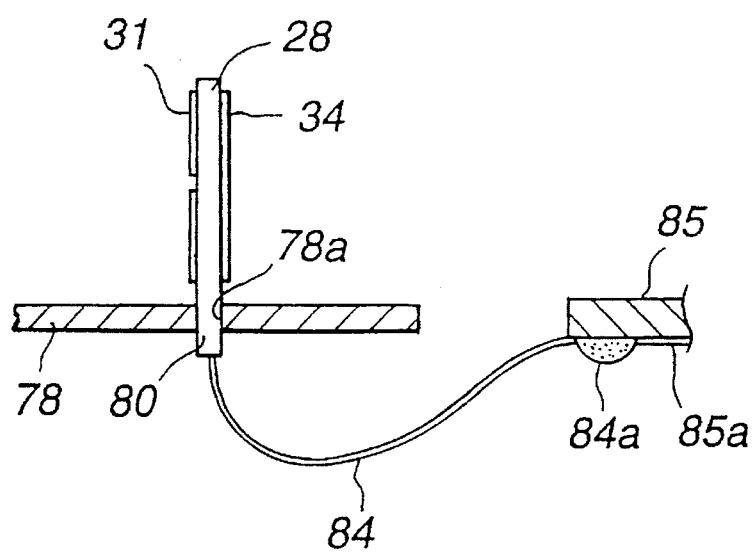
FIG. 48 is a side view showing the mounting state of a coil mounting substrate to which the flexible printed circuit board is connected.

For connecting the coil portions 29, 30 making up the focusing coil 31 and coil portions 31, 32 making up the tracking coil 34 to the driving control circuit, a flexible printed circuit board 84 is extended from the engagement portion 80, as shown in FIG. 47. This flexible printed circuit board 84 is connected to a connection pattern 85*a* of the printed circuit board 85 provided with a driving control circuit, using an electrically conductive adhesive, Such as a solder 84*a*. The coil portions 29, 30 making up the focusing coil 31 and the coil portions 31, 32 making up the tracking coil 34 may be connected in this manner to the driving controlling circuit, as shown in FIG. 48.

The above-described constitution in which the flexible printed circuit board 84 is extended towards the lower side and the coil portions 29, 30 making up the focusing coil 31 and coil portions 31, 32 making up the tracking coil 34 are connected via the flexible printed circuit board 84 to the printed circuit board 85 provided with the driving control circuit, may be applied to the coil mounting substrate 28 employed for the movable coil type objective lens driving device 20, because the printed circuit board 84 is also flexible. In such case, the engagement portion 80 for supporting the coil mounting substrate 28 by the supporting substrate 78 is unnecessary and may be eliminated.

In case of application to the movable coil type objective lens driving device 20, the flexible printed circuit board 84 may be replaced by a litz wire which is a fine gauge flexible wire.

Since the constitution of the coil mounting substrate 28 and the magnetic circuit 38, applied to the above-described movable coil type objective lens driving device, is directly applied to the movable magnet type objective lens driving device 120, detailed description is not made for simplicity. That is, the above constitution may be directly applied to the movable magnet type objective lens driving device 120 by arranging the coil mounting substrate 28 carrying the focusing coil 31 and the tracking coil 34 on the stationary side and by arranging the magnets 47, 48,147, 148,247,347 on the bobbin 22 constituting the movable side.

The above-described objective lens driving device 20 or 120 is arranged on a base member provided with a light receiving element detecting return light from an optical disc or a light source radiating a light beam, such as a semiconductor laser, for constituting an optical pickup device.

An embodiment of the present invention in which the above-described movable coil type objective lens driving device 20 is employed for constituting the optical pickup device is hereinafter explained.

Figure 49:
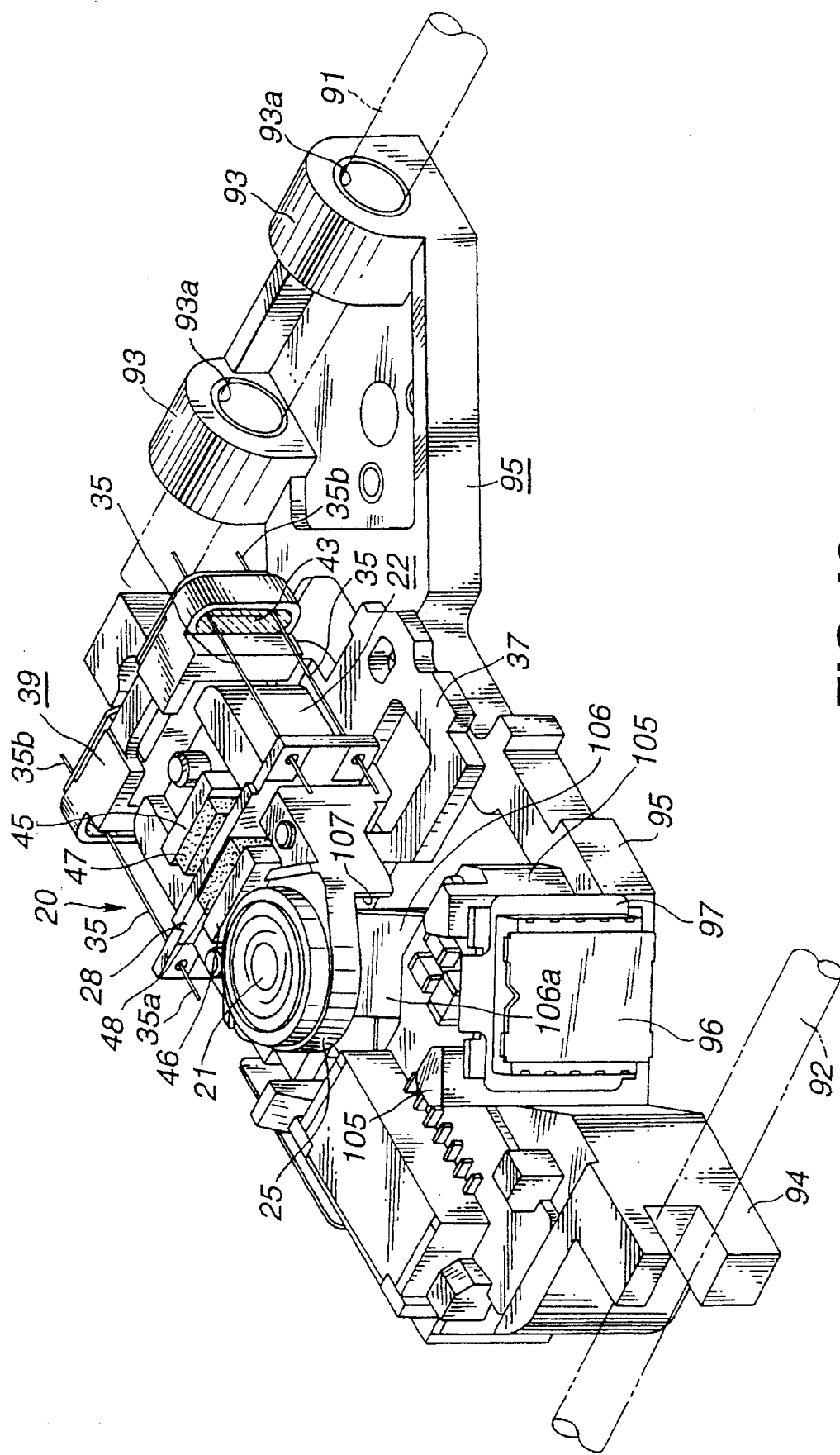
FIG. 49 is a perspective view showing an optical pickup device employing a movable coil type objective lens driving device according to the present invention.

Referring to FIG. 49, the optical pickup device has a substantially planar base member 95 on the opposite lateral sides of which are provided a bracket 93 and a recess 94 for accommodating a slide guide reference shaft 91 and a slide guide shaft 92, respectively. These shafts 91, 92 make up parallel guide means mounted parallel to each other in an optical disc recording/reproducing apparatus, not shown herein. The bracket 93 on one side of the base member 95 has a through-hole 93*a* passed through by the slide guide reference shaft 91, while the recess 94 is of a U-shaped cross-section for accommodating the slide guide shaft 92.

The objective lens driving device 20 is mounted on the base member 95 at a mid portion between the slide guide reference shaft 91 and the slide guide shaft 92, with the direction of extension of the resilient supporting member 35 movably supporting the bobbin 22 holding the objective lens 21 lying normal to the axis of the slide guide reference shaft 91 and the slide guide shaft 92 extending parallel to each other, as shown in FIG. 49. More specifically, the objective lens driving device 20 is arranged with the optical axis of the objective lens 21 held by one end of the bobbin 22 being at a mid point between the slide guide reference shaft 91 and the slide guide shaft 92. The objective lens driving device 20 is mounted on the base member 95 by securing the yoke 87 of the magnetic circuit 88 such as with a set screw.

On the base member 95, carrying the objective lens driving device 20, there is mounted a light emitting/light receiving composite unit 98 integrally made up of s semiconductor laser device as laser light source for radiating a light beam via an objective lens 21 provided in an object lens driver 20 to an optical disc as a recording medium, a light receiving element receiving the return light reflected back from the semiconductor laser, and a separating optical element for separating the return light.

Figure 50:
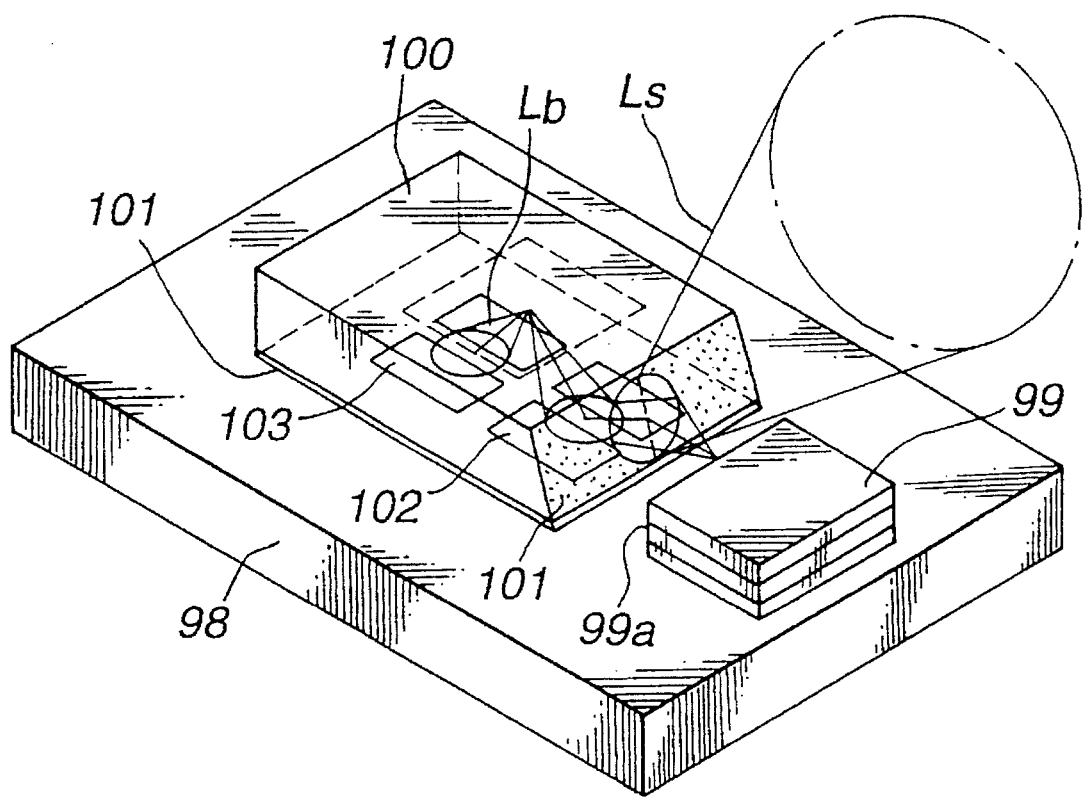
FIG. 50 is a perspective view showing a composite light emitting/receiving device employed in the optical pickup device shown in FIG. 49.

The light emitting/light receiving composite unit 98 is mounted within a package 97 by means of which it is mounted on the base member 95. Plural semiconductor layers including a semiconductor substrate 98 are stacked to form a semiconductor laser device 99, as shown in FIG. 50. On the semiconductor substrate 98 is mounted a beam splitting prism 100, facing a beam outgoing surface 99*a* of the semiconductor laser device 99, for separating the light beam radiated from the semiconductor device 99 from the return light reflected from the optical disc. The beam splitter prism 100 is bonded to the semiconductor substrate 98 via an adhesive 101.

Figure 51:
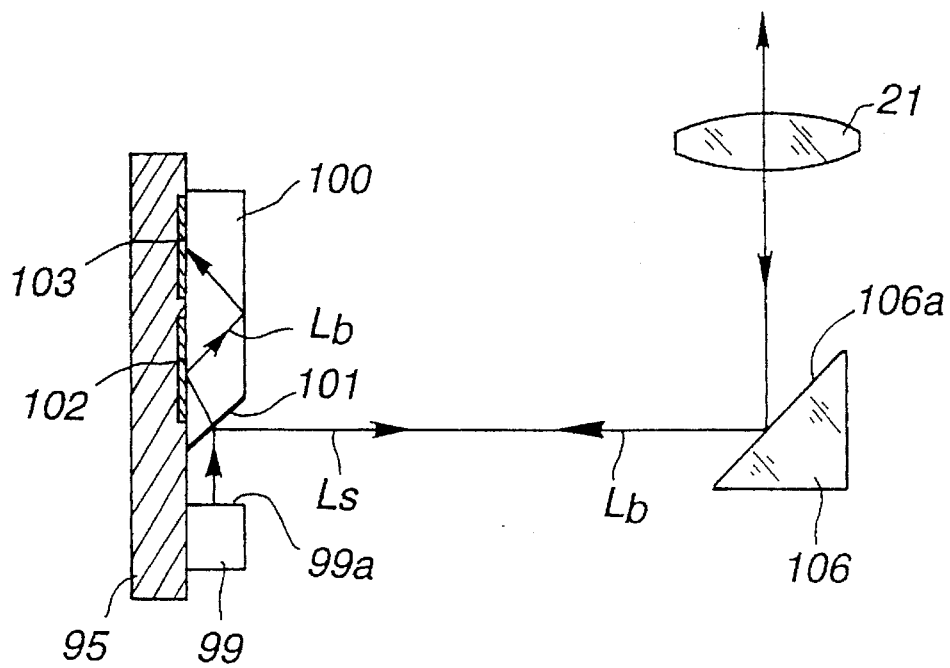
FIG. 51 is a side view showing the relative disposition between the composite light emitting/receiving device and a reflective mirror.
Figure 52:
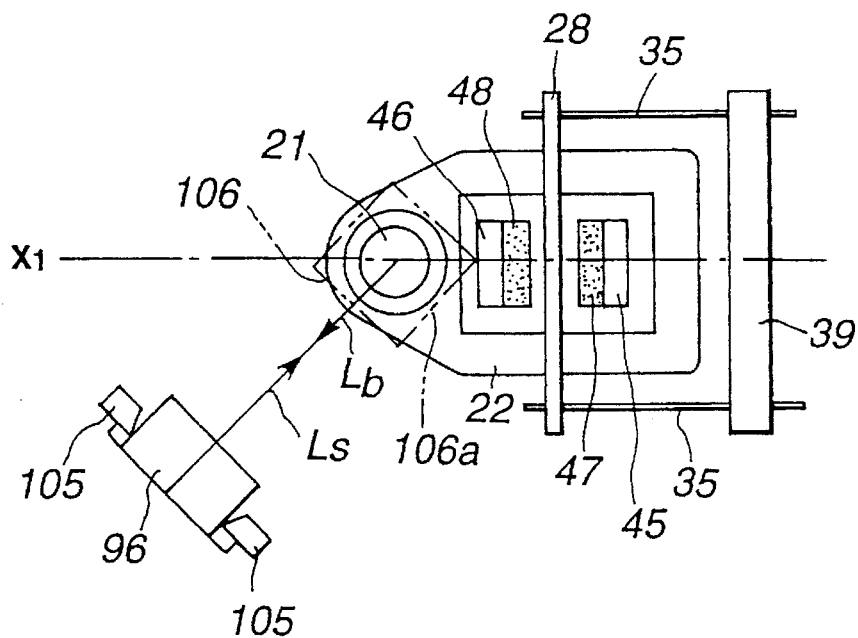
FIG. 52 is plan view showing the disposition of an objective lens provided in the objective lens driving device and the composite light emitting/receiving device.

The beam splitter prism 100 has its surface facing the light outgoing surface 99*a* of the semiconductor laser device 99 inclined with respect to the optical axis of a light beam $L_S$ radiated from the semiconductor laser device 99, as shown in FIGS. 51 and 52. Specifically, the inclined surface has an inclination angle of 45° with respect to the optical axis of the light beam. On the inclined surface is formed a semitransparent reflective mirror 101 for reflecting the light beam $L_S$ radiated from the semiconductor laser device 99 and transmitting the return light Lb. By designing the inclined surface as the semitransparent reflective mirror 101, the light beam $L_S$ radiated from the semiconductor laser element 99 proceeds after its optical axis is bent 90° by the semitransparent reflective film 101.

On the lower surface of the beam splitter 100 on the semiconductor substrate 101 are formed first and second divided detectors 102,103 as light receiving elements for receiving the return light reflected back from the optical disc and proceeding within the beam splitter prism with reflection. These first and second divided detectors 102, 103 detect the return light by plural light receiving elements making up the each of the divided discs 102,103 for outputting detected signals of the information signals recorded on the optical disc, focusing error signals and tracking error signals.

The light emitting/light receiving composite unit 96, comprising the semiconductor laser element 99 and the first and second divided detectors 102, 103 on the common semiconductor substrate 98, is mounted on the base member 95 so that the outgoing direction of the light beam $L_S$ from the semiconductor laser element 99 is parallel to the optical axis of the objective lens 21 provided on the objective lens device 20 mounted on the objective lens driving device 20 mounted on the base member 95, as shown in FIG. 51. That is, the semiconductor substrate 98 is mounted on the base member 95 with the surface carrying the semiconductor laser device 99 and the first and second divided detectors 102, 108 lying parallel to the optical axis of the objective lens 21.

The light emitting/light receiving composite unit 96 is housed within a package 97 in which is mounted the semiconductor substrate 98 on which the semiconductor laser element 99 and the first and second divided detectors 102, 103 are formed. The light emitting/light receiving composite unit 96 is mounted on the base member 95 by the package 97 being mounted between a pair of composite element mounting portions 105, 105 formed on the base member 95. The composite element mounting portions 105, on which the light emitting/light receiving composite unit 96 is mounted, are formed upright on the surface of the base member 95 in parallel with the optical axis of the objective lens 1.

Thus the light emitting/light receiving composite unit 96 is mounted on the base member 95 with the semi-transparent reflective film 101 lying between the composite unit mounting portions 105,105 and with both sides of the package 97 being supported by the composite unit mounting portions 105, 105. As described above, the semi-transparent reflective film 101 deflects the light path of the light beam $L_S$ radiated from the semiconductor laser element 99 by 90°.

The light emitting/light receiving composite unit 96 is arranged with an angular offset of approximately 45° about the optical axis of the objective lens 21, as shown in FIG. 52. Such position of the light emitting/light receiving composite unit 96 is offset obliquely laterally of the objective lens 21 mounted at one end of the objective lens driving device 20 mounted on the base member 95. That is, the light emitting/light receiving composite unit 96 is mounted on the base member 95 so that the light path of the light beam $L_S$ deflected 90° by the semitransparent reflective film 101 makes an angle of approximately 45° relative to the direction of extension $X_1$ of the resilient supporting member 35 supporting the bobbin 2 in a cantilevered fashion.

On the base member 95 is mounted a reflective mirror 106 so as to lie directly below the objective lens 21 provided in the objective lens driving device 20 mounted on the base member 95. The function of the reflective mirror 108 is to deflect the light path of the light beam $L_S$, radiated by the semiconductor laser element 99 and deflected 90° by the semi-transparent reflective film 101 of the beam splitter prism 100, by 90° before the light beam is incident on the objective lens 21, as shown in FIG. 51. The reflective mirror 108 has a reflective surface 106a, deflecting the light path of the light beam $L_S$ by 90°, which is inclined 45° with respect to the optical axis of the objective lens 21, as also shown in FIG. 51. The reflective mirror 106 is mounted on the base member 95 at a position inclined by approximately 45° about the optical axis of the objective lens 21, in order that the reflective surface 108a directly faces the light beam $L_S$ deflected in its path by 90° by the semitransparent reflective film 101. That is, the reflective mirror 106 is mounted on the base member 95 at an angle of approximately 45° with respect to the direction of extension $X_1$ of the resilient supporting member 35 supporting the bobbin 22 in a cantilevered fashion.

The lower surface of the objective lens mounting end of the bobbin 22, facing the reflective mirror 108 mounted on the base member 95, has a cut-out 107, as shown in FIGS. 9 and 49. That is, the cut-out 107 is formed on the rim of the lower surface of the objective lens mounting portion 25 protruded from one end of the bobbin main member 24 constituting the bobbin 22. By forming such recess 107, the reflective mirror 108 can be positioned more closely to the objective lens 21 for preventing the optical pickup device from being increased in height for further reducing the thickness of the device.

By providing the semiconductor laser element 99 and the first and second divided detectors 102, 103 on the common semiconductor substrate 98, as described above, and by employing the light emitting/light receiving composite unit 98 having the beam splitter prism 100 contained in the package 97, the optical block and hence the objective lens driving device itself can be reduced in size, since it is unnecessary to provide the optical path of the light beam incident on the optical disc on the base member 95 separately from the optical path of the return light reflected from the optical disc.

The light beam $L_S$ radiated from the semiconductor laser element 99 constituting the light emitting/light receiving composite unit 98 proceeds parallel to the surface of the base member 95, thus rendering it possible to reduce the size of the optical pickup device.

In addition, since the light emitting/light receiving composite unit 98 is arranged at the position inclined approximately 45° about the optical axis of the objective lens 21, the light emitting/light receiving composite unit 96 may be reduced in width in its tracking direction along which the objective lens 21 of the optical pickup device is moved.

Figure 53:
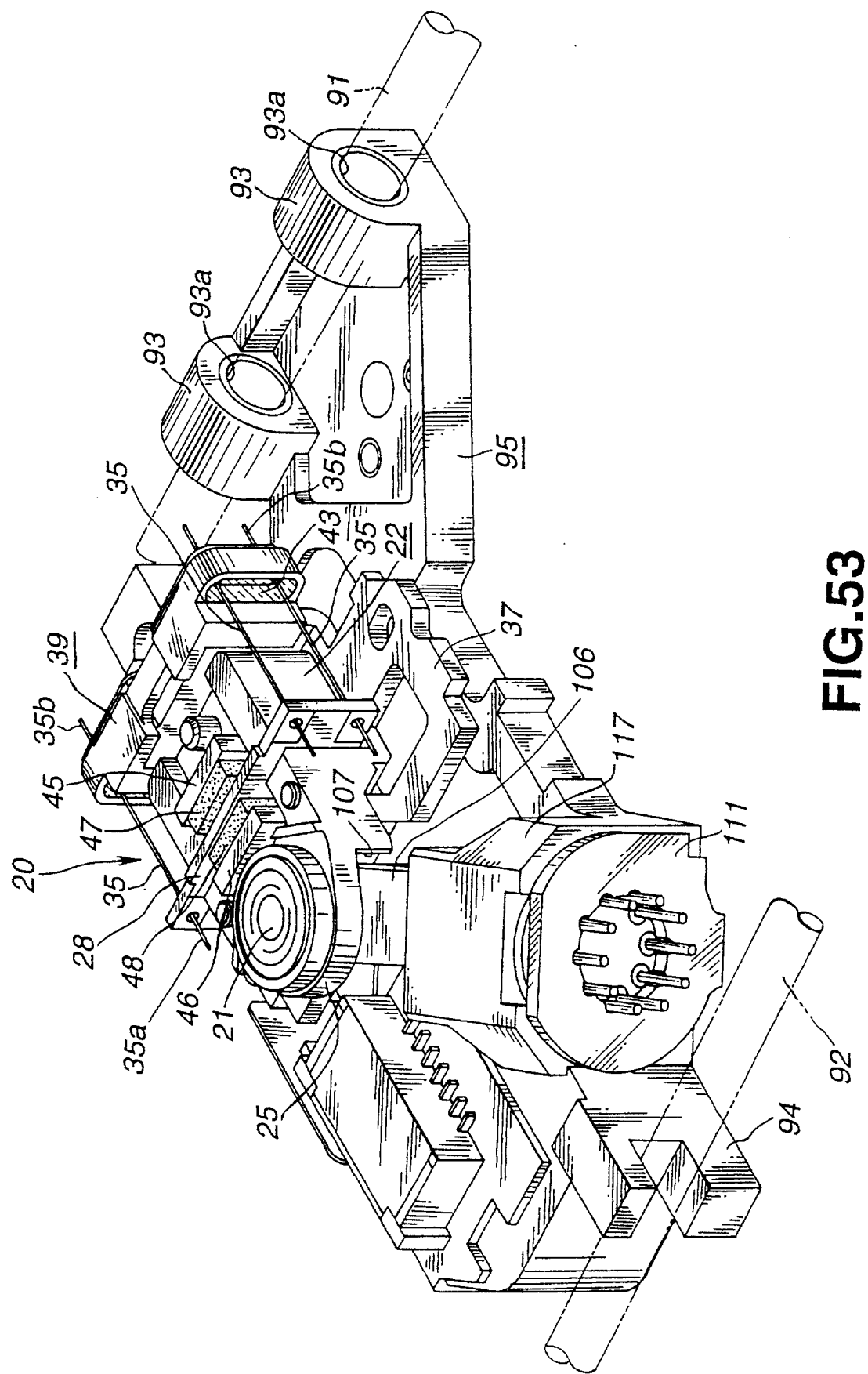
FIG. 53 is a perspective view showing another example of an optical pickup device according to the present invention.

The above-described light emitting/light receiving composite unit 96, employed in the optical pickup device, comprises, as optical elements for separating the return light reflected from the optical disc from the light beam radiated from the light emitting/light receiving composite unit 96, the beam splitter prism 100 provided on the semiconductor substrate 98 carrying both the semiconductor laser device 99 and the first and second divided detectors 102, 103. Alternatively, the light emitting/light receiving composite unit 98 may also comprise a hologram device 110, as shown in FIGS. 53 and 54.

Figure 54:
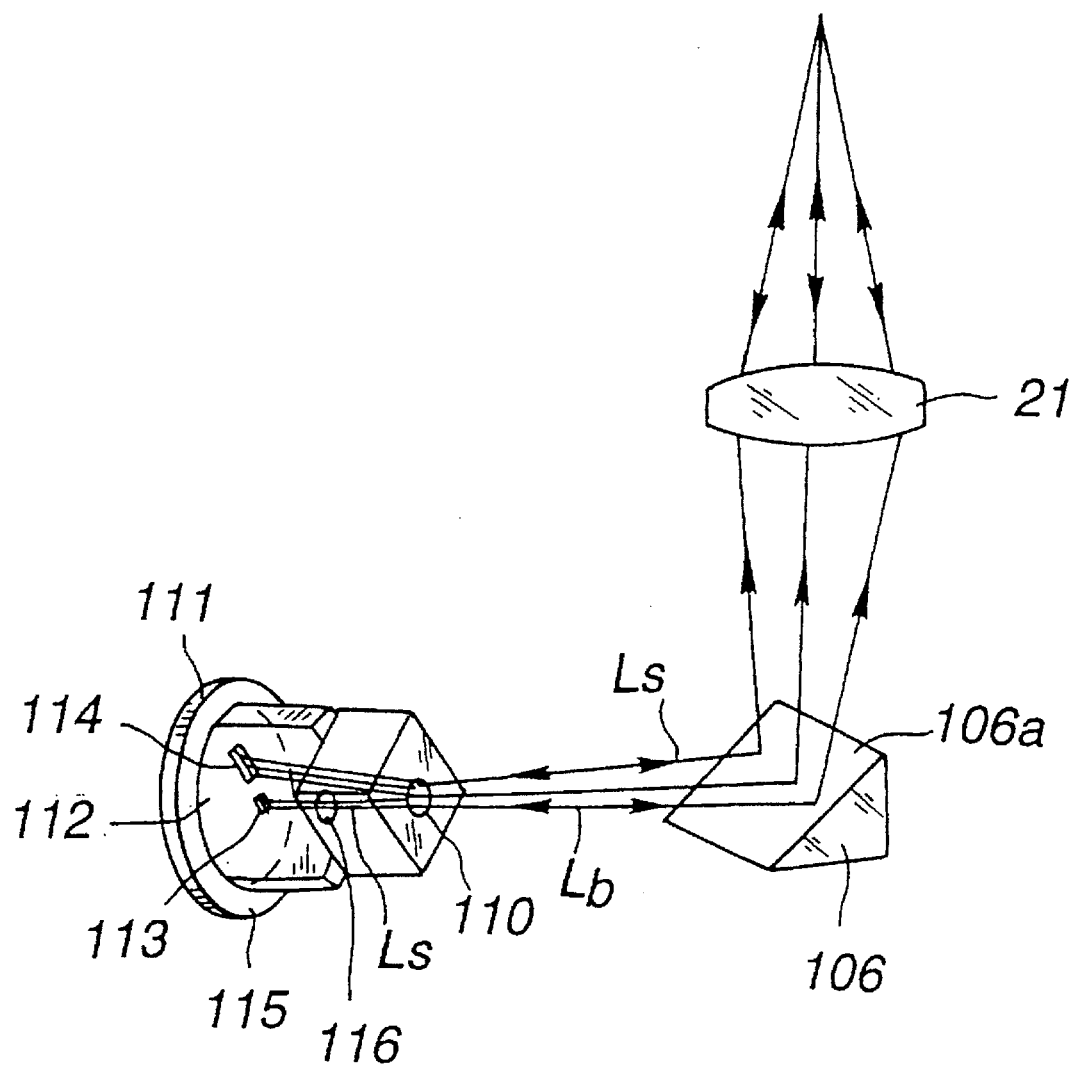
FIG. 54 is a perspective view showing the relative disposition between the reflective mirror and a composite light emitting/receiving device employing a hologram.

A light emitting/light receiving composite unit 111 employing such hologram device 110 has a semiconductor device 113 and a 5-segment detector 114 side-by-side on the same substrate 112 as the light emitting/light receiving composite unit 96, as shown in FIG. 54. The common substrate 112, having mounted thereon the semiconductor device 113 and the 5-segment detector 114, is mounted on a package 115. The hologram device 110 is arranged on the optical path of the light beam $L_s$ radiated from the semiconductor laser device 113. The hologram device 110 is mounted on the front surface of the package 115 such as with an adhesive.

Between the semiconductor device 113 and the hologram device 110 is mounted a grating 116.

Similarly to the light emitting/light receiving composite unit 96, the light emitting/light receiving composite unit 111 employing the hologram device 110 is mounted on the base member 95 so that the surface of the substrate 112 carrying the semiconductor device 113 and the 5-segment detector 114 is parallel to the optical axis of the objective lens 21. The light beam $L_S$ outgoing from the semiconductor laser 113 is radiated in a direction normal to the substrate 112 and parallel to the base member 95.

The light emitting/light receiving composite unit 111 is placed at a position inclined by approximately 45° with respect to the optical axis of the objective lens 21, that is disposed obliquely laterally of the objective lens 21 provided on one end side of the objective lens driving device 20 mounted on the base member 95. That is, the light emitting/light receiving composite unit 111 is mounted on the base member 95 so that the outgoing direction of the light beam $L_S$ radiated from the semiconductor laser device 113 makes an angle of approximately 45° relative to the direction of extension $X_1$ of the resilient supporting member 35 supporting the bobbin 22 in a cantilevered fashion.

The light beam $L_S$, radiated from the semiconductor laser device 113 constituting the light emitting/light receiving composite unit 111 employing the hologram device 110, is separated by the grating 118 into two tracking sub-beams and a main beam for reading out information signals. The light beam $L_S$, thus separated into three beams, is incident on the reflective mirror 108 mounted on the base member 95 via the hologram device 110, and has its light path deflected 90° by the reflective mirror 108 before being incident on the objective lens 21. The light beam $L_S$ is then radiated via the objective lens 21 on the optical disc.

The return light $L_b$ reflected by the optical disc is incident via the objective lens 21 on the reflective mirror 106 and thereby deflected in optical path by 90° before being incident on and diffracted by the hologram device 110. The return light diffracted by the hologram device 110 is guided to the 5-segment detector 114.

Figure 55:
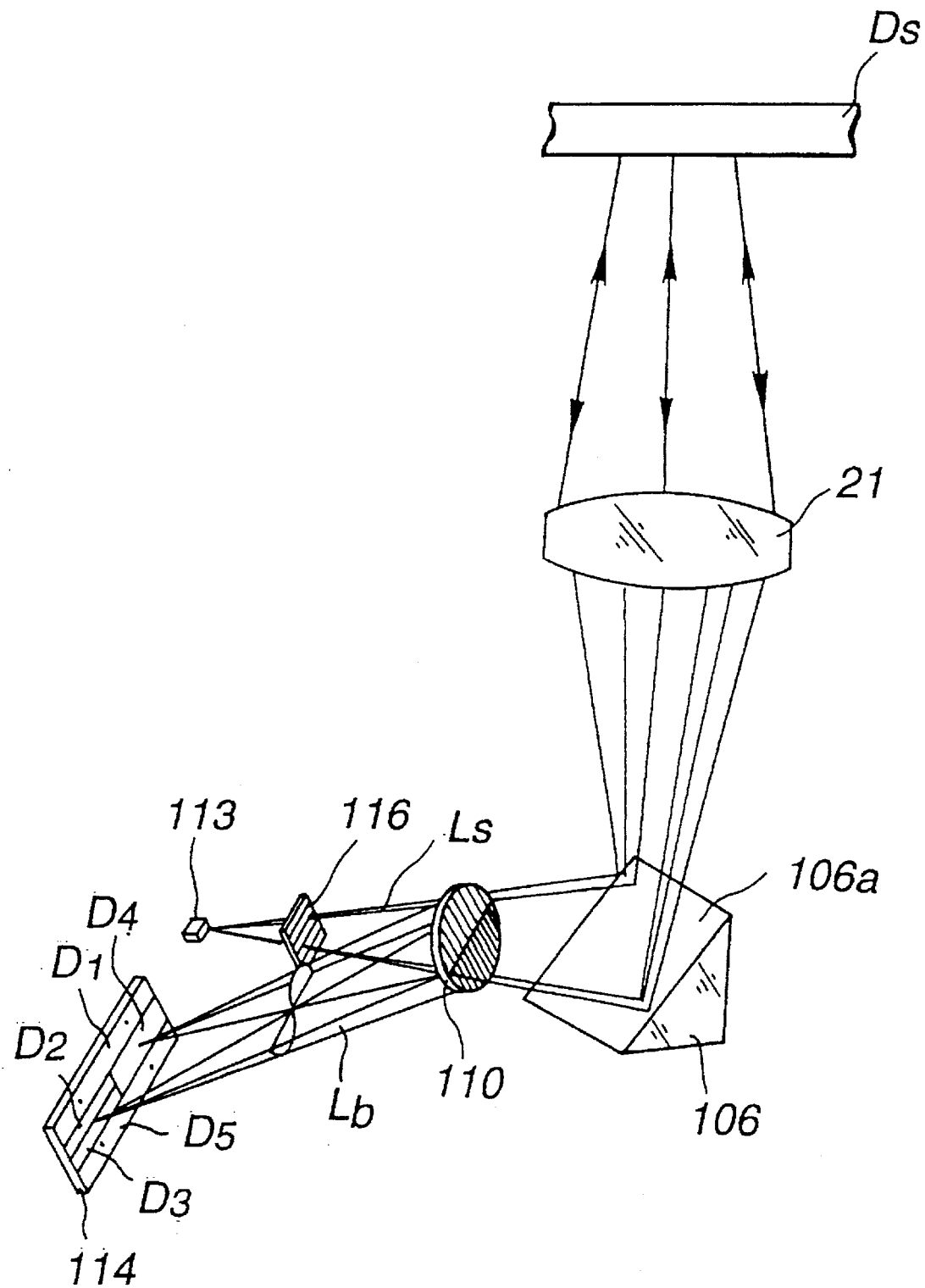
FIG. 55 is a perspective view showing the state of detection of the return light from the optical disc by the composite light emitting/receiving device employing a hologram.

The hologram device 110 has two regions of different lattice periods, whereby the portions of a return light $L_b$ from the optical disc $D_S$ based on the main beam separated by the grating 116 incident on one and the other of the two regions is respectively collected on a division line between light detectors $D_2$ and $D_3$ and on a light detector $D_4$ constituting the 5-segment detector 114, as shown in FIG. 55. The focusing error signal, tracking error signal and the information signal readout signals are obtained based upon detection outputs $S_1$ to $S_5$ of the return light $L_b$ derived from the light detectors $D_1$ to $D_5$. That is, the focusing signal is produced from the difference between detection outputs $S_2$ and $S_3$ of the light detectors $D_2$, $D_3$ detecting the return light $L_b$ based upon the main beam, while the tracking signal is produced from the difference between detection outputs $S_1$ and $S_5$ of the light detectors $D_1$, $D_5$ detecting the return light $L_b$ based upon the sub-beam. The information signal readout signal is produced from the sum of the detection outputs $S_2$, $S_3$ and $S_4$ of the light detectors $D_2$, $D_3$, $D_4$ detecting the return light based on the main beam.

Since the optical pickup device in which the light emitting/light receiving composite unit 111 employing the hologram device 110 is mounted on the base member 95 also has the semiconductor device 113 and the 5-segment detector 114 mounted on the common substrate 112, and also is formed integrally with the hologram device 110 as the light beam separating optical device, there is no necessity of providing on the base member 5 the light path for the light beam incident on the optical disc separately from the light path for the return light beam reflected back from the optical disc, so that it becomes possible to reduce the size of the optical block and hence the objective lens driving device.

On the other hand, since the light beam $L_S$ radiated from the semiconductor laser device 113 constituting the light emitting/light receiving composite unit 111 proceeds in a direction parallel to the surface of the base member 95, the optical pickup device may be reduced in thickness.

In addition, since the light emitting/light receiving composite unit 111 is arranged at a position inclined approximately 45° with respect to the optical axis of the objective lens 21, it becomes possible to reduce the width of the device 111 in the tracking direction, that is in the direction of movement of the objective lens 21 of the optical pickup device in a planar direction orthogonal to its optical axis.

With the object lens driving device of the present invention, the focusing coil 31 and the tracking coil 34 may be placed facing the magnet constituting the magnetic circuit, by simply mounting the planar member carrying the planar focusing coil and the tracking coil on the bobbin of the movable part or the stationary substrate on the stationary side, thereby facilitating the coil mounting operation.

Above all, since electrical connection to the control circuit of the coil portions making up the focusing coil and the tracking coil is achieved by means of the coil mounting substrate, without employing the linear coil ends, automatic assembling by an automatic assembling system is facilitated to realize mass production easily.

Besides, since the coil mounting substrate, which is a planar member having mounted thereon the focusing coil 31 and the tracking coil 34 each made up of planar coil portions, may be mounted with good accuracy on the bobbin, it becomes possible to enable the displacement of the objective lens by suppressing variation in the center of gravity of the movable part inclusive of the bobbin and for providing the objective lens driving device capable of accurately following up with the focusing and tracking error signals.

Also, since the focusing coil and the tracking coil, consisting in planar coil portions mounted on the planar coil mounting substrate, may be adapted in their entirety to face one ends of the magnets making up the magnetic circuit, stable displacement of the objective lens may be realized without being affected by the stray magnetic flux of the magnetic circuit.

Moreover, since part of the yoke is not located within the focusing coil, and hence the focusing coil is not increased in self-inductance, it becomes possible to realize power saving and heat evolution during driving of the objective lens in order to assure table operation of the semiconductor laser constituting the light source radiating a light beam to the optical disc via the objective lens and in order to provide an optical pickup device capable of enabling recording and/or reproduction of information signals with good characteristics.

In addition, since the focusing coil and the tracking coil, constituted by planar coil portions, may be increased in the portions thereof which may be utilized for generating the driving force in cooperation with the magnetic flux of the magnetic circuit, it becomes possible to realize saving in power for displacing the objective lens and to suppress heat evolution during driving of the objective lens in order to assure stable operation of the semiconductor laser constituting the light source radiating a light beam to the optical disc via the objective lens and in order to provide an optical pickup device capable of enabling recording and/or reproduction of information signals with good characteristics.

Furthermore, since the optical pickup device according to the present invention is so arranged and constructed that the light emitting/light receiving composite unit integrated from a laser light source, a light receiving element for receiving the return light beam outgoing from the laser light source and a splitter for separating the light beam outgoing from the light emitting element from the return light beam, is arranged at a position rotated by approximately 45° about the optical axis of the objective lens, with respect to the objective lens driving device mounted on the base member, while the reflective mirror for bending the light path of the light beam radiated from the light emitting element and the return light beam by 90° is arranged at a position rotated by 45° about the optical axis of the objective lens, while having its reflective surface inclined by 45° with respect to the optical axis of the objective lens, the optical pickup device can be reduced in width in an amount corresponding to the inclination of the light emitting/light receiving composite unit, while it can also be reduced in height, thus rendering it possible to reduce the size and thickness of the entire device.

What is claimed is:

1. An objective lens driving device comprising:

a movable pan consisting of a bobbin holding an objective lens at one end thereof and having a vertical opening at a mid portion thereof;

a plurality of resilient supporting members movably supporting said movable part in a direction parallel to the optical axis of the objective lens and in a planar direction normal to said optical axis; and a magnetic circuit unit having a flat-plate-shaped member carrying a flat-plate-shaped focusing coil and a flat-plate-shaped tracking coil, said flat-plate-shaped member extending parallel to the optical axis of said objective lens, at least one magnet is mounted facing the focusing coil and the tracking coil mounted on said flat-plate-shaped member, said magnet being adapted for driving said movable part in the direction parallel to the optical axis of the objective lens and in the planar direction normal to said optical axis in cooperation with said focusing and tracking coils.

2. An objective lens driving device as claimed in claim 1 wherein one of the flat-plate-shaped member and the magnet making up said magnetic circuit unit is mounted on said movable part and wherein the other of the flat-plate-shaped member and the magnet is mounted in the opening in the bobbin.

3. An objective lens driving device comprising:

a bobbin holding an objective lens at one end thereof and having a vertical opening at a mid portion thereof;

a rectangular flat-plate-shaped member having a flat-plate-shaped focusing and a flat-plate-shaped tracking coil, said flat-plate-shaped member extending parallel to the optical axis of said objective lens, said flat-plate-shaped member having ends protruding from both lateral sides of the bobbin with the focusing and tracking coil being disposed within the opening in said bobbin;

a plurality of resilient supporting members each having one end connected to the portions of said flat-plate-shaped member that protrude from both lateral sides of the bobbin and having the other end supported by a stationary portion, said resilient supporting members movably supporting the bobbin in a direction parallel to the optical axis of the objective lens and in a planar direction normal to the optical axis of the objective lens; and a magnet placed facing said focusing and tracking coils mounted on said flat-plate-shaped member.

4. The objective lens driving device as claimed in claim 3, further comprising:

a yoke having a pair of upstanding portions, said magnet being mounted on one of the upstanding portions and said flat-plate-shaped member being interposed between said upstanding portions.

5. The objective lens driving device as claimed in claim 4 wherein said focusing coil is constituted by at least one rectangular coil having a long side extending parallel to the longitudinal direction of said flat-plate-shaped member, said tracking coil is constituted by at least two rectangular coils each having a long side extending normal to the longitudinal direction of said flat-plate-shaped member, said focusing coil and the tracking coil are arranged on the surface of said flat-plate-shaped member in a stacked manner, and wherein at least one of the sides of said focusing coil extending parallel to the longitudinal direction of said flat-plate-shaped member and mutually adjacent sides of the at least two rectangular coils making up said tracking coil are placed within a common magnetic flux.

6. The objective lens driving device as claimed in claim 5 wherein said focusing coil is constituted by at least two rectangular coils each having a long side extending parallel to the longitudinal direction of said flat-plate-shaped member, and wherein mutually adjacent long sides of the at least two rectangular coils making up said focusing coil are placed within said common magnetic flux along with the mutually adjacent long sides of the at least two rectangular coils making up said tracking coil.

7. The objective lens driving device as claimed in claim 4 wherein said tracking coil is constituted by at least two rectangular coils placed on either sides of said focusing coil.

8. The objective lens driving device as claimed in claim 4 wherein said focusing coil is constituted by at least two rectangular coils placed on either sides of said tracking coil.

9. The objective lens driving device as claimed in claim 3 wherein said resilient supporting member is formed by an electrically conductive material and wherein the portions of the flat-plate-shaped member protruding from both sides of the bobbin have electrically conductive patterns formed thereon.

10. The objective lens driving device as claimed in claim 9 wherein the portions of the flat-plate-shaped member protruding from both sides of the bobbin have recesses for mounting the one ends of said resilient supporting members therein.

11. The objective lens driving device as claimed in claim 9 wherein the portions of the flat-plate-shaped member protruding from both sides of the bobbin have through-holes for mounting the one ends of said resilient supporting members therein.

12. An objective lens driving device comprising:

a bobbin holding an objective lens at one end thereof and having a vertical opening at a mid portion thereof;

a rectangular flat-plate-shaped member having flat-plate-shaped focusing and tracking coils, said flat-plate-shaped member extending parallel to the optical axis of said objective lens;

a plurality of resilient supporting members each having one end mounted on the bobbin and having the other end supported by a stationary portion, said resilient supporting members supporting said bobbin for movement in a direction parallel to the optical axis of said objective lens and in a planar direction normal to said optical axis; and a magnet mounted within the opening in said bobbin for facing the focusing and tracking coils mounted on said flat-plate-shaped member.

13. The objective lens driving device as claimed in claim 12, further comprising:

a pair of magnets arranged within the opening in said bobbin with said flat-plate-shaped member in-between said pair of magnets.

14. The objective lens driving device as claimed in claim 12, further comprising:

a yoke having a pair of upstanding portions, said yoke being mounted on said bobbin such that said flat-plate-shaped member is in-between said upstanding portions, said magnet being mounted on one of said upstanding portions.

15. The objective lens driving device as claimed in claim 14 wherein said focusing coil is constituted by at least one rectangular coil having a long side extending parallel to the longitudinal direction of said flat-plate-shaped member, said tracking coil is constituted by at least two rectangular coils each having a long side extending normal to the longitudinal direction of said flat-plate-shaped member, said focusing coil and the tracking coil are arranged on the surface of said flat-plate-shaped member in a stacked manner, and wherein at least one of the sides of said focusing coil extending parallel to the longitudinal direction of said flat-plate-shaped member and mutually adjacent sides of the at least two rectangular coils making up said tracking coil are placed within a common magnetic flux.

16. The objective lens driving device as claimed in claim 15 wherein said focusing coil is constituted by at least two rectangular coils each having a long side extending parallel to the longitudinal direction of said flat-plate-shaped member, and wherein mutually adjacent long sides of the at least two rectangular coils making up said focusing coil are placed within said common magnetic flux along with the mutually adjacent long sides of the at least two rectangular coils making up said tracking coil.

17. The objective lens driving device as claimed in claim 12 wherein said tracking coil is constituted by at least two rectangular coils placed on either sides of said focusing coil.

18. The objective lens driving device as claimed in claim 12 wherein said focusing coil is constituted by at least two rectangular coils placed on either sides of said tracking coil.

19. An optical pickup device comprising:

a base member having guide supports on both ends thereof for engaging a pair of parallel guides;

an objective lens driving device mounted on said base member and having a bobbin carrying an objective lens at one end thereof, a plurality of resilient supporting members each having one end mounted on the other end of said bobbin and having the other end mounted on a stationary portion for supporting the bobbin for movement in a direction parallel to the optical axis of said objective lens and in a direction normal to said optical axis, a vertically positioned flat-plate-shaped member having a flat-plate-shaped focusing coil and a flat-plate-shaped tracking coil is mounted on said bobbin, and a magnetic circuit unit including a magnet for moving said bobbin in a direction parallel to the optical axis of said objective lens and in a direction normal to said optical axis in cooperation with said focusing coil and the tracking coil;

a light emitting/light receiving composite unit having a laser light source, a light-receiving element for receiving the return beam of a light beam radiated from said laser light source and a beam splitter element for separating the light beam radiated from said light-receiving element and said return beam from each other, said light emitting/light receiving composite unit being mounted at such a position on said base member in which the optical axis of the light beam radiated from the laser light source is rotated by approximately 45° about the optical axis of the objective lens of the objective lens driving device; and a reflective mirror mounted on said base member directly below the objective lens of the objective lens driving device, said reflective mirror being inclined 45° about the optical axis of said objective lens and having its reflective surface inclined 45° relative to said optical axis.

20. The optical pickup device as claimed in claim 19 wherein said bobbin of the objective lens driving device has a cut-out formed in the lower surface of an end part thereof fitted with said objective lens for facing said reflective mirror.

21. The objective lens driving device as claimed in claim 19 wherein said light emitting/light receiving composite unit has its light-receiving element mounted on the same substrate on which the laser light source is mounted and wherein said substrate is mounted on the base member so that the substrate is substantially parallel to the optical axis of the objective lens of the objective lens driving device.

* * * * *